(12) United States Patent
Jackson

(10) Patent No.: US 10,796,578 B1
(45) Date of Patent: Oct. 6, 2020

(54) METHOD AND SYSTEM FOR DISTRIBUTING ELECTRONIC ACCIDENT STATUS INFORMATION OVER A NETWORK TO A REMOTE SUBSCRIBER PORTABLE COMPUTING DEVICE DURING OR AFTER A VEHICLE ACCIDENT

(71) Applicant: Fender2Fender, LLC, Atlanta, GA (US)

(72) Inventor: Clemist Jackson, Marietta, GA (US)

(73) Assignee: FENDER2FENDER, LLC, Atlanta, GA (US)

( * ) Notice: Subject to any disclaimer, the term of this patent is extended or adjusted under 35 U.S.C. 154(b) by 0 days.

(21) Appl. No.: 16/653,901

(22) Filed: Oct. 15, 2019

Related U.S. Application Data

(60) Provisional application No. 62/745,620, filed on Oct. 15, 2018.

(51) Int. Cl.
    *B60Q 1/00* (2006.01)
    *G08G 1/16* (2006.01)
    *G07C 5/00* (2006.01)
    *B60R 21/0136* (2006.01)
    *G06Q 40/08* (2012.01)

(52) U.S. Cl.
    CPC ......... *G08G 1/162* (2013.01); *B60R 21/0136* (2013.01); *G06Q 40/08* (2013.01); *G07C 5/008* (2013.01)

(58) Field of Classification Search
    CPC .... G08G 1/162; G06Q 40/08; G06Q 30/0283; G06Q 50/265; B60R 21/0136; G07C 5/008; G07C 5/0841; G16H 10/60; H04W 4/023; H04W 4/90; H04W 4/029; G01P 15/00; G01P 3/00; G01P 15/04; G01P 3/56; H04L 65/1096; H04L 65/403; H04M 1/72536
    USPC ....... 340/436, 435, 439, 438, 425.5, 426.19, 340/990, 995.1, 995.27
    See application file for complete search history.

(56) References Cited

U.S. PATENT DOCUMENTS

| | | | |
|---|---|---|---|
| 9,466,085 B2 * | 10/2016 | Mullen | G06Q 40/08 |
| 9,773,281 B1 * | 9/2017 | Hanson | H04W 4/023 |
| 10,417,713 B1 * | 9/2019 | Brandmaier | B60R 21/0136 |
| 2010/0174564 A1 * | 7/2010 | Stender | G06Q 40/08 |
| | | | 705/4 |

* cited by examiner

*Primary Examiner* — Anh V La
(74) *Attorney, Agent, or Firm* — Smith Tempel; Steven P. Wigmore

(57) ABSTRACT

A method and system for distributing electronic vehicle accident status information over a network to a remote subscriber portable computing device during and after a vehicle accident may include transmitting a downloadable client application over a communications network to a portable computing device (PCD) for running on the portable computing device and for communicating with the server over the communications network. The server may receive profile information about a person and at least one vehicle from the communications network via the client application. The client application may then receive an accident report name with the client application and then display on the PCD a check-list of actions for completion in order to complete the accident report associated with the accident report name. At least one action controls a camera function of the PCD.

20 Claims, 27 Drawing Sheets

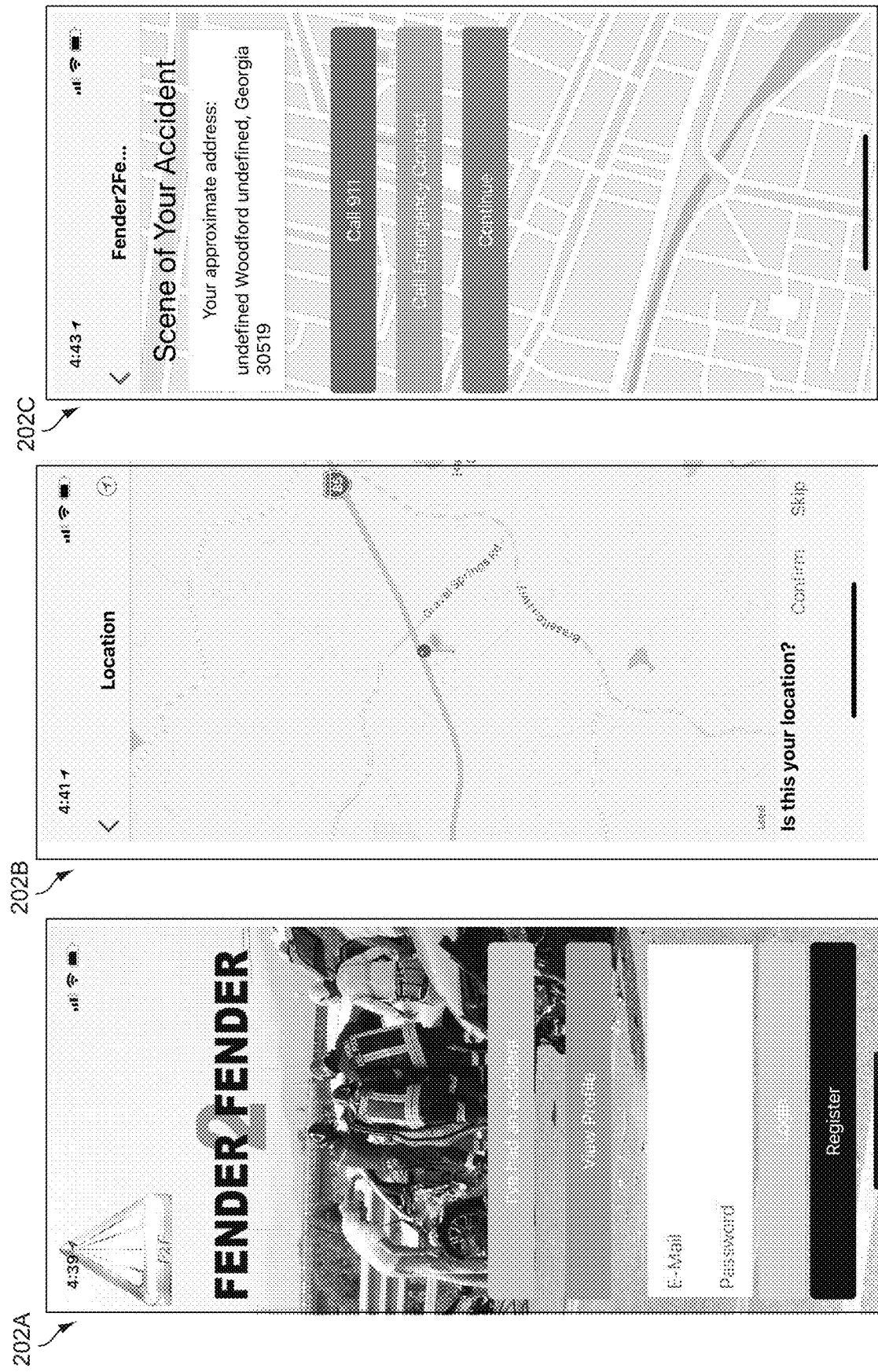

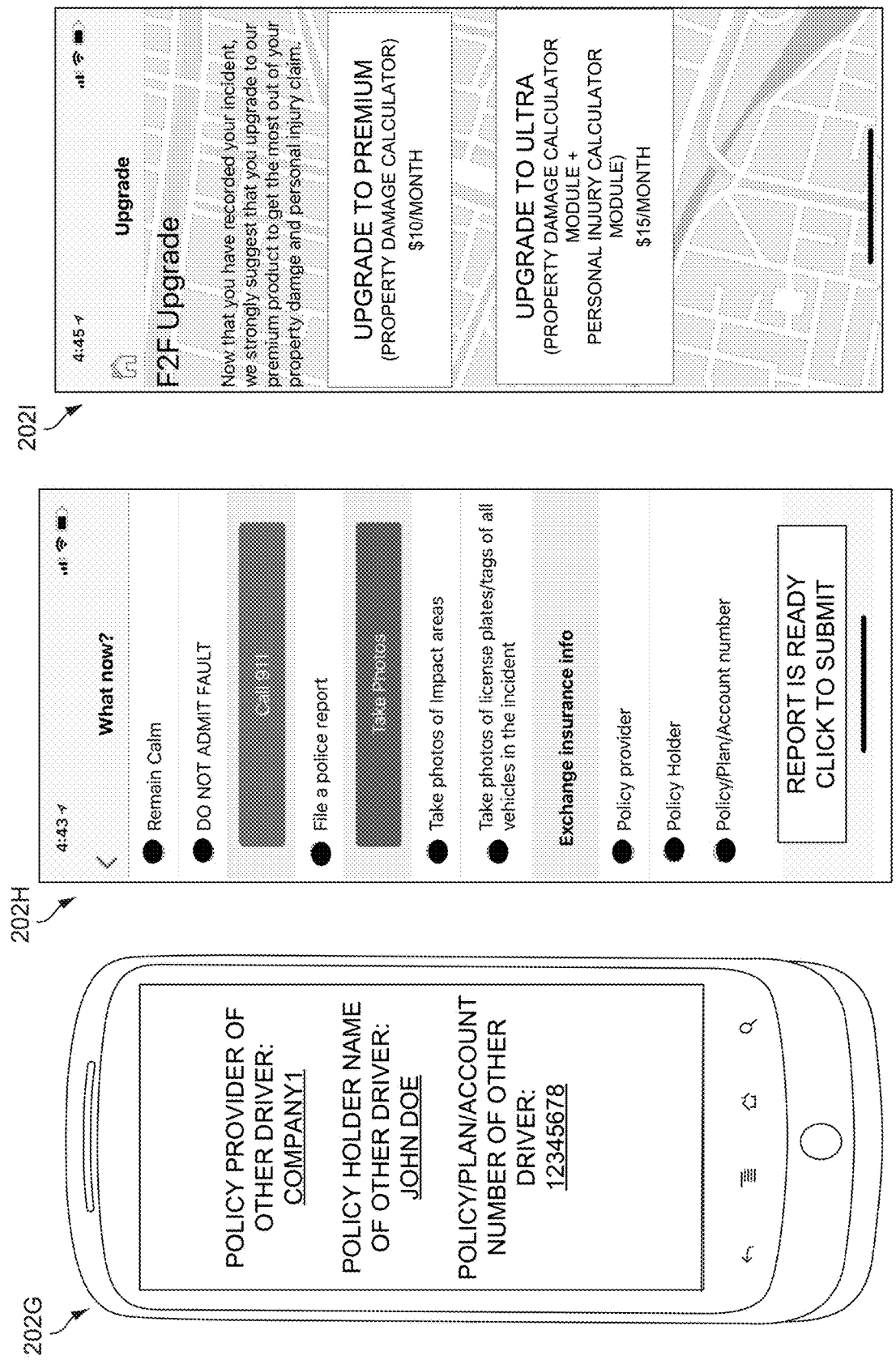

METHOD AND SYSTEM FOR DISTRIBUTING ELECTRONIC ACCIDENT STATUS INFORMATION OVER A NETWORK TO A REMOTE SUBSCRIBER PORTABLE COMPUTING DEVICE DURING OR AFTER A VEHICLE ACCIDENT

BACKGROUND

People often have challenges during and after motor-vehicle accidents which often involve the collision between two vehicles, where each vehicle usually has a driver. However, in this modern digital age, driverless vehicles are a reality and thus, it is possible for one or both vehicles involved in an accident to be driverless, where people are passengers only and not a driver.

Frequently, drivers of a vehicle and/or passengers involved in such accidents are usually at a loss in what actions to take after an accident has occurred. Drivers and/or passengers are often in a state of shock after such accidents and are usually unable to think clearly.

Even after calming down, drivers and/or passengers are unsure what parties to call after an accident and what information may be needed for insurance companies to resolve any insurance claims that are filed after the accident by the drivers and/or passengers. Drivers and/or passengers after accidents may also be in a state of panic and/or confusion.

In addition to not understanding what information may be needed by insurance companies to process insurance claims, drivers and/or passengers are also usually unsure exactly what vehicle insurance covers with respect to any damaged property and/or any injuries to people. Frequently drivers and/or passengers do not know the scope of coverage that their vehicle policies provide and what should be asked about the scope of coverage after an accident.

What is needed is an automated method and computer implemented system which can help drivers collect information after an accident that can be used by insurance companies as well as legal counsel should any property and/or injury claim(s) from a vehicle accident require legal action. An automated method and computer system are needed that helps a driver and/or passenger collect and store relevant information immediately after the accident and which may help a driver to ask strategic questions to insurance companies several days or hours after an accident

SUMMARY OF THE DISCLOSURE

The method and system for distributing electronic vehicle accident status information over a network to a remote subscriber portable computing device during and after a vehicle accident may include transmitting a downloadable client application over a communications network to a portable computing device (PCD) for running on the portable computing device and for communicating with the server over the communications network. The server may receive profile information about a person and at least one vehicle from the communications network via the client application.

The server and/or the client application may determine if the vehicle has been involved in an accident. Then the client application may determine if a global positioning system (GPS) unit within the PCD is working. Geo-coordinates of the PCD with the GPS unit may be determined if the GPS unit is working.

The server and/or client application may then determine at least one of name of road, city, state, terrain, and weather conditions based on the geo-coordinates. Next, the client application may display a road name, city, and state on the display of the PCD.

The client application may then display auto-dialer controls for 911 calling and dialing an emergency contact based on the profile information. The client application may then receive an accident report name with the client application and then display on the PCD a check-list of actions for completion in order to complete the accident report associated with the accident report name. At least one action controls a camera function of the PCD.

The check-list of actions may include, but is not limited to, at least one of: a checkable item instructing the subscriber to remain calm; a checkable item instructing the subscriber to not admit fault; a checkable item for calling emergency personnel; a checkable item for activating the camera function for taking photographs associated with the accident; a checkable item instructing the subscriber to take photographs of the impact area; a checkable item instructing the subscriber to take photographs of license plates; a checkable item instructing the subscriber to record number of vehicles in the accident; a checkable item instructing the subscriber to secure insurance policy provider of other driver; a checkable item instructing the subscriber to secure policy holder of other driver insurance policy; and a checkable item instructing the subscriber to secure account number associated with other driver insurance policy.

The server and the client application of the PCD may calculate a depreciation value for the vehicle and display the depreciation value on the PCD. The server and the client application of the PCD may also calculate a bodily injury value for the subscriber and display this bodily injury value on the PCD.

While the inventive system may be primarily used for automobile type of vehicle accidents, other vehicles are possible and are included within the scope of this disclosure. Other vehicles include, but are not limited to, motorcycles; jet-skis; boats; air-craft, such as jets, airplanes, helicopters, and personal aircraft such as flying drones; etc.

This summary is provided to introduce a selection of concepts that are further described below in the detailed description. This summary is not intended to identify key or essential features of the claimed subject matter, nor is it intended to be used as an aid in limiting the scope of the claimed subject matter

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 2A illustrates an exemplary screenshot for logging into the software service running on a portable computing device like a mobile phone;

FIG. 2B illustrates an exemplary screenshot in which a portable computing device automatically determines a location of the device;

FIG. 2C illustrates an exemplary screenshot that allows a user of the software service to confirm the location presented in FIG. 2B and which allows a user to call one or more emergency services and/or contacts;

FIG. 2G illustrates an exemplary screenshot in which information of a second driver relative to a first driver in a two-driver vehicle accident may be collected with the software service;

FIG. 2H illustrates an exemplary screenshot in which the checklist that was previously presented in FIG. 2E is shown to be complete meaning that the user of the software service has collected all information listed in this screenshot;

FIG. 2I illustrates an exemplary screenshot in which the user of the software service is presented with an option to upgrade the software service so that either property damage calculations and/or bodily injury calculations can be made with the software service;

FIG. 2X-2 illustrates an exemplary screenshot for allowing a user of the software service to select a portion of his or her body which may have been injured during the vehicle accident;

FIG. 2X-3 illustrates an exemplary screenshot which may allow the user of software service to confirm the body part(s) selected in screenshot of FIG. 2X-2;

FIG. 2X-4 illustrates an exemplary screenshot which allows a user of the software service to select the type of medical attention that he or she has received after the vehicle accident;

FIG. 2X-5 illustrates an exemplary screenshot which allows a user to enter the cost in currency, such as, but not limited to, U.S. dollars for each visit to the medical professional selected in FIG. 2X-4;

FIG. 2X-6 illustrates an exemplary screenshot for allowing a user of the software service to enter distances traveled for any of the medical services documented in this segment of the software service;

FIG. 2X-7 illustrates an exemplary screenshot which allows a user of the software service to enter the amount of time spent away from work for each medical visit documented in this segment of the software service;

FIG. 2X-8 illustrates a screenshot that allows a user to enter diagnostic charges incurred for each medical service documented with the software service;

FIG. 2X-9 illustrates a screenshot which may allow a user to assign a percentage of fault relative to the accident being documented with the software service;

FIG. 2X-10 illustrates a screenshot that presents the results of the bodily injury calculations made by the bodily injury calculator;

FIG. 2Y-1 illustrates a screenshot that prompts/asks the user of the software service if he/she wishes to see a value range in which the user can use in his/her negotiations with insurance providers who may be covering damages incurred after the vehicle accident;

FIG. 2Y-2 illustrates a screenshot which displays a disclaimer about the value range that the user desires to view and which can be used in his/her negotiations with insurance providers who may be covering damages incurred after the vehicle accident;

FIG. 2Z-1 illustrates a screenshot which presents a low value and a high value that defines a value range from which a user of the software service may use with her/his negotiations with one or more insurance providers who may be covering damages incurred after the vehicle accident;

FIG. 2Z-2 illustrates a screenshot that presents a disclaimer which is usually provided to the user of the software service prior to starting the property damage calculations segment and the bodily injury calculations segment of the software service;

FIG. 2Z-3 illustrates a screenshot that presents a warning which is usually provided to the user of the software service prior to starting the property damage calculations segment and the bodily injury calculations segment of the software service;

FIG. 2Z-4 illustrates a screenshot having an error message;

FIG. 4 is a functional block diagram of an internet connected, for example, a computer as illustrated in FIG. 1A and that can be used in the system for distributing electronic vehicle accident status information over a network to a remote subscriber portable computing device during and after a vehicle accident;

FIG. 5 is a diagram of an exemplary, non-limiting aspect of an internet connected device comprising a wireless mobile telephone which corresponds with the portable computing devices illustrated in FIG. 1A;

FIG. 6 is a screenshot illustrating details of the automobile accident that are subsequently forwarded electronically to a licensed provider;

FIG. 7 is a screenshot illustrating claim payment options that may be presented to the user of the software service;

FIG. 8 is a screenshot illustrating a verification message that acknowledges a deposit in a specific financial account to settle an accident claim; and FIG. 9 is a schematic illustrating a hologram which may be presented above and/or adjacent to a screen of a portable computing device in order to enhance an experience of the software service.

DETAILED DESCRIPTION

The word "exemplary" is used herein to mean "serving as an example, instance, or illustration." Any aspect described herein as "exemplary" is not necessarily to be construed as exclusive, preferred or advantageous over other aspects.

Figure 1A:
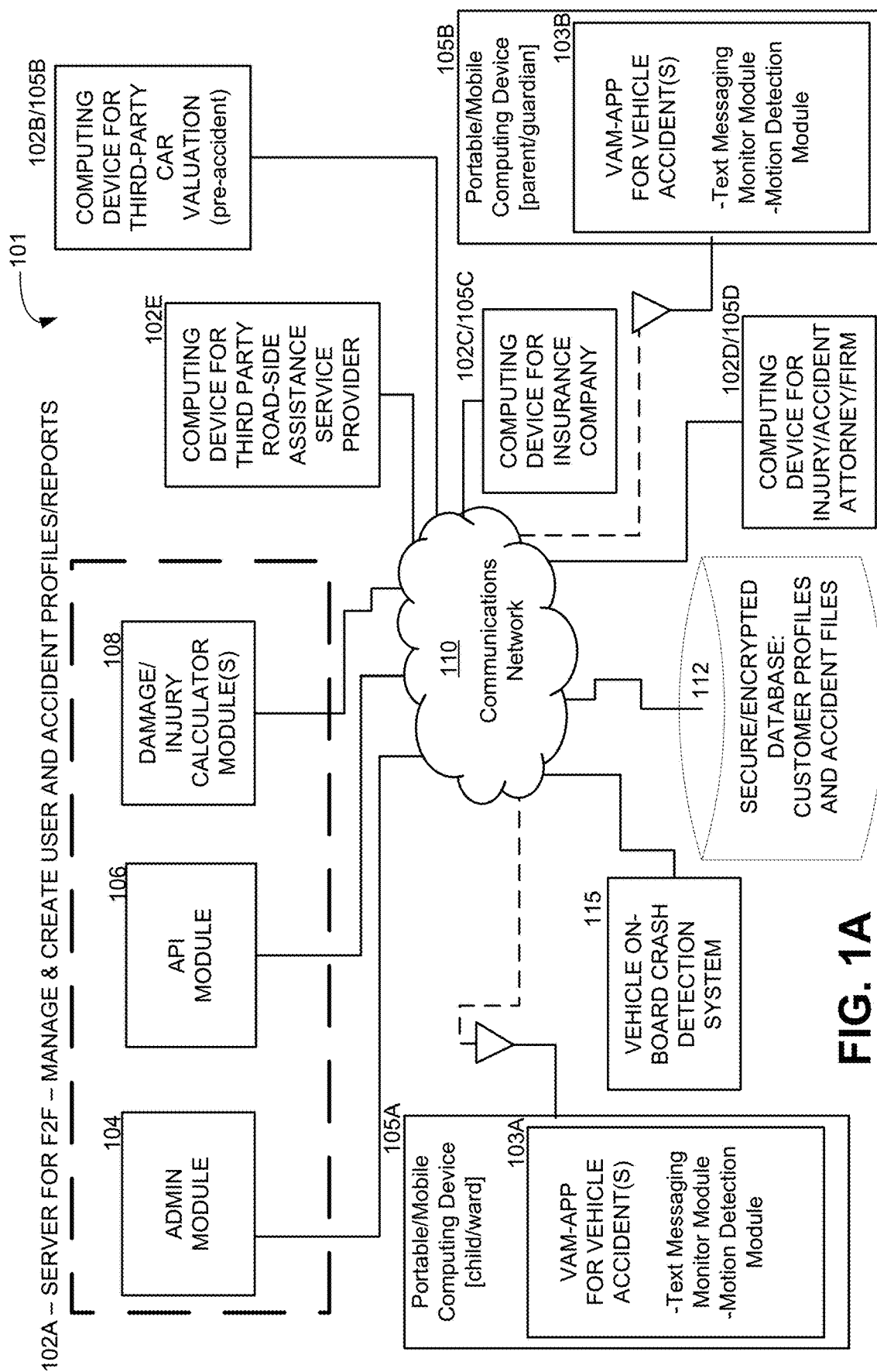
FIG. 1A illustrates several components of a system and method of distributing electronic vehicle accident status information over a network to a remote subscriber portable computing device during and after a vehicle accident.

Referring now to FIG. 1A, this figure illustrates several components of a system 101 and method of distributing electronic vehicle accident status information over a network 110 to a remote subscriber portable computing device (PCD) 105 during and after a vehicle accident. The system 101 may comprise a server 102A that is primarily responsible for managing the electronic vehicle accident status information. The term, "vehicle" as used herein, may include automobiles, however, it may also address any type of vehicle in which insurance coverage may be necessary. Therefore, the term, "vehicle" includes automobiles, motorcycles, trucks, boats, aircrafts, jet-skis, and any and all vehicles which may require some form of insurance coverage.

The server 102A may run/execute several different software modules such as, but not limited to, an administrative ("admin") module 104, an application programming interface ("API") module 106, and a damage/injury calculator module 108. The server 102A may communicate with one or more portable computing devices ("PCDs") 105 which may run or execute a vehicle accident management application ("VAM-app") 103. The VAM-app 103 may be responsible for managing the vehicle accident information collected by a subscriber of system 101.

In this description, the term "portable computing device" ("PCD") 105 is used to describe any device operating on a limited capacity power supply, such as a battery. Although battery operated PCDs 105 have been in use for decades, technological advances in rechargeable batteries coupled with the advent of third generation ("3G"), fourth generation ("4G") and fifth generation ("5G") wireless technology have enabled numerous PCDs 105 with multiple capabilities. Therefore, a PCD 105 may be a laptop computer having wireless data connectivity, a smartphone, a cellular telephone, a satellite telephone, a pager, a personal digital assistant (PDA), a navigation device, a tablet personal computer (PC), a smartbook or reader, a media player, a wearable device, or a combination of the aforementioned devices, among others.

Figure 2F:
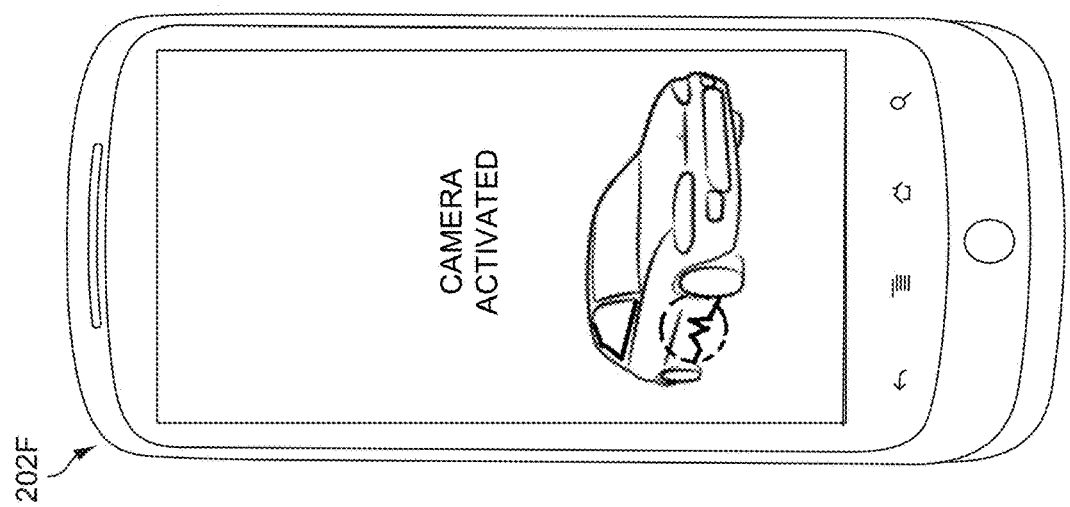
FIG. 2F illustrates an exemplary screenshot in which a camera of a portable computing device is activated and utilized by the software service to document a vehicle accident.
Figure 2E:
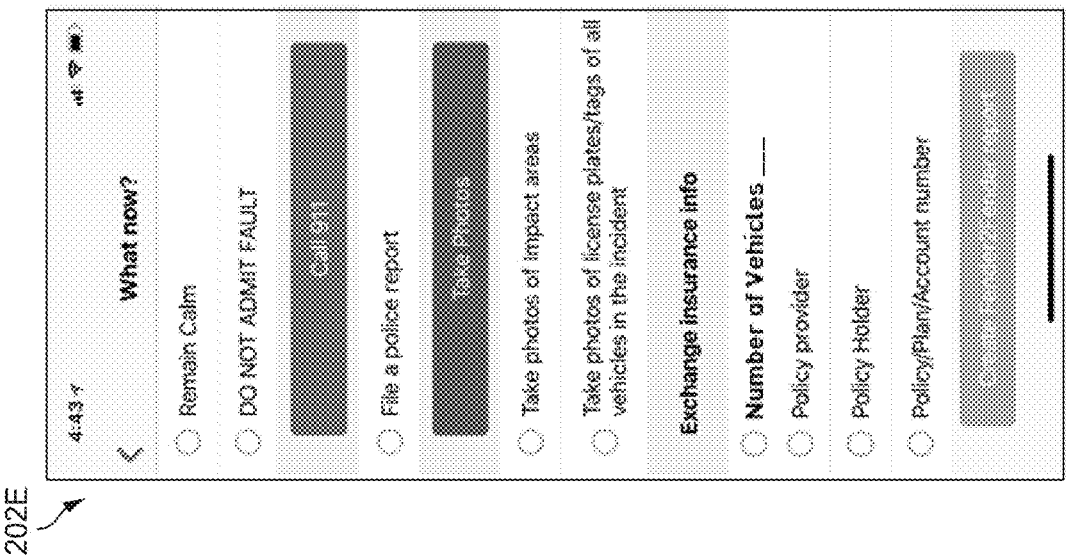
FIG. 2E illustrates an exemplary screenshot of a checklist for a user to complete in order to fully document a vehicle accident according to one exemplary embodiment.
Figure 2D:
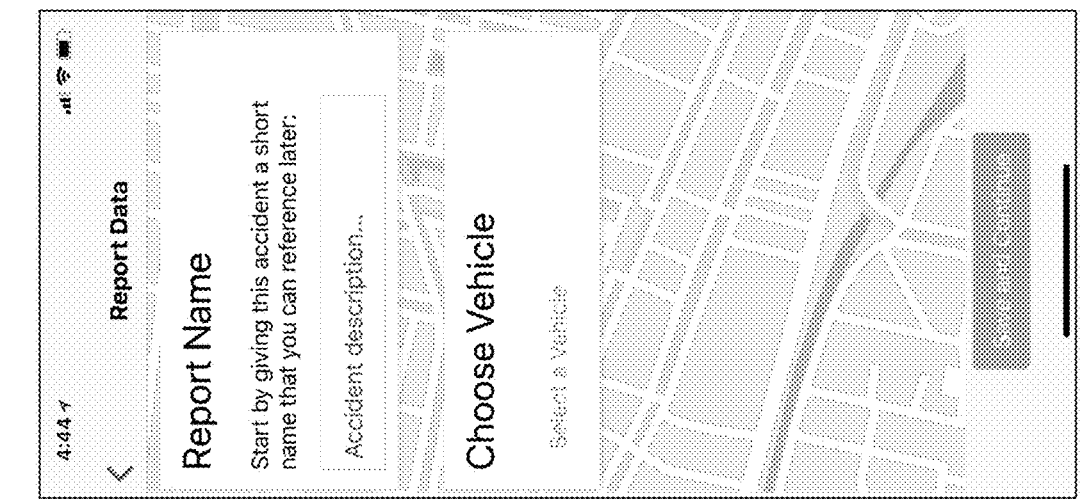
FIG. 2D illustrates an exemplary screenshot for allowing a user to provide a name of a file which will be created to store information entered into subsequent screenshots presented by the software service.
Figure 2L:
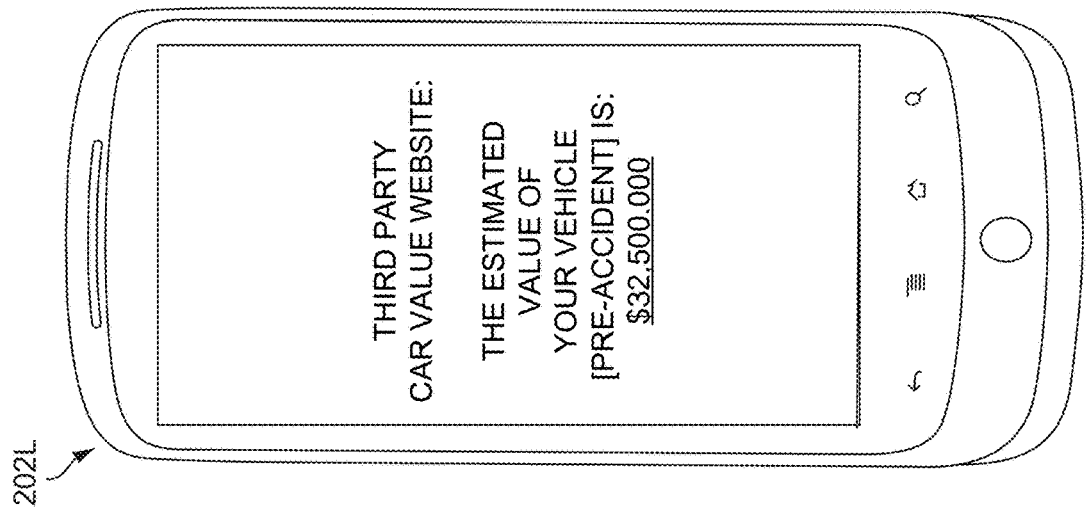
FIG. 2L illustrates an exemplary screenshot which helps a user determine a monetary value of his or her vehicle prior to the vehicle accident with the assistance of a third-party website.
Figure 2K:
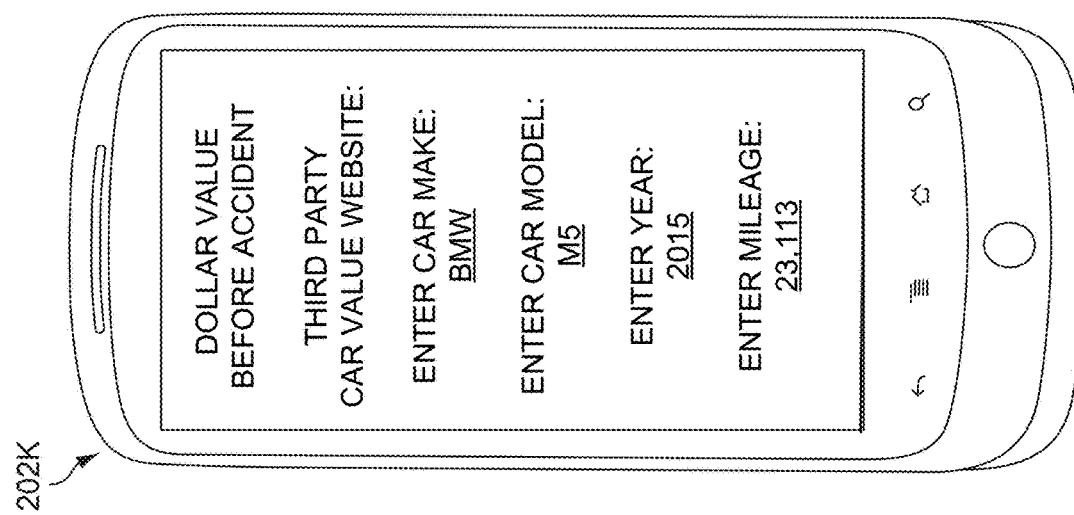
FIG. 2K illustrates an exemplary screenshot which helps a user determine a monetary value of his or her vehicle prior to the vehicle accident in which damage to the vehicle has occurred.
Figure 2J:
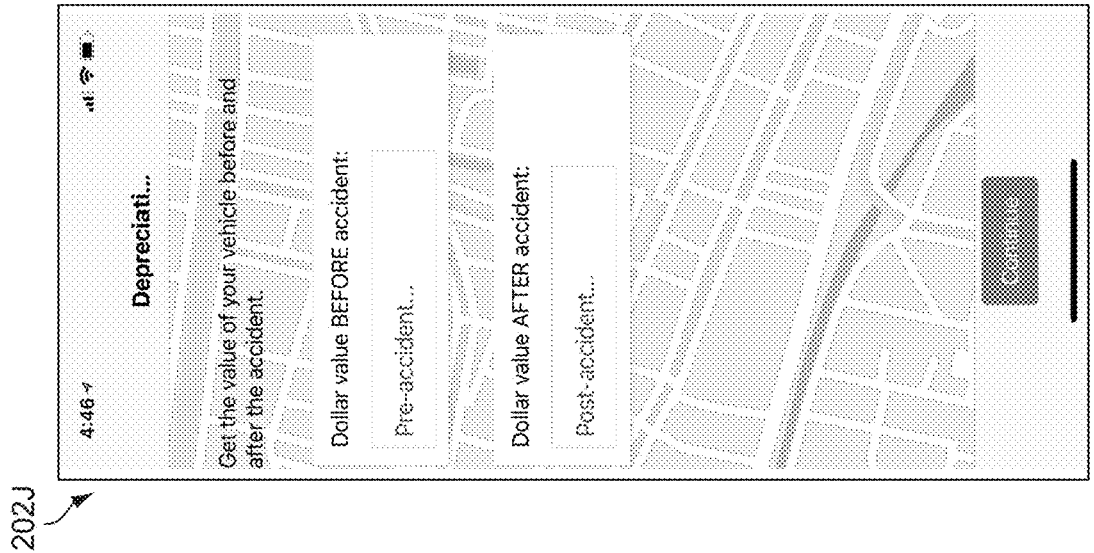
FIG. 2J illustrates an exemplary screenshot in which a user of the software service may enter value so a vehicle prior to an accident and after an accident.
Figure 2O:
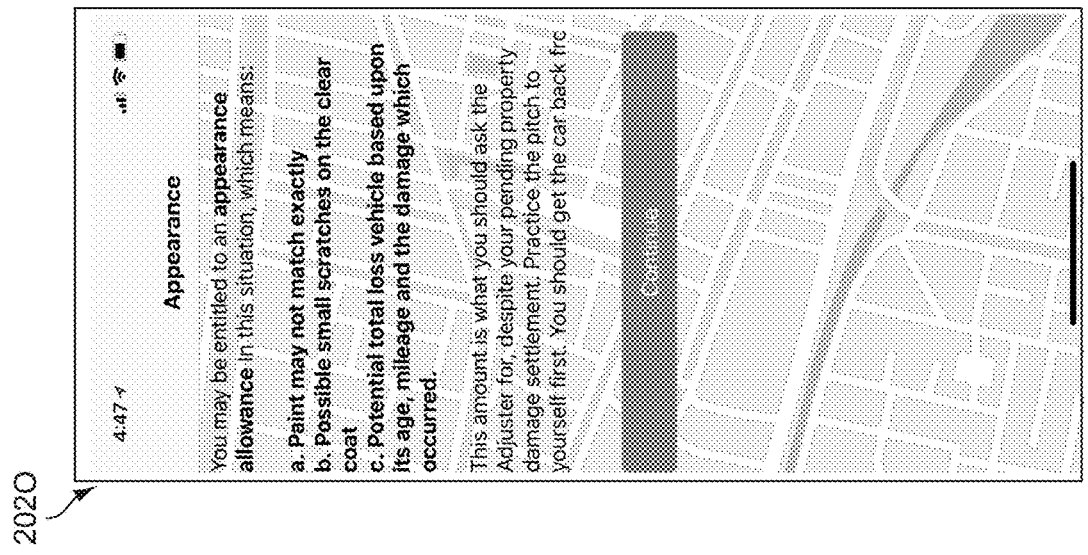
FIG. 2O illustrates an exemplary screenshot that explains an appearance allowance with respect to repairs made to a vehicle after a vehicle accident.
Figure 2N:
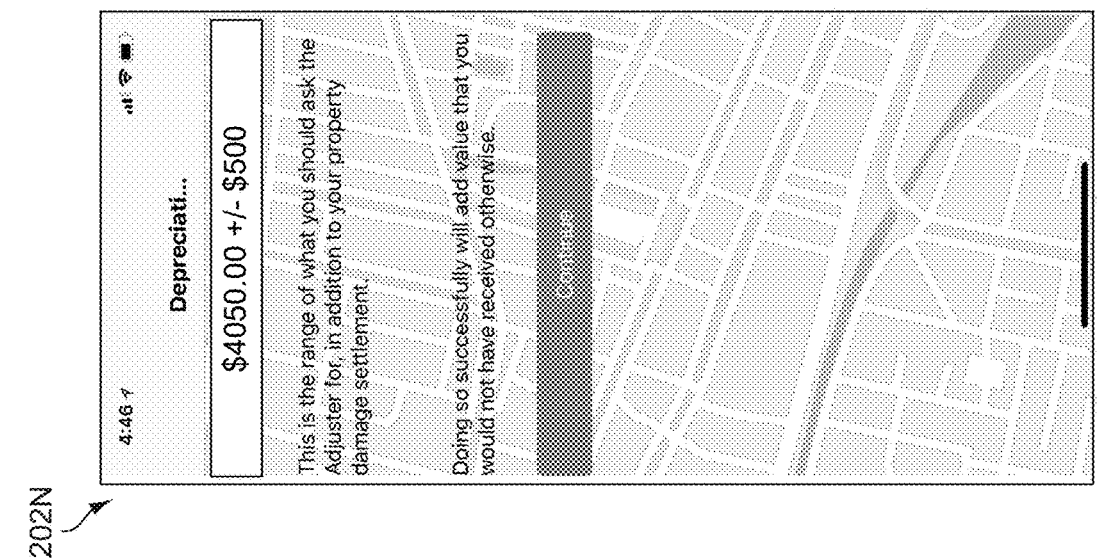
FIG. 2N illustrates an exemplary screenshot that lists a result of a depreciation value calculation based on data entered from the prior screen shots about the pre-accident and post-accident values of the vehicle.
Figure 2M:
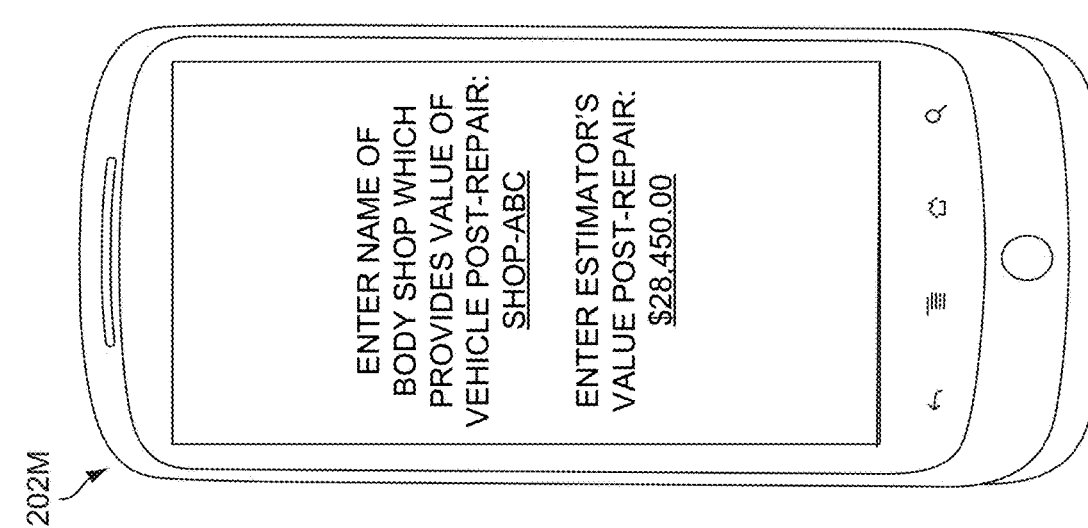
FIG. 2M illustrates an exemplary screenshot that allows a user of the software service to enter an estimate of a value for the vehicle after the vehicle has been repaired relative to the accident.
Figure 2R:
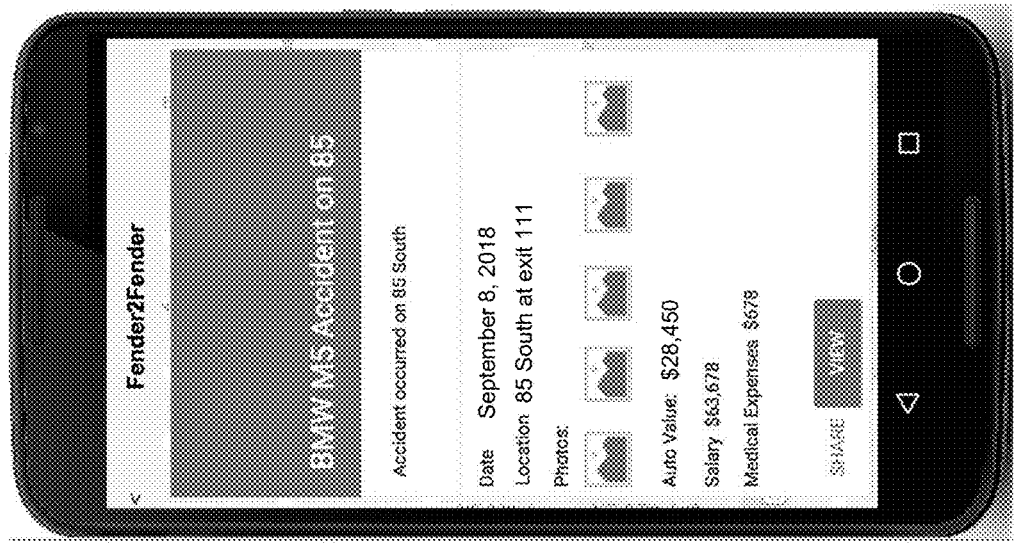
FIG. 2R illustrates an exemplary screenshot for a vehicle profile that was selected in FIG. 2Q.
Figure 2Q:
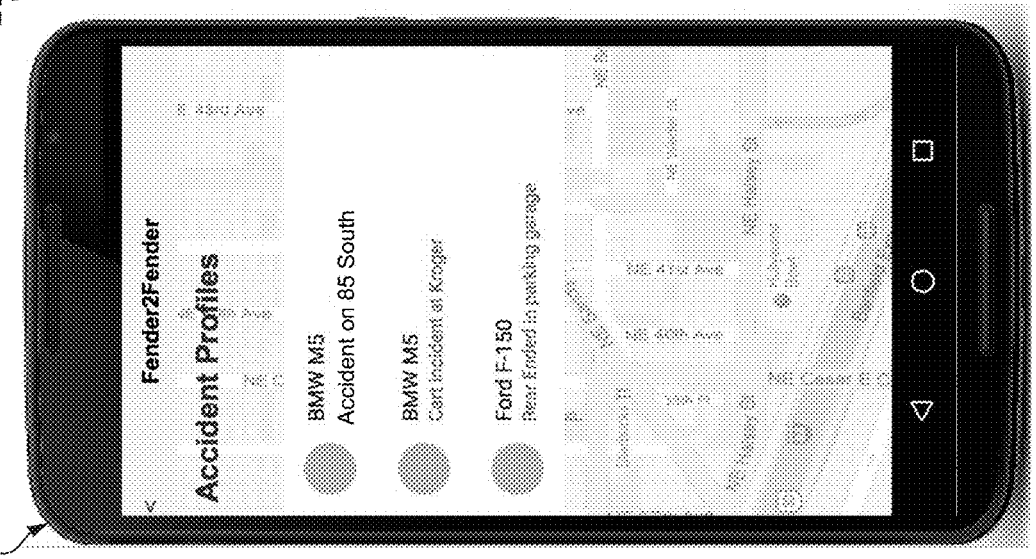
FIG. 2Q illustrates an exemplary screenshot in which a user can select a vehicle profile from the software service should the user have multiple vehicles being tracked by the software service.
Figure 2P:
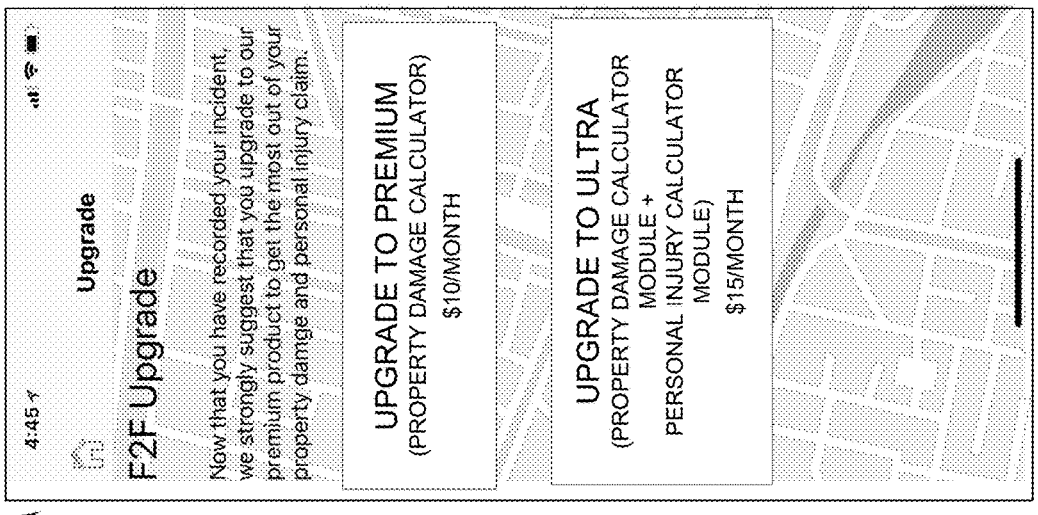
FIG. 2P is similar to FIG. 2I and illustrates an exemplary screenshot in which the user of the software service is presented with an option to upgrade the software service so that either property damage calculations and/or bodily injury calculations can be made with the software service.
Figure 2U:
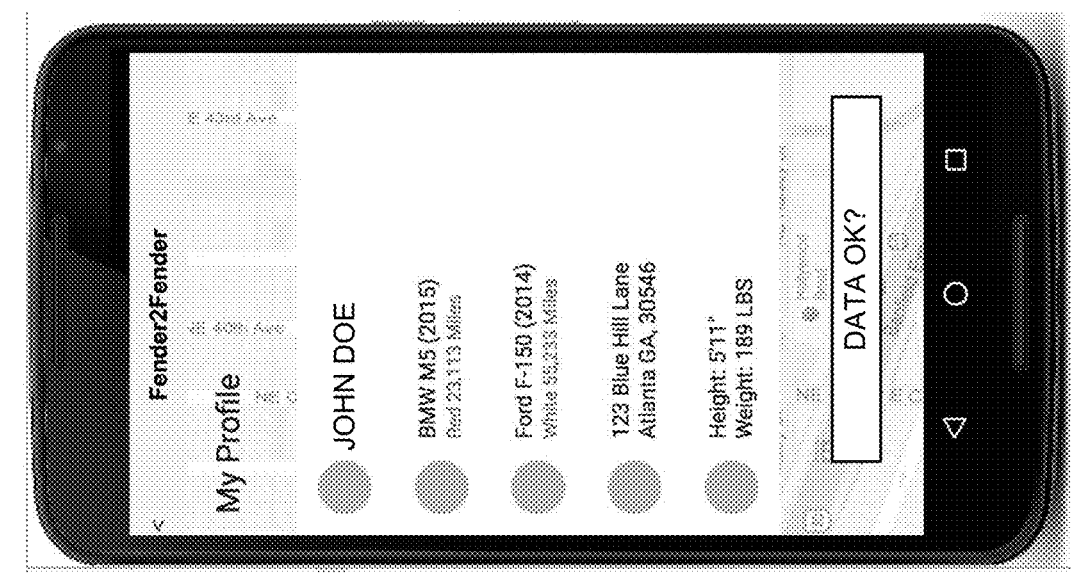
FIG. 2U illustrates an exemplary screenshot for presenting a user profile to a user to confirm which person on the account and which vehicle on the account with the software service will be used in the bodily injury calculations segment.
Figure 2T:
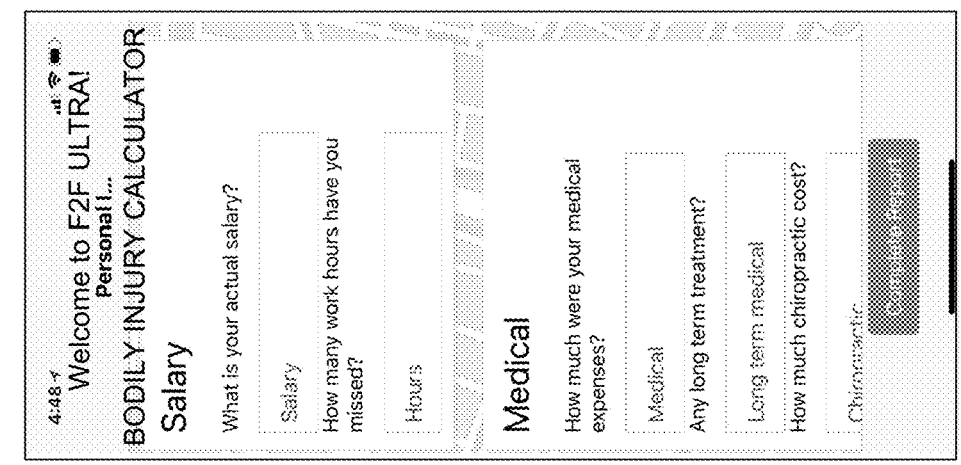
FIG. 2T illustrates an exemplary screenshot for collecting data relevant to bodily injury calculations to be made by the software service.
Figure 2S:
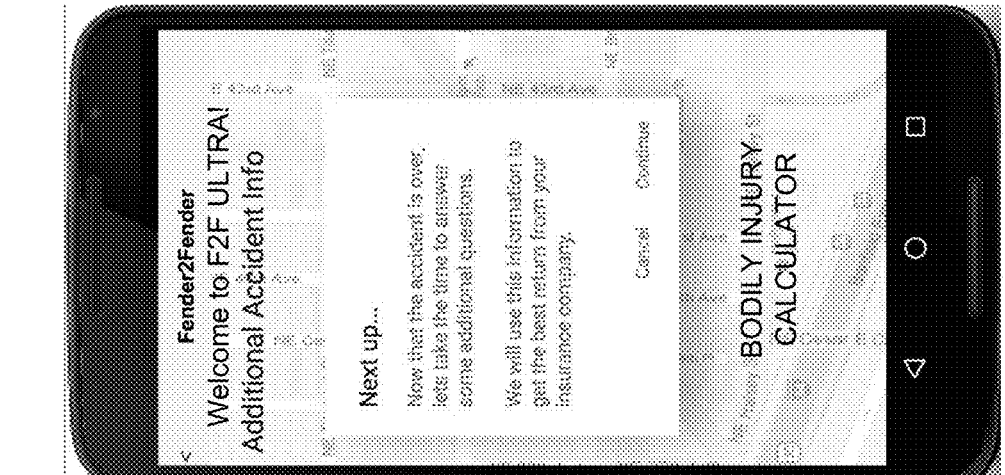
FIG. 2S illustrates an exemplary screenshot for welcoming a user to the bodily injury calculation segment of the software service.
Figures 1, 2X:
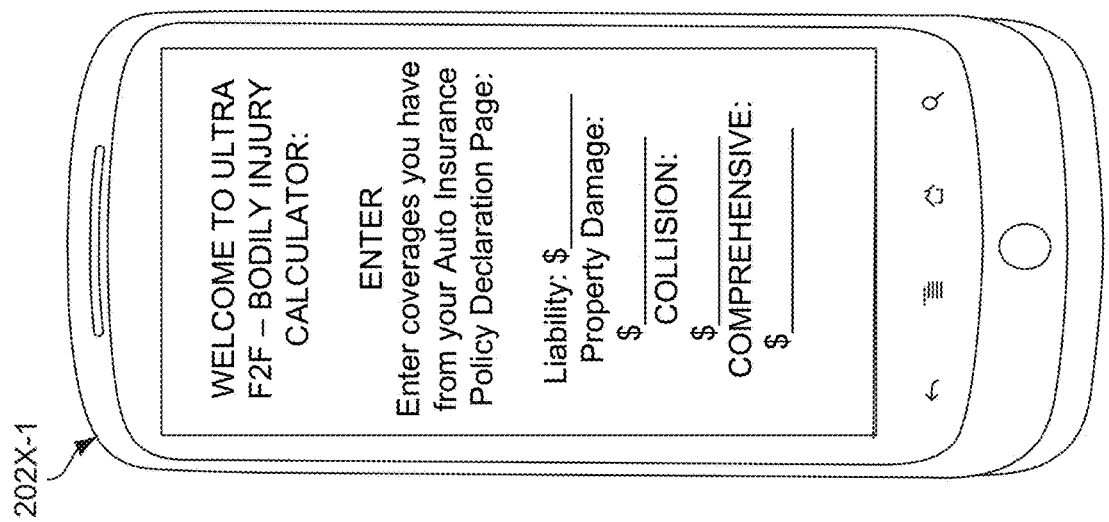
FIG. 2X-1 illustrates an exemplary screenshot for allowing a user of the software service to enter the insurance limits for his or her vehicle coverage.

One of the unique aspects of the system 101 is that the VAM-app 103 may be offered as a software as a service running on each PCD 105 of the system 101 illustrated in FIG. 1. The service may comprise allowing a subscriber operating his or her PCD 105 to display vehicle accident information and to share this vehicle accident information with insurance companies and/or legal counsel as needed. In other words, for a time-based flat fee, a subscriber with the VAM-app 103 of the system 101 may have the VAM-app 103 running on his/her portable computing device 105, such as a mobile phone, by just paying a flat fee on a monthly basis. Other flat fee arrangements for the electronic accident information management service via the VAM-app 103 beyond monthly subscriptions are possible and are included within the scope of this disclosure, such as weekly, daily, and/or annual subscriptions, just to name a few.

The system 101 may further comprise other computing devices 102 besides the vehicle accident manager server 102A. Other computing devices 102 include, but are not limited to, a computing device 102B for a third-party car valuation service; a computing device 102C for an insurance company; a computing device 102D for an accident attorney and/or law firm. The computing devices 102 and the portable computing device 105 may all be coupled together via a communications network 110. A secure/encrypted database 112 may also be coupled to the communication network 110. The secure/encrypted database 112 may comprise a sequential query language ["SQL"] database as understood by one of ordinary skill in the art. The secure database 112 may be managed by the vehicle accident status information server 102A which stores the customer profiles and accident profiles for the system 101.

While one preferred exemplary embodiment of the system 101 is for the property damage/bodily injury calculator module 108 (described in more details below) residing in the server 102A to perform several of the calculations described below and for the secure/encrypted database 112 to store the results of these calculations by module 108, it is very possible for the calculations to be performed locally by PCD 105 in other exemplary, less preferred embodiments of the system 101.

However, as PCDs 105 advance, and if a PCD 105 provides a secured, encrypted storage of data like that of database 112, then it is possible for calculations and subscriber data to be stored locally within a secured, encrypted storage device placed within a PCD 105. It is envisioned that if a PCD 105 has a secured, encrypted storage device contained within the PCD 105, then such storage should be compliant with any relevant government regulations and laws, such as, but not limited to, the Health Insurance Portability and Accountability Act (HIPAA) of the United States or other relevant laws in other, non-U.S. jurisdiction (i.e. Europe, Canada, Mexico, Japan, China, etc.).

But if a PCD 105 does not have any secured, encrypted storage available and/or the business entity running the server 102A does not want the property damage/bodily injury calculator module 108 to operate locally and/or store calculations locally, then in most, preferred exemplary embodiments, all data for a subscriber, including any property damage calculations and/or bodily injury calculations will be stored within the secured/encrypted database 112 as understood by one of ordinary skill in the art.

In this description, the term "portable computing device" ("PCD") 105 is used to describe any device operating on a limited capacity power supply, such as a battery. Although battery operated PCDs 105 have been in use for decades, technological advances in rechargeable batteries coupled with the advent of third generation ("3G") and fourth generation ("4G") wireless technology have enabled numerous PCDs 105 with multiple capabilities. Therefore, a PCD 105 may be a cellular telephone, a satellite telephone, a pager, a PDA, a smartphone, a navigation device, a smartbook or reader, a media player, a tablet computer, a combination of the aforementioned devices, a laptop computer with a wireless connection, and/or wearable products, among others.

The Administration ("Admin") module 104 of computer server 102A may receive the customer profile information from the portable computing device 105A running the vehicle accident management module/application 103A. The customer profile information may include, but is not limited to, information items like name, address, phone numbers and payment information. The admin module 104 may also receive vehicle profile information from the VAM-app 103A running on the PCD 105A. Further details of vehicle profiles will be described below.

The Admin module 104 may automatically generate alerts when it receives any messages from a vehicle on-board crash detection system 115 and/or a computing device 102E for a third party road-side assistance service provider. The vehicle on-board crash detection system 115 may comprise hardware and/or software that is designed to detect when a vehicle has been involved in a crash. Such systems 115 that currently exist include those sold under brands like ON-STAR®, and CHEVY-STAR® crash detection systems 115. Such systems 115 may communicate over the communications network 110 to the computing device 102E that provides the third party road-side assistance.

The Admin module 104 may also send alerts and receive additional information from the VAM-App 103 when an operator of the PCD 105 indicates that a vehicle has been involved in a accident. The Admin module 104 may generate data that produces several of the screen displays illustrated in FIGS. 2A-2Z which will be described in further detail below.

The Application programming interface (API) module 106 may comprise the main service point running on the server 102A for supporting Android operating system ("OS") and/or an Apple-based iOS applications running on a particular PCD 105. The API module 106 may also be used for web hooks with third party integrations and partners, like with the computing device 102B of a third-party car valuation provider which will be described below, and as understood by one of ordinary skill in the art.

The damage/injury calculator modules 108 may run on the server 102A. The damage/injury calculator modules 108 may support a background service which helps determine property damage and/or personal injurie(s) that may be caused by a vehicle accident. The damage/injury calculator module 108 may comprise a shared library of Services and Models that may be used by the Admin 104 and API 106 software modules.

Modules 104-108 may reside on a single computer server 102A or they may each reside on separate computer servers 102A (not illustrated in FIG. 1A). The server 102A may be coupled to a communications network 110, which may comprise the Internet. Each of the elements of the system 101 are coupled to the computer communications network 110 via communication links. The communication links illustrated in FIG. 1A may comprise wired and/or wireless communication links.

Wireless communication links include, but are not limited to, radio-frequency ("RF") links, such as, BLUETOOTH™ RF links, WIFI™ RF links, as well as infrared links, acoustic links, and other wireless mediums. Each of these elements of the system 101 may be coupled to one another through the computer communications network 110.

The computer communications network 110 may comprise a wide area network ("WAN"), the plain-old-telephone-system ("POTS"), a local area network ("LAN"), the Internet, or any combination of these and other networks. Through the network 110, the server 102A may communicate with the computing devices 102B/102C/102D/102E of the third-party car valuation service provider [102B]; insurance provider [102C]; computing device of legal counsel [102D]; and the third-party road-side assistance service provider [102E].

The computing devices 102B/105B//102C/105C//102D/105D for third-party car valuation service provider [102B]; insurance provider [102C]; computing device of legal counsel [102D] could use either a computing device 102 (server, laptop, desktop, etc.) or a portable computing device 105 (tablet pc, mobile phone, etc.) to access the server 102A via the communications network 110. Each PCD 105A that is a member of the system/service 101 running the VAM-App 103 may also communicate with the server 102A via the communications network 110.

The computing device 102B/105B for the third-party car valuation provider may help the VAM-App 103 calculate a pre-accident value of a vehicle that has a vehicle profile stored in the database 112 by a member/subscriber of the system 101. The third-party car valuation provider may comprise computer systems known as of this writing operating under the brand names of Kelly-Blue-Book®, True-Car®, CarGurus®, CarFax®, NADA®, and/or Edmunds® brands of car valuation services. The computing device 102B/105B may communicate with the API module 106 of the server 102A in order to generate the car valuation screen shots of FIGS. 2K and 2L described in further detail below.

Figure 2W:
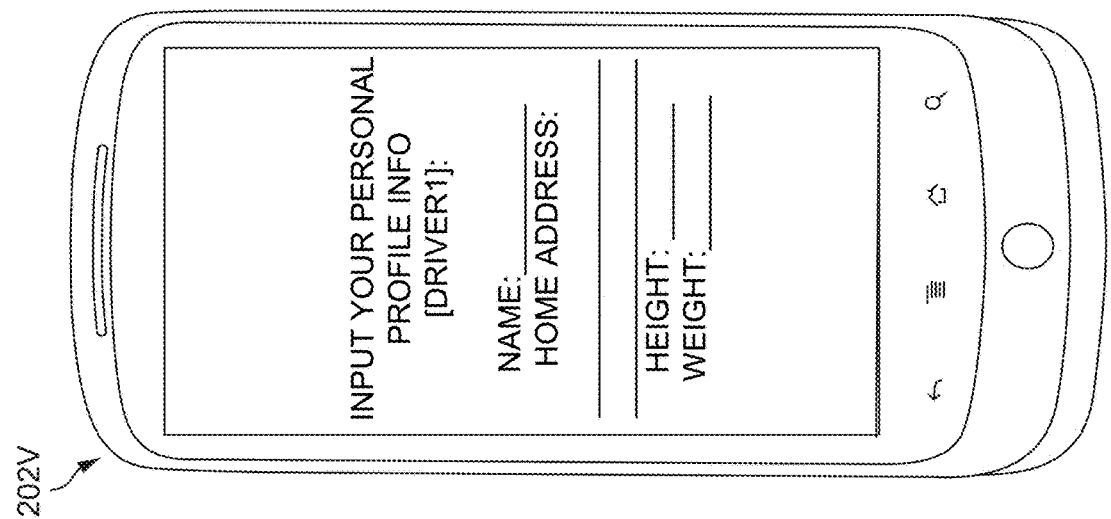
FIG. 2W illustrates an exemplary screenshot for collecting information about a person if such information was not previously collected by the software service.
Figure 2V:
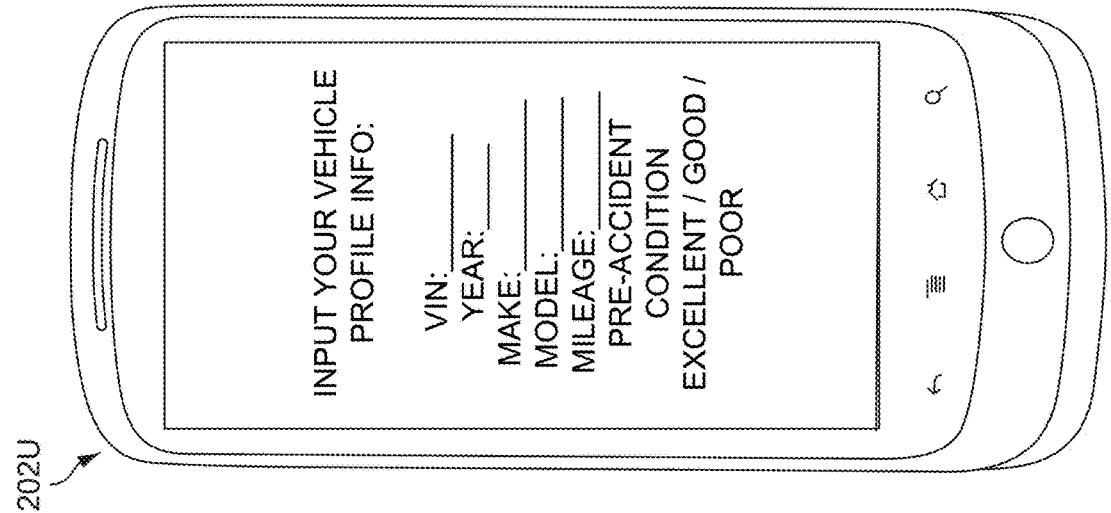
FIG. 2V illustrates an exemplary screenshot for collecting information about a vehicle if such information was not previously collected by the software service.
Figures 2, 2X, 3, 4:
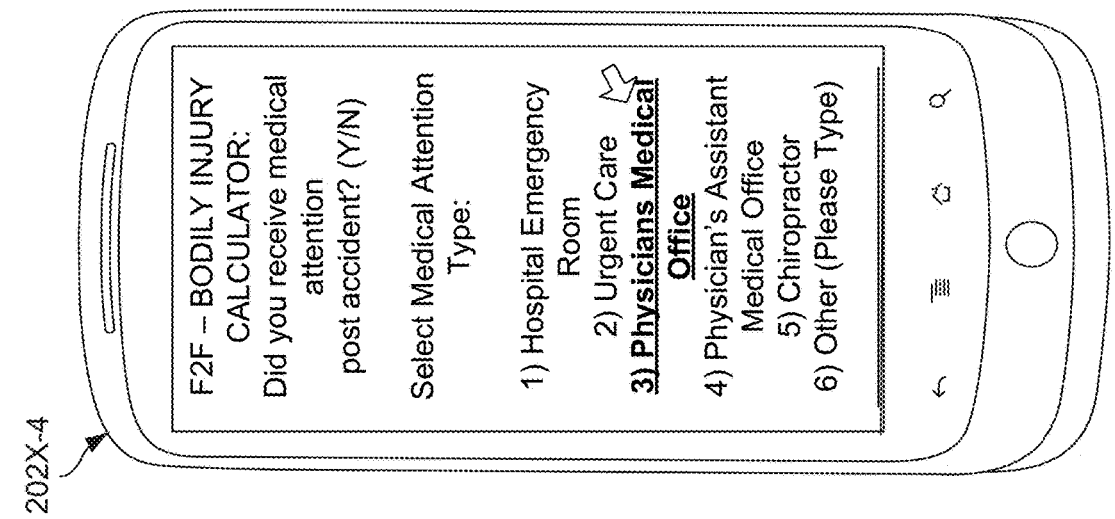
Figures 2, 2X, 3:
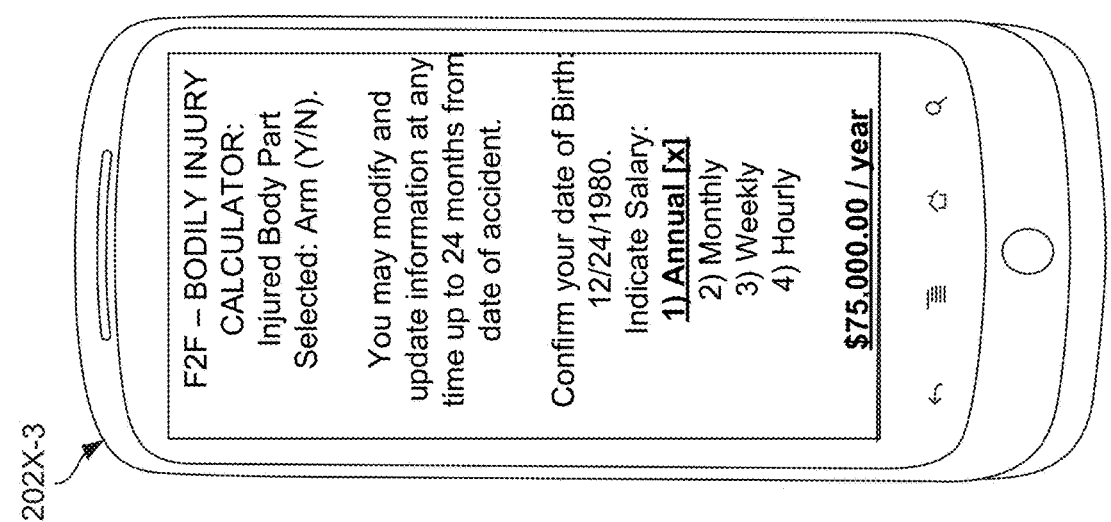
Figures 2, 2X:
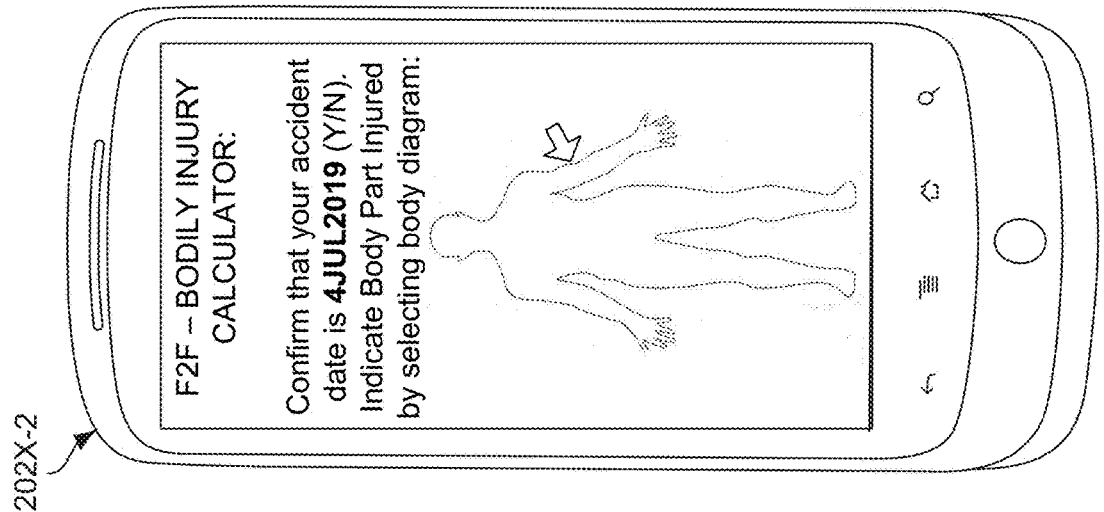
Figures 2, 2X, 3, 4, 5, 6, 7:
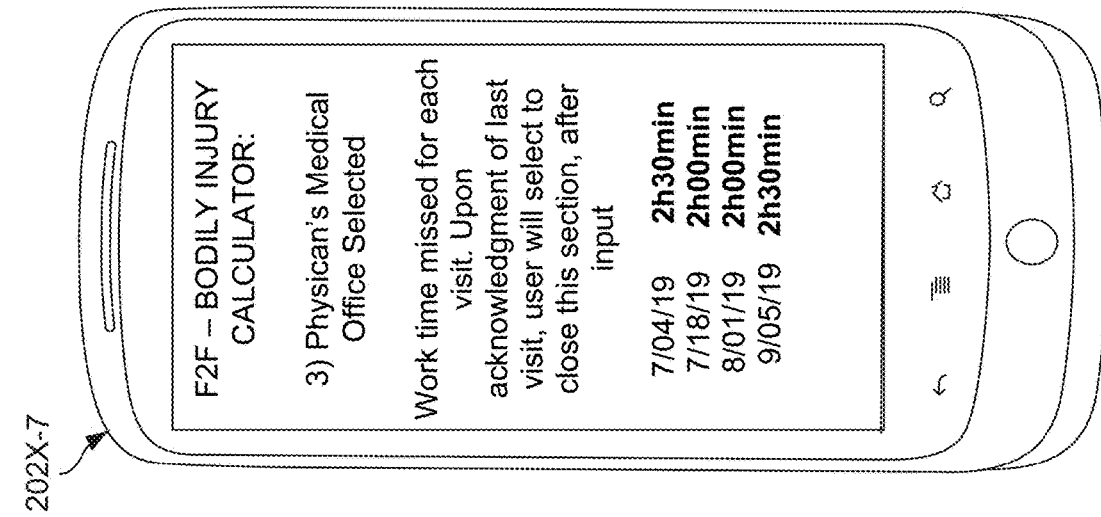
Figures 2, 2X, 3, 4, 5, 6:
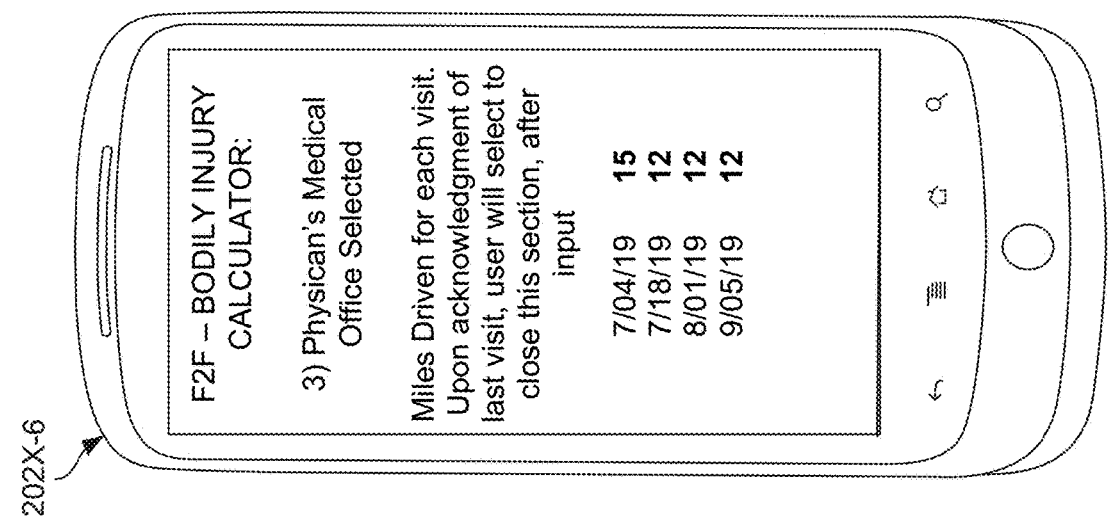
Figures 2, 2X, 3, 4, 5:
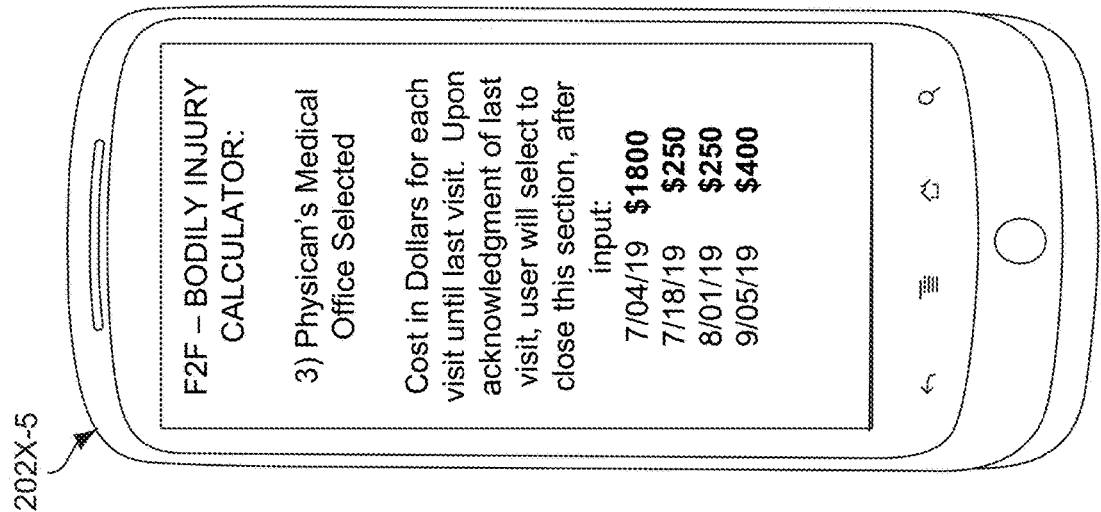
Figures 2, 2X, 3, 4, 5, 6, 7, 8, 9, 10:
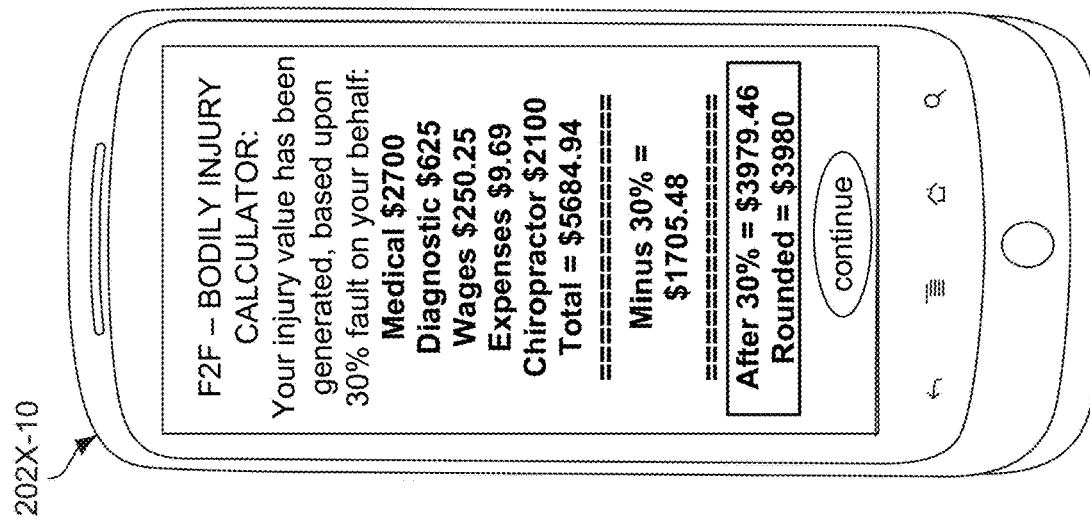
Figures 2, 2X, 3, 4, 5, 6, 7, 8, 9:
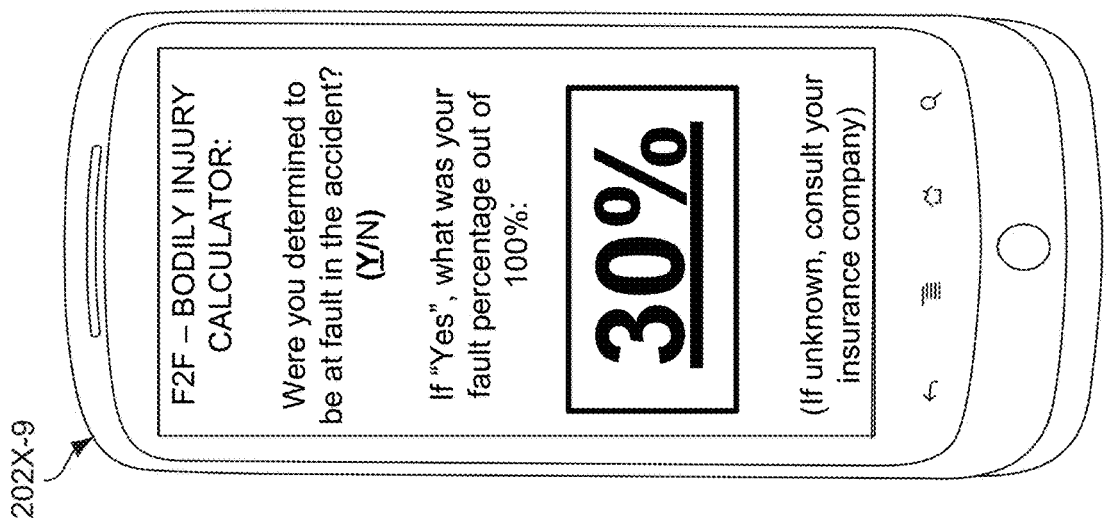
Figures 2, 2X, 3, 4, 5, 6, 7, 8:
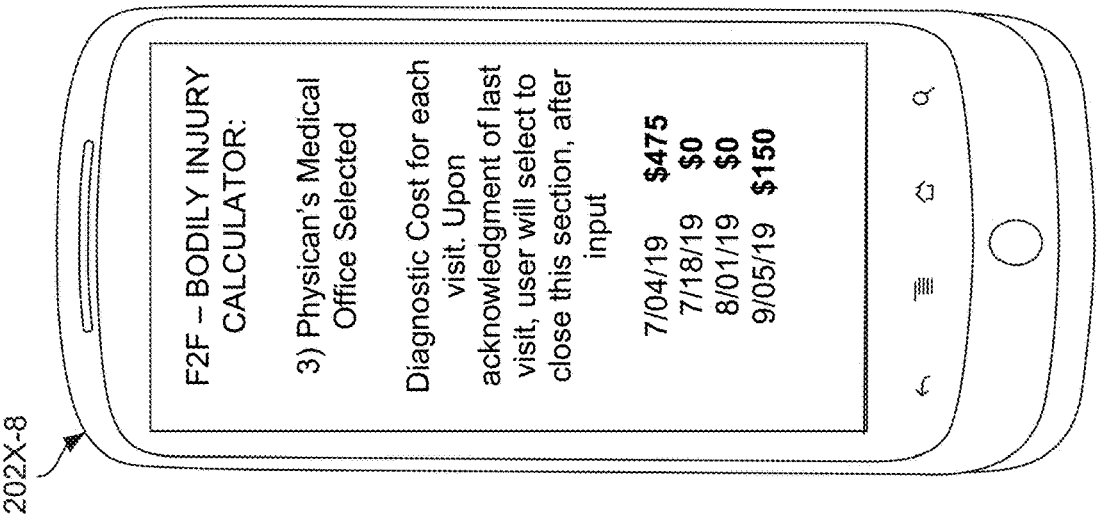
Figures 1, 2Y:
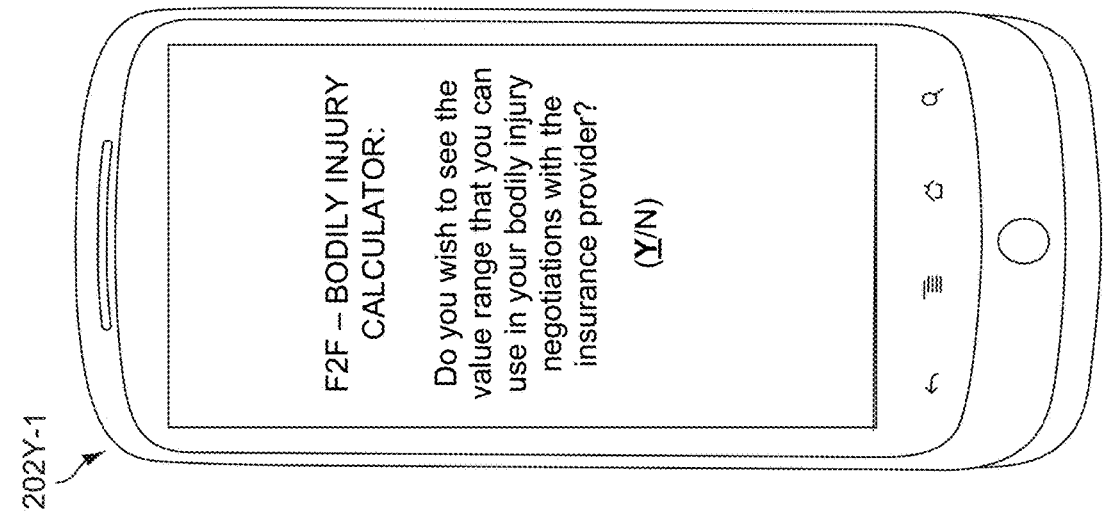
Figures 2, 2Y:
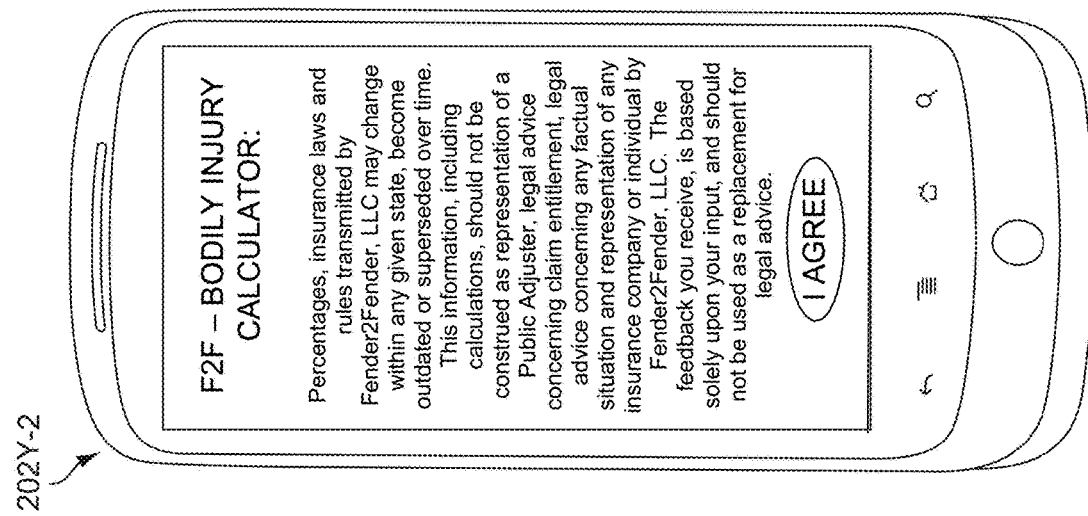
Figures 1, 2Z:
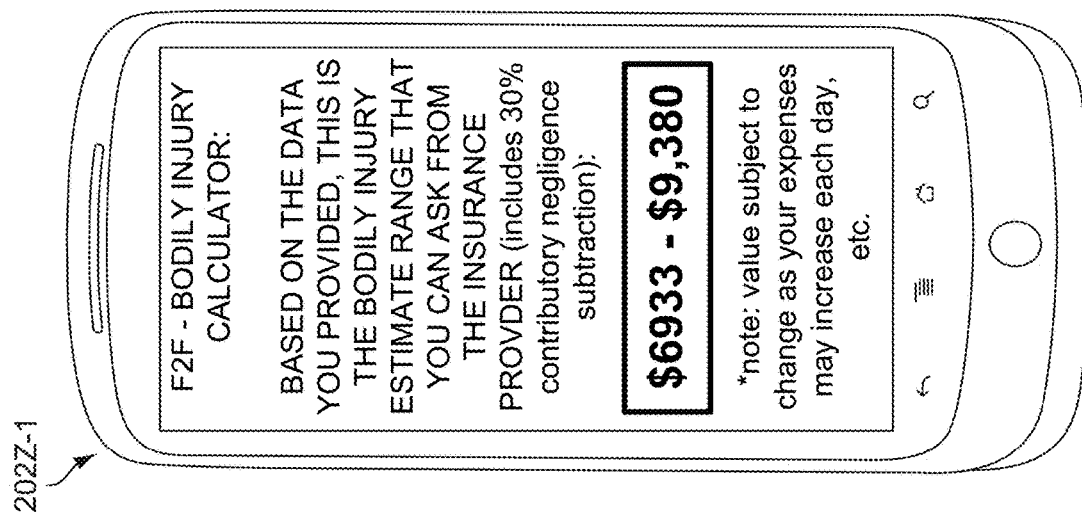
Figures 2, 2Z, 3, 4:
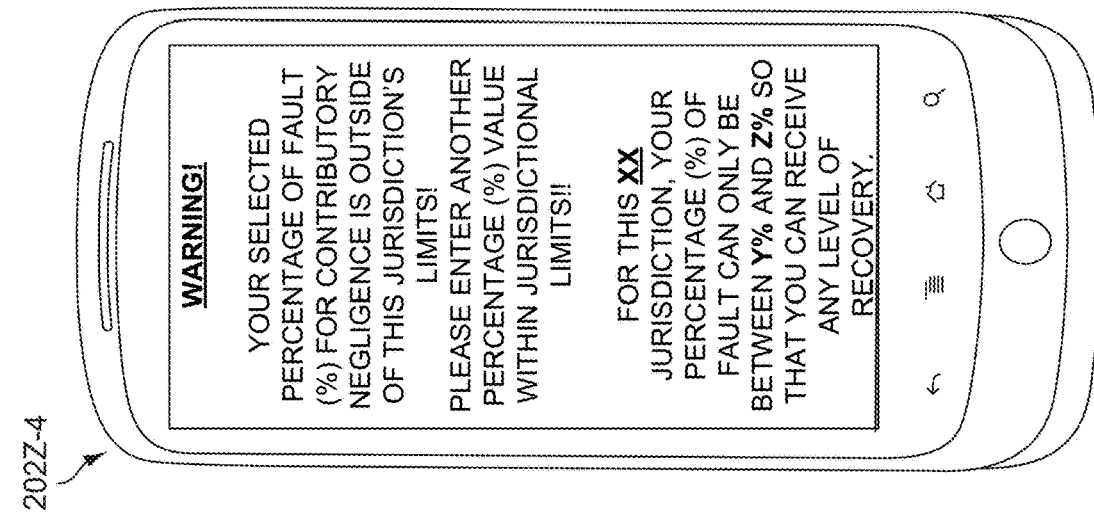
Figures 2, 2Z, 3:
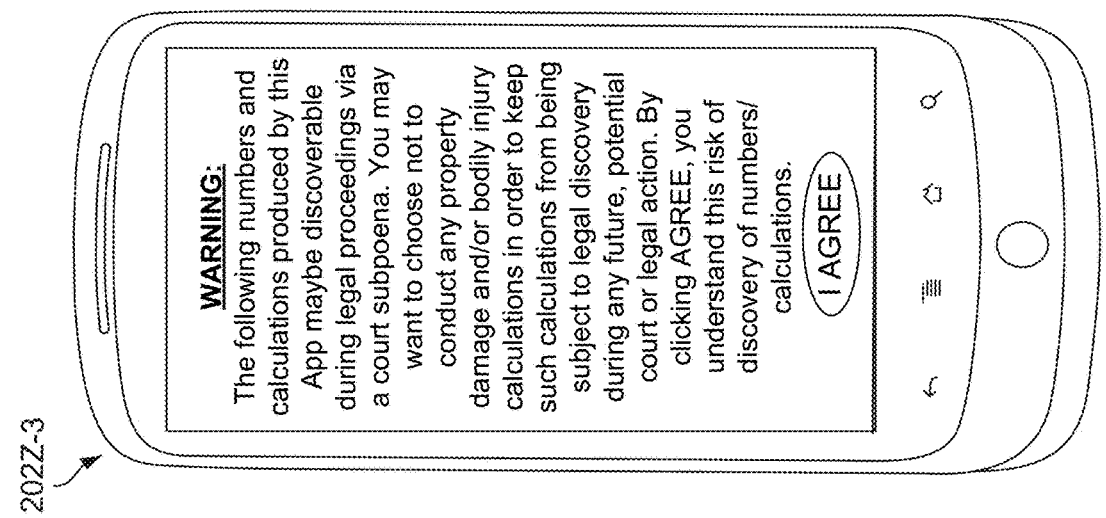
Figures 2, 2Z:
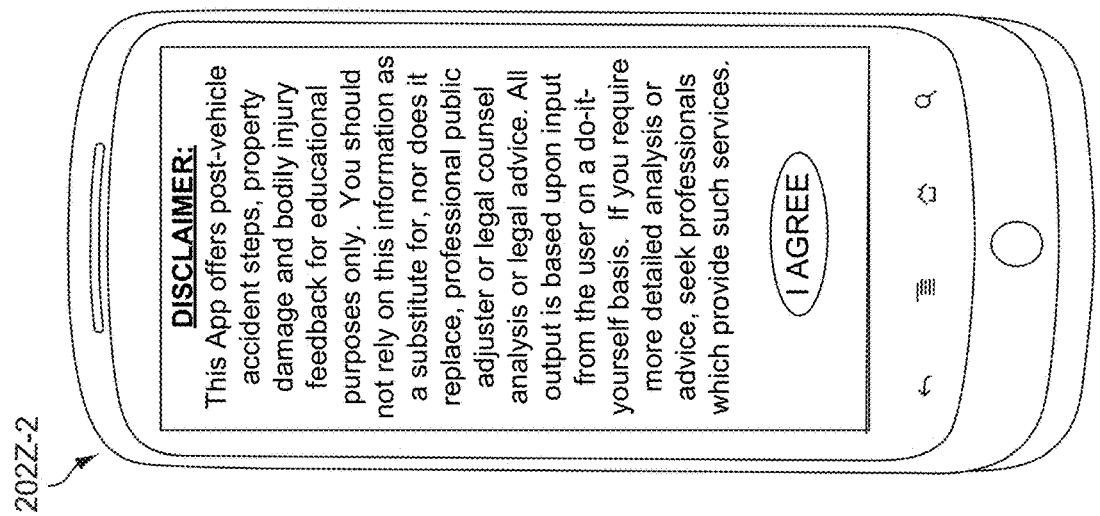

The VAM-App 103 running on the PCD 105A may be responsible for generating several of the screens shots illustrated in FIGS. 2A-2Z. The VAM-App 103 may be designed to help drivers collect information after an accident that can be used by insurance companies as well as legal counsel should any property and/or injury claims from an auto-mobile accident require legal action. The VAM-App 103, which may be sold under a brand, such as, but not limited to, Fender-to-Fender™ or F2F™, may help a driver collect and store relevant information immediately after a vehicle accident and which may help a driver to ask strategic questions to insurance companies several days or hours after an accident. The VAM-App 103 may create digital files comprising text and images of photographs which may be uploaded to the server 102A and then stored and saved in the database 112.

The VAM-App 103 may further comprise a text messaging monitoring module and a motion detection module. The text messaging monitoring module can "turn-off" text messaging features/functions supported by a portable computing device 105A, like a mobile phone. The text messaging monitoring module may also detect when an operator attempts to activate text messaging while an automobile is moving. Specifically, the text messaging monitoring module of the VAM-App 103 may use hardware, such as accelerometers and other motion detection hardware within a mobile phone 105 to determine if the mobile phone 105 is within an automobile.

The text messaging monitoring module may also monitor/sense if any text messaging applications are attempted to be accessed while the automobile is moving. And if so, the text messaging monitoring module may send an alert signal to the vehicle accident status information server 102A. When the vehicle accident status information server 102A receives this alert signal from the portable computing device 105A, then the server 102A may also generate an alert signal and send it across the communications network 110 to another portable computing device 105B, such as a second PCD 105B operated by a parent of the driver who is trying to access the text messaging application on the first PCD 105A.

The motion detection module of the VAM-App 103, like the text messaging monitoring module, may also use hardware, such as accelerometers and other motion detection hardware within a mobile phone 105 to determine if the mobile phone 105 is has been in an accident. The motion detection module VAM-App 103 may also be coupled to on-board diagnostics (OBD) CPU of an automobile. OBD CPUs also sense if air-bags of an automobile have been deployed. An OBD CPU may send a message to the motion detection module of the VAM-App 103 to alert the VAM-App 103 that an automobile has been in an accident. Similarly, and in addition to being coupled to the OBD CPU, the VAM-App 103 may also be coupled to the vehicle on-board crash detection system 115 which is described above. The on-board crash detection system 115 may send alert messages to the VAM-App 103 which, in turn, may send alerts about an accident/crash over the communications network 110 to the vehicle accident status information server 102A. Alternatively or in addition to being coupled to the VAM-App 103, the on-board crash detection system 115 may also communicate directly with the vehicle accident status information server 102A via the communications network 110 when the crash detection system 115 senses a vehicle crash.

Figure 3A:
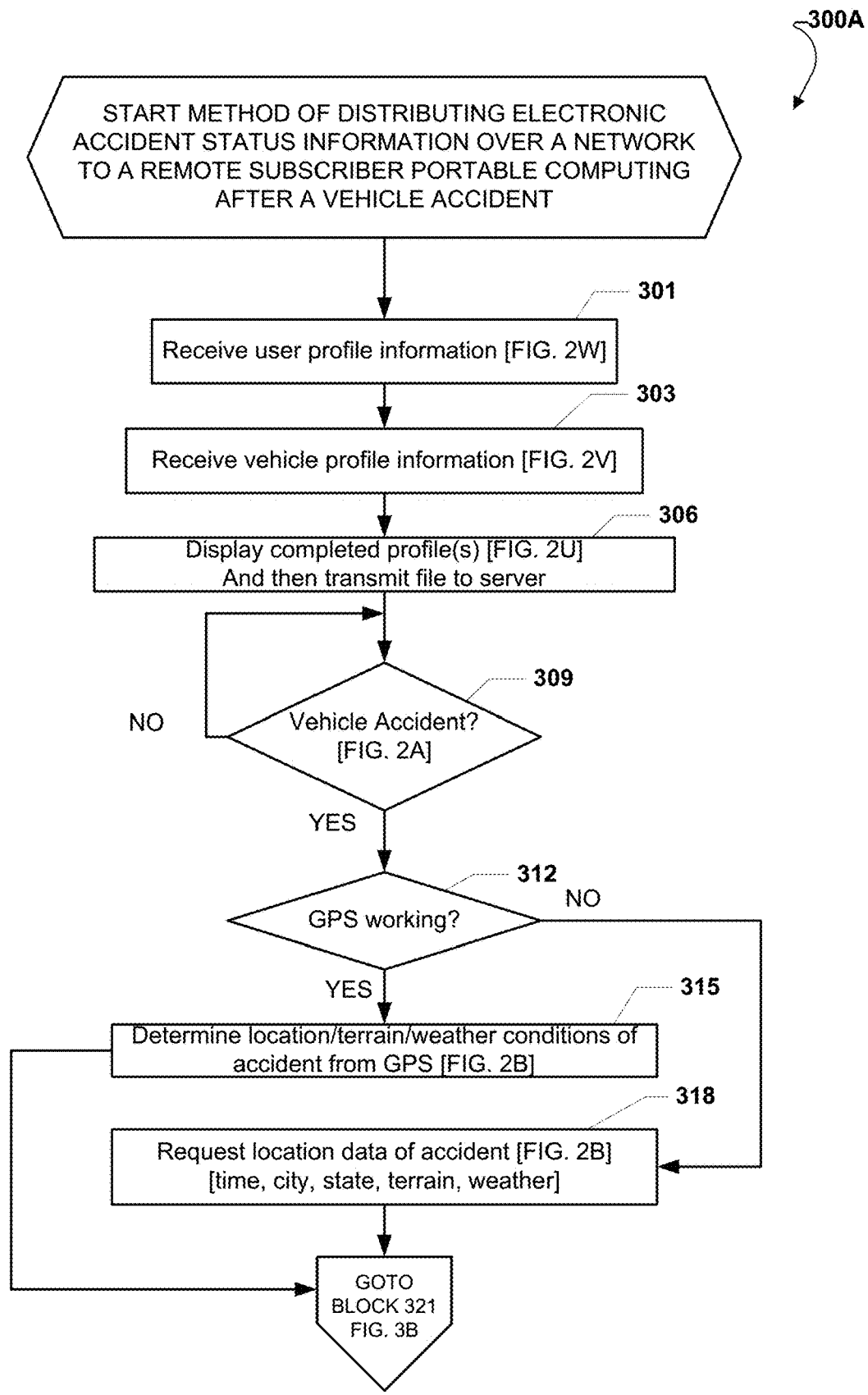
FIG. 3A illustrates an exemplary flow chart of a method for distributing electronic vehicle accident status information over a network to a remote subscriber portable computing device during and after a vehicle accident.

Referring now to FIG. 3A, this figure illustrates a flow chart of a method 300A for distributing electronic vehicle accident status information over a network 110 to a remote subscriber portable computing device 105 during and after a vehicle accident. Block 301 is the first step of method 300A.

In Block 301, the VAM-App 103 may receive user profile information such as illustrated in the screen shot 202W OF FIG. 2W. Screen shot 202W may be generated in response to an operator selecting the "register" option illustrated in screen shot 202A of FIG. 2A. User profile information includes, but is not limited to, the information requested in screen shot 202W. User profile information may include data such as name, home address, height, weight, payment information [i.e. credit card information, checking account information], etc.

Next, returning back to FIG. 3A, in block 303, the VAM-App 103 may then receive vehicle profile information for one or more vehicles to be associated with a single subscription account relative to the system 101. Such information may include, but is not limited to, the information requested in screen shot 202V of FIG. 2V. Exemplary vehicle information includes, but is not limited to, vehicle identification number (VIN), year of vehicle, make of vehicle, model of vehicle, mileage, and pre-accident condition rating of vehicle.

Next, in block 306, the completed profile information about the person and the vehicle may then be displayed such as illustrated in screen shot 202U of FIG. 2U. If the operator of the PCD 105 needs to make edits to the data, then the operator may use the touch-screen of the PCD 105 to select those data fields which may need edits. If the operator of the PCD 105 confirms that the profile data about the person and/or vehicle look OK, then the VAM-App 103 may transmit the personal and vehicle profile information from the file in the PCD 105 over the communications network 110 to the vehicle status information server 102A. The vehicle status information server 102A may relay this information back over the communications network and store it in one or more files in the SQL database 112.

Subsequently, in decision block 309 of FIG. 3A, the VAM-App 103 determines if a vehicle accident has occurred. As noted previously, the VAM-App 103 may automatically determine from motion detection module if the PCD 105 has experienced vibrations consistent with a vehicle accident. The motion detection module of the VA-App 103, as explained above, can monitor the accelerometers and other hardware devices of the PCD 105 which track motion of the PCD 105. Alternatively, or in addition to the motion detection module, the VAM-App 103 may be coupled to a vehicle on-board crash detection system 115 as explained above in connection with FIG. 1A. Alternatively, or in addition to the connections described above, the crash detection system 115 may also communicate directly with the server 102 which may relay crash status to the VAM-App 103. The VAM-App 103 in decision block 103 may also determine if the operator of the PCD 105 has also selected from screen shot 202A of FIG. 2A, that a vehicle accident has occurred.

If the inquiry to decision block 309 is positive, then the "YES" branch is followed to decision block 312. If the inquiry to decision block 309 is negative, then the "NO" branch is followed back in a loop, back to decision block 309 where the VAM-App 103 remains in a monitoring state to determine if a vehicle accident has occurred.

In decision block 312, the VAM-App 103 determines if the GPS unit 705 of the PCD 105 is functioning properly. The GPS unit 705 can supply the VAM-App 103 with geo-coordinates of the location of the PCD 105 which will usually be in about the same location within a vehicle that may house the PCD 105. If the GPS unit 705 is not functioning properly and/or if the operator has not granted the VAM-App 103 access to the GPS unit 705, then the "No" branch is followed to block 318.

If the inquiry to decision block 312 is positive, meaning the GPS Unit 705 of the PCD 105 is functioning properly and the VAM-App 103 has access to the GPS Unit 705, then the "Yes" branch is followed to block 315 in which the VAM-App 103 determines the geo-coordinates of the PCD 105. In addition to securing the geo-coordinates of the PCD 105, the VAM-App 103 may also secure other information based on the geo-coordinates such as, but not limited to, relative terrain, and current weather conditions.

In this block 315, the VAM-App 103 may use the geo-coordinates from the GPS Unit 105 to access other data about the location of the PCD 105. The VAM-App 103 may access a digital terrain map via the computer communications network 110 to determine the relative terrain of the location [i.e.—flat, hilly, mountainous, curves in the road, etc.]. The VAM-App 103 may also access weather data via the computer communications network to secure weather data about the present location of the PCD 105 [i.e.— sunny, rainy, snowy, windy, etc.]. In this block 315, screen shot 202B of FIG. 2B may be displayed. From block 315, the method 300A may proceed to block 321 of FIG. 3B.

In block 318, which is followed from the "No" branch of decision block 312 meaning that the GPS Unit 705 is not functioning properly and/or the VAM-App 103 may not have access to the GPS Unit 705, the VAM-App 103 may ask the operator of the PCD 105 to supply the location data such as, but not limited to, street address, city, state, and zip code as well as other data such as, but not limited to, the relative terrain of the location [i.e.—flat, hilly, mountainous, curves in the road, etc.] and the weather data about the present location of the PCD 105 [i.e.—sunny, rainy, snowy, windy, etc.]. The VAM-App 103 may just ask for the address information alone from the operator/subscriber of system 101 and then secure the relative terrain and weather conditions data from the computer communications network 110 in this block 318. From block 318, the method 300A may continue onto block 321 of FIG. 3B.

Figure 3B:
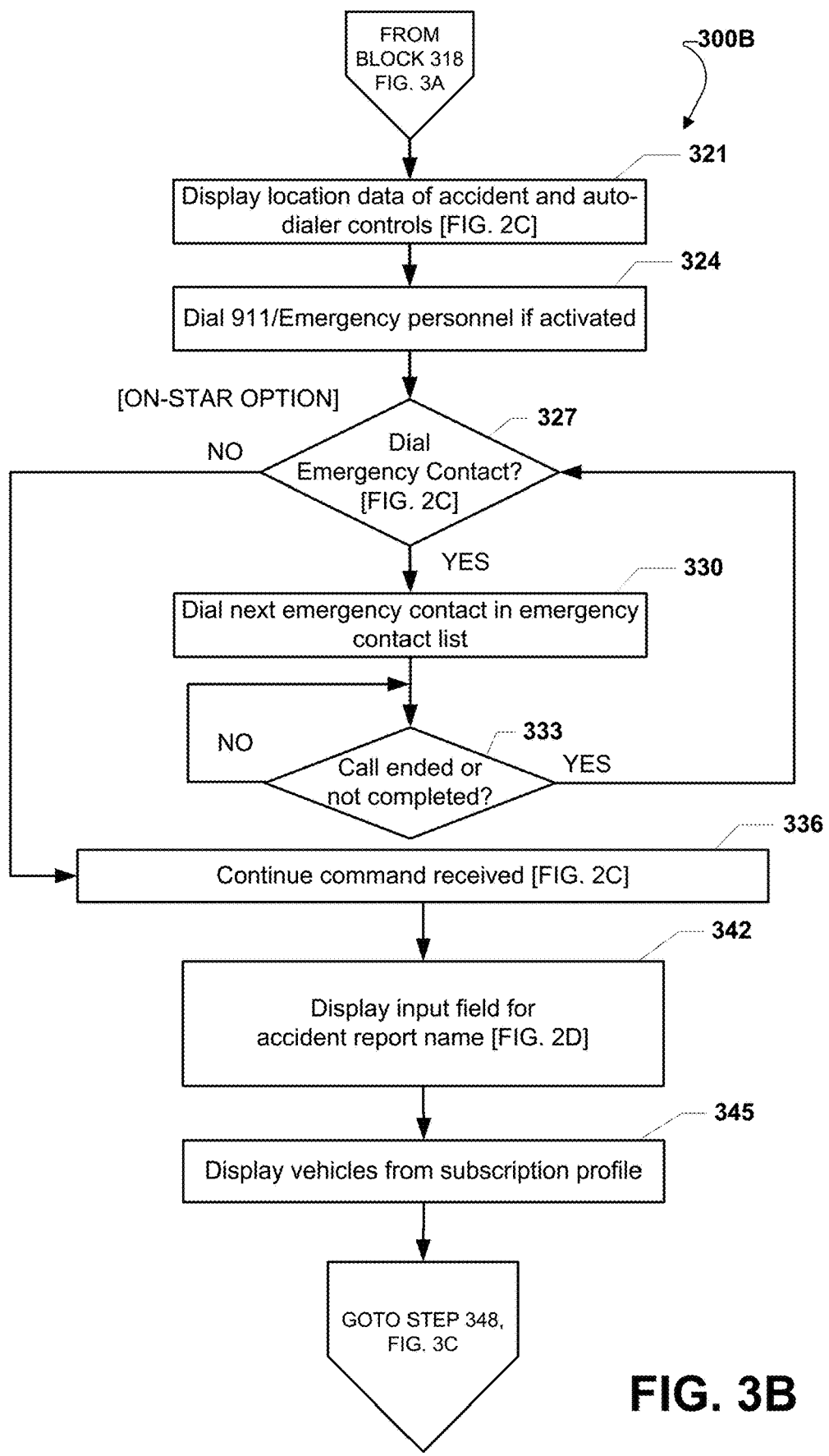
FIG. 3B is a continuation flow chart of FIG. 3A.

Referring now to FIG. 3B, in block/step 321 the VAM-App 103 may display the location data of the accident and a plurality of auto-dialer controls as illustrated in screenshot 202C of FIG. 2C. The auto-dialer controls may comprise commands to auto-dial the number "911" as known in the United States as well a command to auto-dial an emergency contact that has been identified in the subscriber's profile.

In step 324, the VAM-App 103 may dial "911" if that command is selected by the subscriber. Next, in decision block 327, the VAM-App 103 may determine if the subscriber has selected the dial an emergency contact command as illustrated in FIG. 2C. If the inquiry to decision step 327 is positive, then the "Yes" branch is followed to step 330 in which the VAM-App 103 dials the next emergency contact listed in the subscriber's profile. The word "next" is used here to mean that the subscriber may have more than one emergency contact listed in their profile. When the subscriber selects the dial emergency contact command in block 327, the VAM-App 103 dials the first emergency contact and uses a pointer to track if more than one emergency contact is present in the subscriber's profile. When the subscriber selects the dial the emergency contact command again, the pointer shifts to the next emergency contact listed in the subscriber's profile so that the "next" listed contact receives the phone call.

In an alternative exemplary embodiment when the VAM-App 103 is integrated with the crash detection system 115, the dial emergency contact command may initiate a phone call with the third-party/vendor associated with the crash detection system 115, such as ON-STAR® or CHEVY-STAR® brand of crash detection systems 115.

In decision step 333, the VAM-App determines if the call to the emergency contact has ended or was incomplete. If the inquiry to decision block 333 is negative, then the "No" branch is followed back to decision block 333 again. If the inquiry to decision block 333 is positive, then the "Yes" branch is followed back to decision block 327.

If the inquiry to decision block 327 is positive, then the "Yes" branch is followed to block 336 in which a "Continue" command is received. Subsequently, in block 342, an input field is displayed on the PCD 105A such as illustrated in screenshot 202D of FIG. 2D. The subscriber has the ability to assign a unique file name for this accident data being tracked by the VAM-App 103. Next, in block/step 345, the VAM-App 103 may display a listing of vehicles having vehicle profiles where the subscriber can select which vehicle was involved in the accident/crash. The method 300 then continues to step 348 of FIG. 3C.

Figure 3C:
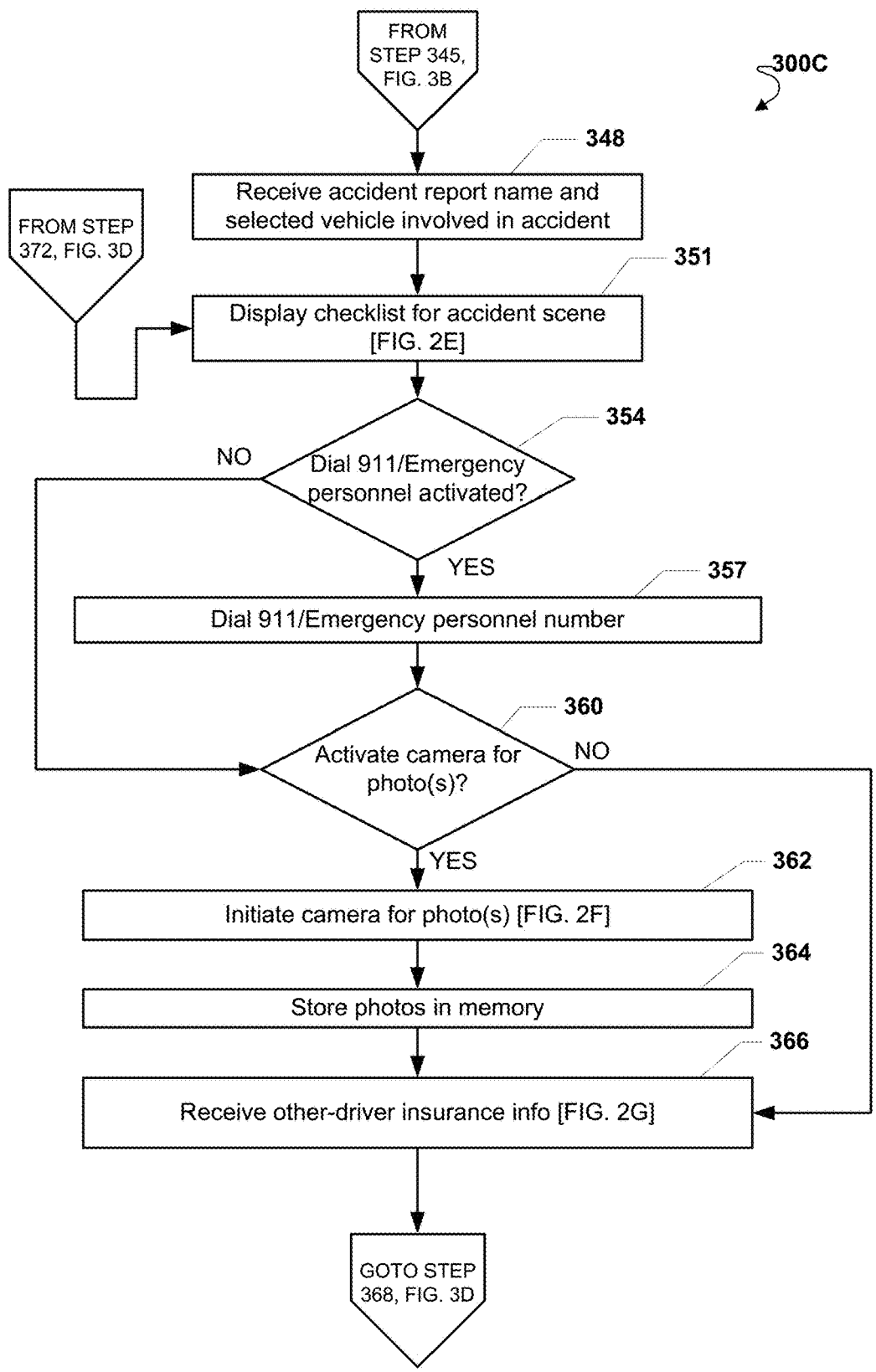
FIG. 3C is a continuation flow chart of FIG. 3B.

Referring now to FIG. 3C, the method 300C continues to step 348 in which the VAM-App 103 receives the accident report name and the selected vehicle involved in the accident. Next in step 351, the VAM-App 103 displays a checklist for the accident scene in screenshot 202E of FIG. 2E. What is unique about the checklist of screenshot 202E is that each item of the list must be checked-off/completed before the subscriber may move on to another display. The list may comprise the following elements: remain calm item; do not admit fault item; call emergency personnel item; file a police report; take photos item; take photos of impact areas; take photos of license plates/tags of all vehicles in the incident; number of vehicles item; policy provider item; policy holder item; and policy/plan/account number item.

Next, in decision step 354, the VAM-App 103 determines if the dial 911/emergency personnel command has been activated. If the inquiry to decision step 354 is negative, then the "No" branch to decision step 360. If the inquiry to decision step 354 is positive, then the "Yes" branch is followed to step 357. In step 357, the emergency personnel number is dialed by the VAM-App 103.

Next, in decision step 360, the VAM-App 103 determines if the photo command has been activated/selected. If the inquiry to decision step 360 is negative, then the "No" branch is followed to step 366. If the inquiry to decision step 360, then the "Yes" branch is followed to step 362. In step 362, the camera of the PCD 105A is activated. Next, in step 364, for any photos taken of the accident scene and/or vehicles, such as illustrated in FIG. 2F, the VAM-App 103 associates the photos with the accident name assigned by the subscriber in step 348 while the photos are stored locally in memory on the PCD 105A.

Next in block 366, the VAM-App 103 may receive the other-driver insurance information. When the other-driver insurance information item in the checklist of FIG. 2E is selected, the VAM-App 103 in response to this selection may display FIG. 2G which list data input fields for the subscriber to provide the other driver insurance information, which may include, but is not limited to, insurance provider company name, policy holder name for other driver, and account number of other driver insurance. Once the data fields of FIG. 2G are completed, the VAM-App 103 may return to the check-list display as illustrated in FIG. 2H which shows all or most of the checklist items as completed (i.e. radio buttons present on the screenshot 202H of FIG. 2H with items filled-in with a solid color).

Figure 3D:
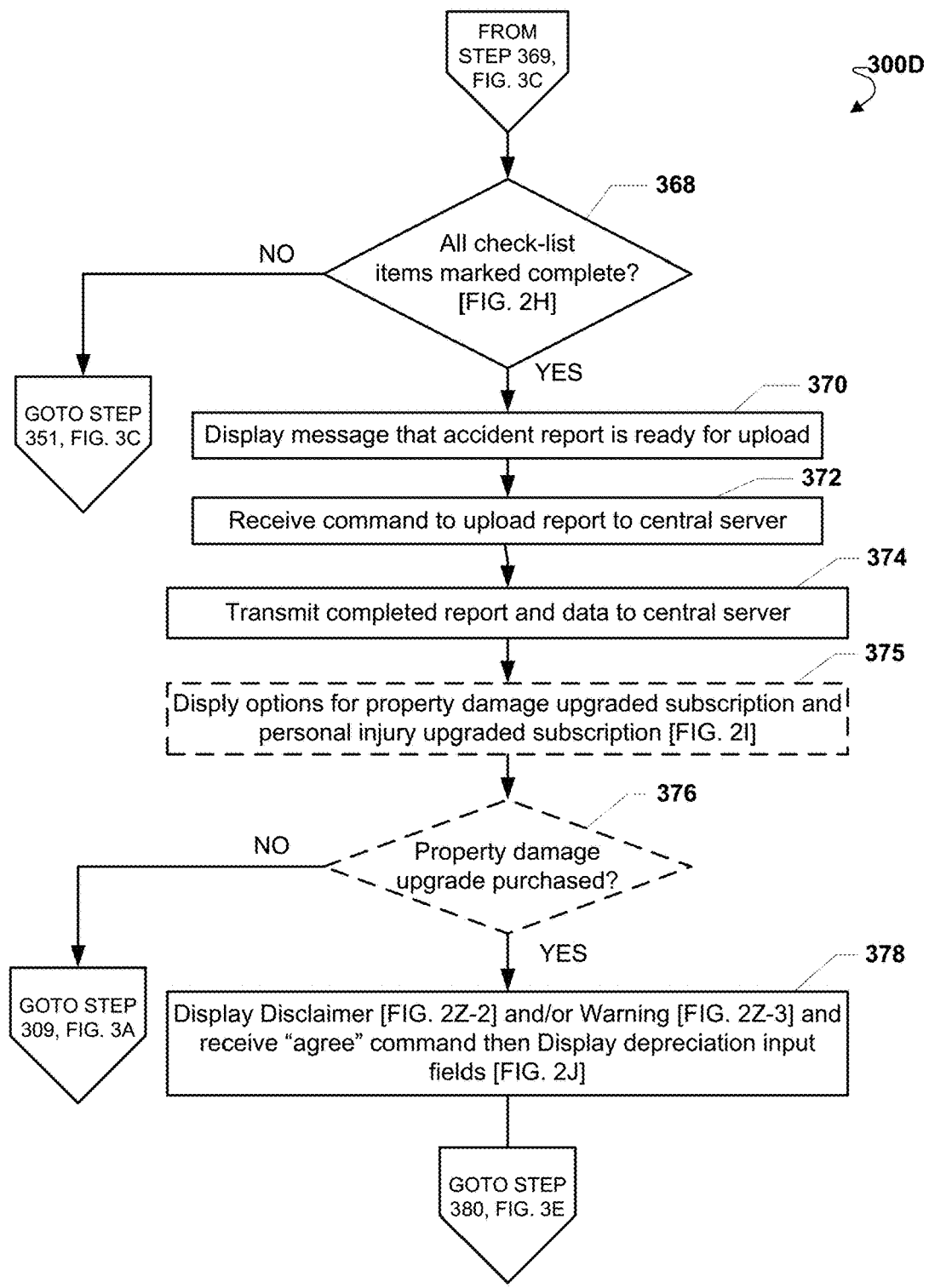
FIG. 3D is a continuation flow chart of FIG. 3C.

From step 366 of FIG. 3C, the method 300 continues to decision step 368 of FIG. 3D. In decision step 368, the VAM-App 103 determines if the all the check-list items as illustrated in 202H of FIG. 2H are completed. If the inquiry to decision step 368 is negative, then the "No" branch is followed to step 351 of FIG. 3C. If the inquiry to decision step 368 is positive, then the "Yes" branch is followed to step 370 in which the VAM-App 103 may display a command button that indicates that the vehicle report is ready for upload to the accident information server 102A. Step 370 corresponds with screenshot 202H of FIG. 2H which has a selectable screen command at the bottom of the screen.

In step 372, the VAM-App 103 receives the command to upload the vehicle report which includes all of the items from the check-list illustrated in FIG. 2H. The VAM-App 103 then uploads the vehicle report to the server 102A via the communications network 110 in step 374. In this step 374, the vehicle report may be relayed to the secure database 112 from the server 102A. Alternatively, the server 102A may direct the entire report to be uploaded to the database 112 where the server 102A creates an association with the report name for the text and photograph files that are stored on the secure database 112. This means that the server 102A may not receive the vehicle report file(s) but only have access to the file or files stored on the secure database 112, which may comprise a SQL database as understood by one of ordinary skill in the art.

Next, in optional step 375, options for a property damage calculation upgraded subscription and personal injury calculation upgraded subscription may be displayed on the PCD 105 as illustrated in FIG. 2I. Steps 375 and 376 are illustrated with dashed lines to indicate that this step is optional. That is, the method 300 may exclude steps 375 and 376 and include the property damage calculation and/or personal injury calculation as part of a single subscription according to another exemplary embodiment.

However, if separate subscriptions and additional fees are desired, then step 375 and screen shot 202i of FIG. 2I may be included. Further, if optional step 375 is included in method 300, then optional decision block 376 may be included as well since decision block 376 determines if the property damage upgraded subscription has been purchased. It is noted that the property damage calculations and personal injury calculations are generally completed several days after any vehicle accident and usually when the subscriber has left the scene of the vehicle accident which caused either the property damage to the vehicle and/or personal injury to the subscriber or a subscriber's passenger(s), or all of the above. Further, the property damage calculations may also not be determined/calculated until any repairs to the vehicle have been performed/completed.

If the inquiry to decision block 376 is negative, then the "No" branch is followed back to step 309 of FIG. 3A. If the inquiry to decision block 376 is positive, then the "Yes" branch is followed to step 378 in which a disclaimer, such as illustrated in FIG. 2Z-2, and/or Warning, such as illustrated in FIG. 2Z-3 are presented. This disclaimer presented in screenshot 202Z-2 of FIG. 2Z-2 and warning presented in screenshot 202Z-3 of FIG. 2Z-3 may require the user of the VAM-App 103 to select an "agree" command before continuing to the property damage calculation section of the software service. Once the "agree" command is received, then the VAM-App 103 may then display the depreciation input fields of screenshot 202J of FIG. 2J. The method 300 then continues to step 380 of FIG. 3E.

In decision block 380, the VAM-App 103 determines if the subscriber has selected the pre-accident value field of screenshot 202J of FIG. 2E. If the inquiry to decision block/step 380 is negative, then the "No" branch is followed to decision step 384. If the inquiry to decision step 380 is positive, then the "Yes" branch is followed to step 381 in which the pre-accident data fields of 202K of FIG. 2K are displayed on the PCD 105.

In step 382, after the PCD 105 receives the data for the pre-accident data fields of FIG. 2K, which may include, but are not limited to, fields like automobile make, automobile model, automobile manufacture year, and current mileage of the vehicle. Once this data is received, the VAM-App 103 may transmit this data over the communications network 110 to the sever 102A. The server 102A via the API module 106 may relay this data to the computing device 102B/105B of a third-party car valuation provider, such as, but not limited to KELLY BLUE BOOK® and NADA® brand valuation providers known as of this writing.

Next, in block 383, the API module 106 of the server 102A may receive the pre-accident value(s) for the vehicle from the third-party valuation device 102B/105B. The API module 106 may relay these value(s) to the admin module 104 which, in turn, transmits these values over the communications network 110 to the display of the PCD 105 such as illustrated in screenshot 202L of FIG. 2L.

Next, in decision step 384, it is determined if the post-accident value field of screenshot 202J of FIG. 2J has been selected. If the inquiry to decision step 384 is negative, then the "No" branch is followed back to step 380 of FIG. 3E. If the inquiry to decision step 384 is positive, then the "Yes" branch is followed to step 385 in which the post-accident value fields are displayed such as illustrated in screenshot 202M of FIG. 2M. The post-accident field values may include, but are not limited to, a name of a body-shop which has completed any vehicle repairs and a professional estimator's value of the post-accident repair.

Figure 3E:
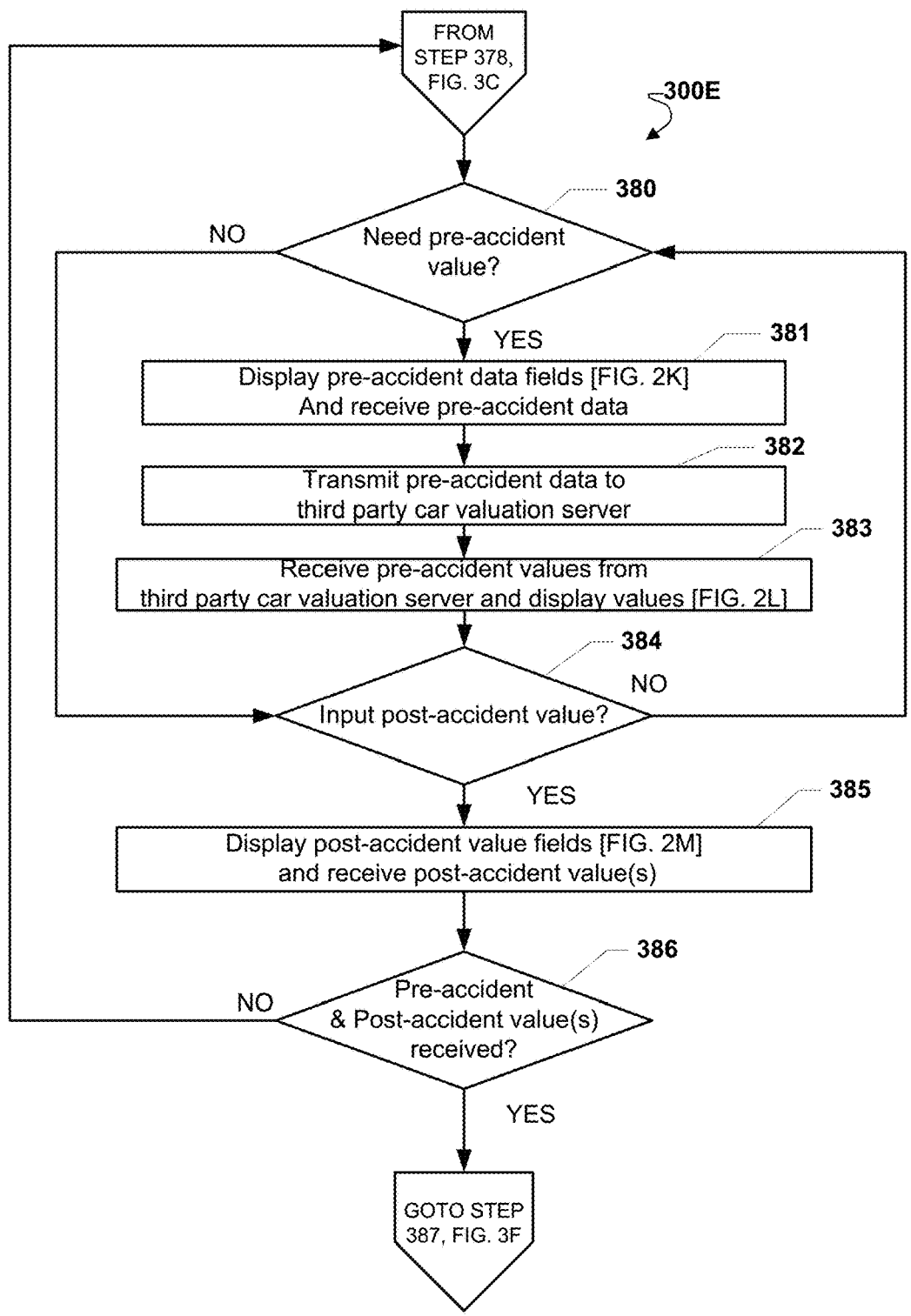
FIG. 3E is a continuation flow chart of FIG. 3D.

Next, in decision step 386 of FIG. 3E, the VAM-App 103 determines if both the pre-accident value and post-accident value for the vehicle have been received. If the inquiry to decision block 386 is negative, then the "No" branch is followed back to step 380 of FIG. 3E. If the inquiry to decision block 386 is positive, then the "Yes" branch is followed to block 387 of FIG. 3F described below.

Figure 3F:
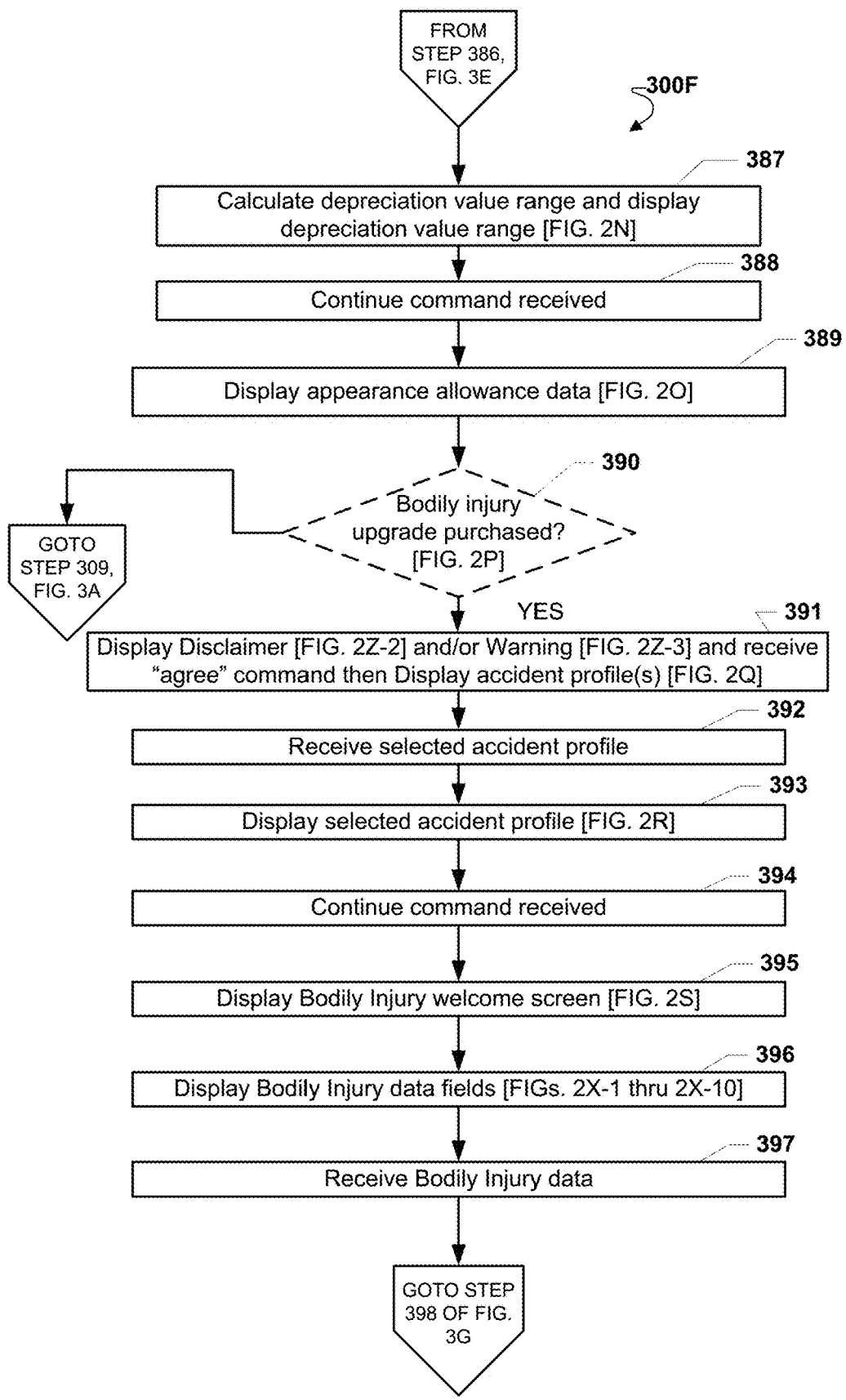
FIG. 3F is a continuation flow chart of FIG. 3E.

Referring now to FIG. 3F, in block 387, the VAM-App 103 and/or the server 102A may calculate the depreciation value of the vehicle in the accident based on the two values received in screen shot 202J of FIG. 2J, which are the pre-accident value and the post-accident value. The VAM-App 103 is capable of calculating this depreciation value because it is just the subtraction of the post-accident value from the pre-accident value. The depreciation value and a range are displayed to the subscriber in screenshot 202N of FIG. 2N. The VAM-App 103 may transmit this depreciation value and range to the server 102A if it performs the calculation and the server 102A may store these values to the file stored in the secure database 112.

Next, in step 388, a continue command may be received which is listed at the bottom of screenshot 202N of FIG. 2N. In step 389, the VAM-App 103 may display appearance allowance data as illustrated in screenshot 202O of FIG. 2O. An appearance allowance is a term that means that the insured is paid an "allowance" for cosmetic damage (scratches, dents, nicks, tears, etc.) which were not properly fixed/repaired by the body-shop or repair-shop which performed any mechanical and/or cosmetic repairs to the vehicle.

Next, in optional step 390 which is illustrated with dashed lines to highlight that this step may be excluded, the VAM-App 103 determines if the personal injury calculation upgraded subscription has been purchased and screenshot 202P of FIG. 2P is displayed. Step 390 is similar to optional steps 375 and 376 described above. That is, the method 300 may exclude step 390 and include the personal injury calculation and/or property damage calculation as part of a single subscription according to another exemplary embodiment. However, if separate subscriptions and additional fees are desired, then step 390 and screen shot 202P of FIG. 2P may be displayed.

If the inquiry to optional decision step 390 is positive, then the "Yes" branch is followed to step 391. If the inquiry to optional decision step 390 is negative, then the "No" branch is followed back to step 309 of FIG. 3A.

In step 391, a disclaimer, such as illustrated in FIG. 2Z-2, and/or warning of FIG. 2Z-3 are again presented. (See also step 378 described previously for the beginning of the property damage calculation segment of the software service.) This disclaimer presented in screenshot 202Z-2 of FIG. 2Z-2 and warning 202Z-3 of FIG. 2Z-3 may require the user of the VAM-App 103 to select an "agree" command before continuing with this bodily injury calculation section of the software service. Once the "agree" command is received, then the VAM-App 103 may then display, accident profiles created by the subscriber such as illustrated in screenshot 202Q of FIG. 2Q are displayed so that the subscriber may select the accident profile/report in which a personal injury calculation is desired.

Next, in step 392, a selection of the accident profile displayed in FIG. 2Q is received by the VAM-App 103. In step 393, the VAM-App 103 may display the selected accident profile such as illustrated in screenshot 202R of FIG. 2R. In this exemplary accident profile illustrated in FIG. 2R, the location information of the accident and the photos taken at the accident may be displayed and/or may be accessed by the subscriber.

Next, in step 394, if the continue command is received, then the method 300 may then proceed to step 395 in which the bodily injury welcome screen as illustrated in screenshot 202S of FIG. 2S may be displayed on the PCD 105. Subsequently, in step 396, the bodily injury data fields of screenshots 202X1 thru 202X-10 of FIGS. 2X-1 thru 2X10 may be displayed to the subscriber. Exemplary bodily injury data fields may include, but are not limited to, salary for subscriber's employment, hours of employment/work missed, medical expenses, long term treatment, chiropractic costs, liability limit from insurance provider, property damage limit from insurance provider, collision limit from insurance provider, comprehensive limit from insurance provider, and diagnostic charges, just to name a few.

Figure 3G:
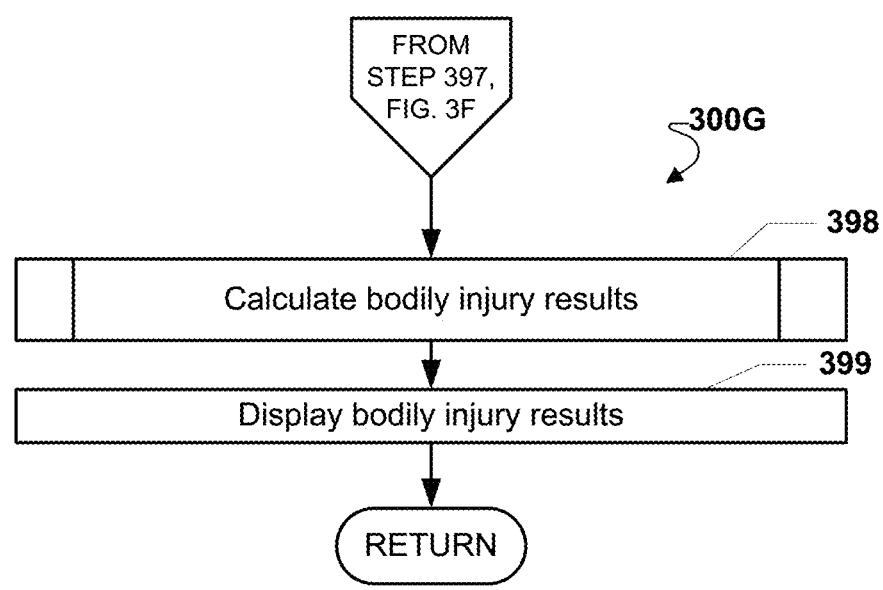
FIG. 3G is a continuation flow chart of FIG. 3F.

In step 397, the data for the bodily injury fields from FIGS. 2T, 2X-1 thru 2X-10 may be received by the VAM-App 103. The method 300 then continues to step 398 of FIG. 3G. Referring now to FIG. 3G, in routine or sub-method 398, the bodily injury results may be calculated. Usually, in this routine 398, the values received by the VAM-App 103 are transferred to the server 102A where the damage/injury calculator module 108 of FIG. 2A performs the Bodily Injury Calculations. Further details about the bodily injury fields and bodily calculations will be described below. Next, in step 399, the sever 102A via the bodily injury calculations module 108 transfers its data over the computer network 110 to the VAM-App 103 where the results are displayed on the PCD 105 such as illustrated in screenshot 202Z-1 of FIG. 2Z-1. The method then returns back to step 309 or the VAM-App 103 may terminate at this junction.

Figure 3H:
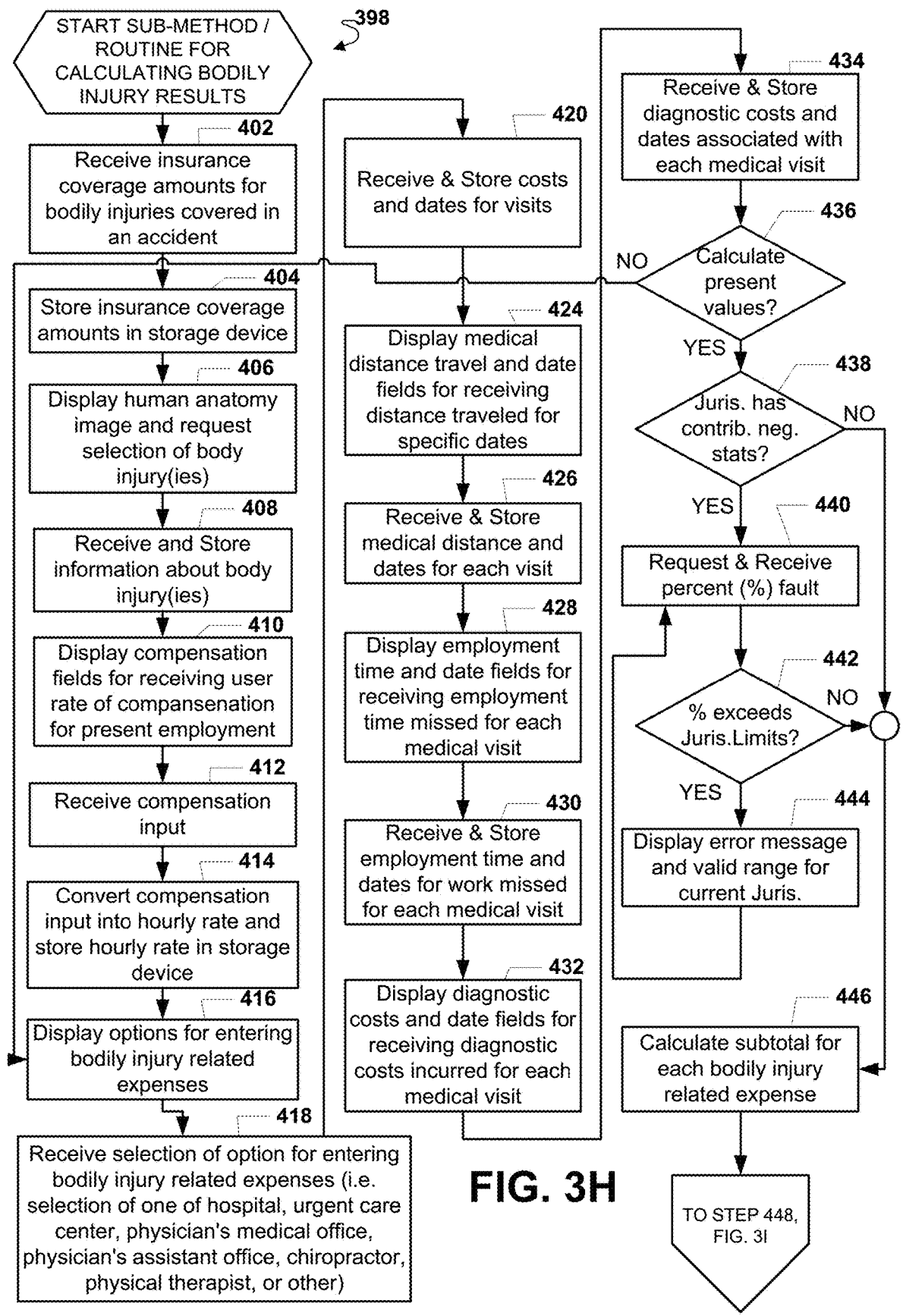
FIG. 3H is a subroutine/sub-method for rendering bodily injury calculations according to an exemplary embodiment and in connection with FIG. 3G.

Referring now to FIG. 3H, this figure illustrates an exemplary flowchart for the routine or sub-method 398 of FIG. 3G in which the bodily injury results may be calculated. Step 402 is the first step of sub-method 398 in which the VAM-App 103 may receive insurance coverage amounts for bodily injury coverage from the insurance provider of the user. Step 402 generally corresponds with FIG. 2X-1 and screen display 202X-1. Screen display 202X-1 may be displayed and may receive insurance coverage amounts as they relate to bodily injury coverage, such as, but not limited to, liability coverage, property damage coverage, collision coverage, and comprehensive coverage, and/or other types of insurance coverages.

Referring back to FIG. 5, next in step 404 the VAM-App 103 may store the insurance coverage amounts received in step 402 in a local storage device residing on the PCD 105. The PCD 105 may then upload these insurance coverage amounts to the server 102A which, in turn, may store this information on the secure and encrypted database 112. Once this information is uploaded from the PCD 105 to the server 102A, the VAM-App 103 may delete this information from the local storage device residing on the PCD 105. Alternatively, the PCD 105 may keep this information on the local storage device residing in the PCD 105. The PCD 105 may also have a secure area within the local storage device, and the PCD 105 may put this information in the secure/encrypted area.

Step 404 which describes how the VAM-App 103 stores the insurance coverage amounts, at first locally on the PCD 105, and then later the server 102A, an ultimately, the secure database 112, may be applicable to all data received by the VAM-App 103 running on the PCD 105. While it is possible to keep files stored in a secure manner, locally, on the PCD 105, for preferred exemplary embodiments, most or all sensitive information is ultimately relayed to the secure database 112, and once confirmed present, sensitive information stored locally on the PCD 105 is then deleted. In this way, possible theft or security breaches of the PCD 105 may then be prevented. Thus, the actions of step 404 may be applicable to all steps within this disclosure when the PCD 105 running the VAM-App 103 receives sensitive information.

Next, in step 406, the VAM-App 103, may then display a human anatomy image and request the user of the VAM-App 103 to select one or more portions of the human body in which an injury may have been sustained in the accident. Step 406 may generally correspond with FIG. 2X-2 and screen display 202X-2 as will be described in more detail below.

Subsequently, in step 408, the VAM-App 103 may receive and store the information about the one or more selected portions of the human body which were sustain injuries in the accident. Step 404 is very similar to step FIG. 404 in which data may be stored locally on the PCD 105 and then later transmitted to the secure server 112. Next, in step 410, the VAM-App 103 may display compensation fields for receiving user rate compensation for his or her present employment. Step 410 generally corresponds with FIG. 2X-3 described in more detail below.

Next, in step 412, the VAM-App 103 may then receive the compensation input from the compensation fields displayed in the screen shot 202X-3 of FIG. 2X-3. The user may provide his/her annual salary in numeric fashion only. Subsequently, in step 414, the VAM-App 103 and/or the damage/injury calculator module 108 of the server 102A may convert the compensation input into an hourly rate and store this hourly rate in a storage device, such as, but not limited to, the secure server 112. If the user is an hourly worker, there will be an option to input an hourly wage amount. Table 1, described below, further shows the calculations made by the injury/damage calculator module 108 for the salary data entered in screenshot 202X-3 of FIG. 2X-3.

The annualized hourly pay formula may be based upon the following:

> 365 days−104 weekend days−17.5 vacation days=243.5 Annual Workdays

Note that vacation days may vary from employee to employee and the user may be provide with an option to enter amount of vacation days awarded each year.

> 243.5 Workdays×(8 Hours)=1948 Annual Work Hours
>
> Annual Salary/1948 Annual Work Hours=Estimated Hourly Pay If the user inputs a monthly salary, then the following formula may be used:

> 243.5 Annual workdays/12=20 days per month
>
> monthly salary/20 days per month=Estimated Hourly Pay If the user inputs a weekly salary, then the following formula may be used:

> Weekly salary/40 hour per week for work=Estimated Hourly Pay.

These hourly pay formulas may be executed and completed and stored permanently only at the server 102A, and specifically by the damage/injury calculator module 108.

Next, in step 416, the VAM-App 103 may then display options for entering bodily injury related expenses in connection with the accident. Step 416 generally corresponds with FIG. 2X-4 having display 202X-4 which is further described in more detail below. FIG. 2X-4 displays the numerous types of expenses which may be incurred by the user involved in the accident. For example, such expenses may include, but are not limited to hospital emergency room care; urgent care centers; physicians medical office; physicians' assistant medical office; chiropractor, and a manually-input field called "other", etc.

Next, in step 418, the VAM-App 103 may then receive the selection of the expense type. In the exemplary embodiment illustrated in FIG. 2X-4, the third expense type of "3) Physicians Medical Office" was selected as shown with highlighted text and bold text.

In step 420, the VAM-App 103 may then display relevant screens and various fields to receive costs and dates on which those costs were incurred for the selected expense type. As illustrated in FIG. 2X-5, since the "Physician's Medical Office" expense was selected, the VAM-App 103 may list fields to receive dates and the amounts of expense incurred for each date for Medical Office visits. As noted previously, other expenses may be selected and displayed, such as Hospital visits, Urgent care visits, Physician's Assistant Medical Office visits, and Chiropractor visits, etc. The damage/injury calculator module 108 may keep a running total of the amount spent for all visits to date and store that value in a storage device.

As noted above and below, the formatting for receiving of data with the VAM-App 103 as presented in the various screen shots 202 of the various figures is exemplary only. Receiving data using other formatting is possible and is included within the scope of this disclosure. For example, instead of a simple list of dates and expenses as presented in the screenshot 202X-5 of FIG. 2X-5 for medical office visits, a table with lines and columns and rows formed by those lines may be presented to organize the receipt of data. For example (and not illustrated in the figures), one column of a two-column table may list a "date" column for the first column and a "dollar amount" column as the second column as an alternative to the display shown in FIG. 2X-5. Table 1, described below, further shows the calculations made by the injury/damage calculator module 108 for the medical cost data entered in screenshot 202X-5 of FIG. 2X-5.

Next, in step 424, the medical distance traveled and date fields for receiving distance traveled for specific dates may be displayed, such as shown in FIG. 2X-6 showing screenshot 202X-6. As noted previously, distance traveled may be in any increments, such as, but not limited to, miles, kilometers, etc. Subsequently, in step 426, the VAM-App 103 may receive and store the medical distance and dates for each visit. In this step 426, the damage/injury calculator module 108 may calculate a total mileage entered to date for all medical expenses as well as a dollar value. To arrive at a dollar value for the mileage, the module 108 may multiple each mile driven by a government or standard set rate, which for one exemplary embodiment, may comprise a value of nineteen cents per mile. Table 1, described below, further shows the calculations for mileage made by the injury/damage calculator module 108 for the data entered in screenshot 202X-6 of FIG. 2X-6.

Next, in step 428, the VAM-App 103 may display employment time and date fields for receiving employment time missed for each medical visit. Generally, step 428 corresponds with FIG. 2X-7 having screenshot 202X-7. In this step 428, the user may enter employment time missed, usually in increments of hours and minutes missed per day that relates to time spent for the medical expense including travel time to and travel time from the medical related expense for medical expenses occurring during normal working hours. However, other increments, besides hours and minutes are possible and are included within the scope of this disclosure.

In step 430, the VAM-App 103 may receive and store the employment time and dates for work missed for each medical visit. In this step 430, the damage/injury calculator module 108 may multiply the present total of hours of worked missed by the hourly rate calculated in step 414. Table 1, described below, further shows the calculations made by the injury/damage calculator module 108 for the work time missed data entered in screenshot 202X-7 of FIG. 2X-7.

Subsequently, in step 432, the VAM-App 103 may display a screenshot for receiving dates and diagnostic costs associated with a medical expense and a particular visit to a medical professional. Step 432 may generally correspond with FIG. 2X-8 having screenshot 202X-8. Next, in step 434, the VAM-App 103 may receive and store the diagnostic costs and dates received from screenshot 202X-8 of FIG. 2X-8. In step 434, the damage/injury calculator module 108 may maintain a running total of all diagnostic costs. So the module 108 may add all diagnostic costs to date and store that value in a memory device. Table 1, described below, further shows the calculations made by the injury/damage calculator module 108 for the diagnostic cost data entered in screenshot 202X-8 of FIG. 2X-8.

Next, in decision step 436, the VAM-App 103 may ask the user if he/she desires to calculate to total bodily injury numbers to date. Though not illustrated, the VAM-App 103 may simply display this question in a screenshot after the data in screenshot 202X-8 of FIG. 2X-8 has been entered. The user of VAM-App 103 may have additional data to enter, such as selecting a different expense category as illustrated in screenshot 202X-4 of FIG. 2X-4.

If the inquiry to decision step 436 is positive, then the "Yes" branch may be followed to decision step 438. If the inquiry to decision step 436 is negative, then the "No" branch may be followed back to step 416 in which the options of FIG. 2X-4 for entering bodily related expenses may be displayed to the user.

In decision step 438, the VAM-App 103 determines if the jurisdiction for the accident has contributory negligence statutes. In some jurisdictions, such as in the United States, each state has its own set of laws and/or rules which may limit recovery of a vehicle accident victim if he or she is found contributory negligent with respect to a vehicle accident. As understood by one of ordinary skill in the art, a first person may be assessed with direct fault/cause of a vehicle accident. However, a second person may be assessed with contributory negligence if it is determined that the second person's actions may have contributed to the cause of the vehicle accident in which the first person may be held as primarily responsible.

Table 2 lists all the states of the United States and a summary of their relevant laws and/or rules with respect to contributory negligence calculations. As noted previously, the present disclosure is not limited to the United States and the inventive system may be used for other jurisdictions outside of the United States, such as, but not limited to, Europe, Canada, and Mexico just to name a few. Table 2 may be updated to include the laws and rules of these other, Non-U.S. jurisdictions as appropriate.

If the inquiry to decision step 438 is negative, then the "No" branch is followed to step 446. A negative answer to step 438 means that the present jurisdiction for the accident recorded by the VAM-App 103 does not have any relevant contributory negligence laws and/or rules. If the inquiry to decision step 438 is positive, then the "Yes" branch is followed to step 440. In step 440, the VAM-App 103 may request and receive the contributory negligence percentage that the user of the VAM-App 103 may believe that he or she may be assessed for the accident. Step 440 may generally correspond to FIG. 2X-9 with screenshot 202X-9.

The contributory negligence percentage is usually determined by the user. He/She usually provides that estimate to module 108, based upon the results of any police report. Often, police officers may state percentages of fault in their report, based upon scene investigation. The contributory negligence percentage is usually not an exact science, any more than the police officer's determination. Ultimately, the insurance adjuster (or adjusters from two opposing companies) will usually arrive at a specific percentage for the contributory negligence and use that value to deduct from the damage/injury award for the driver assessed with contributory negligence.

In screenshot 202X-9 of FIG. 2X-9, the user of VAM-App 103 may input a percent value in which he or she believes could be assessed against him or her by an insurance company and/or judge/jury in a court of law. In the alternative to FIG. 2X-9 (and not illustrated), a range between zero and 100% may be displayed, where the user of the VAM-App 103 may select a graphical indicator, such as a slider of a slider bar—listed below—, to correspond with a level of negligence, a driver may believe he or she may have with respect to an accident:

0-|-----------------100%

The contributory negligence percentage may be preselected (default-set) to zero, allowing the user to leave it at zero or change it manually at any time (such as adjusting a slider bar or to type-in a percentage value). Based on the selected percentage, the damage/bodily injury calculator module 108 of the server 102A may modify the dollar entitlements. It will subtract the contributory negligence percentage from a total entitlement in dollars. For example, the contributory negligence percentage calculation may look like the following:

Final Dollar Entitlement $25,000

Percentage Fault=30% (Represented by 30% of Final Dollar Entitlement of $25,000)=$7,500

Adjusted Entitlement=Final Dollar Entitlement−% fault of total value

Adjusted Entitlement: =$25,000−$7500=$17,500

The injury calculator module 108 may perform these contributory negligence calculations once the data is relayed from the VAM-App 103 running on the PCD 105 over the computer network 110 to the damage/injury calculator module 108 of FIG. 1A.

Referring back to FIG. 3H, and particularly step 440 and FIG. 2X-9 having screenshot 202X-9, a user may enter his or her percentage level of contributory negligence. As noted previously, the default value of the VAM-App 103 may be zero ("0") and a user may proceed with this default value of zero in which there will be no subtraction of contributory negligence when the percentage selected is zero.

Once the VAM-App 103 receives the percent value of contributory negligence selected by the user of VAM-App 103 in step 440 and as displayed in FIG. 2X-9, the VAM-App 103 will relay this selected percentage to the damage/injury calculator module 108 of server 102A of FIG. 1. In decision step 442, the damage/injury calculator module 108 of server 102A may determine, based on the values contained in Table 2, whether the selected contributory negligence percentage has exceeded the present jurisdiction's limits. As noted previously, each jurisdiction has its own set of laws and/or rules which govern how a contributory negligence percentage may impact recovery of fees based on that percentage. Further, some jurisdictions (i.e. states or countries) may not permit or allow calculations based on contributory negligence. The VAM-App 103 will only request input on a negligence percentage if the jurisdiction permits such calculations based on contributory negligence.

If the inquiry to decision step 442 is positive, meaning that the selected contributory negligence percentage does exceed the present jurisdiction's limits, then the "Yes" branch may be followed to step 444. In step 444, the damage/injury calculator module 108 may generate an error message and relay that message over the computer network 110 to the VAM-App 103 running on the PCD 105. This error message may look like FIG. 2Z-4 having screen shot 202Z-4. This message may advise the user of the VAM-App 103 that the selected percentage is outside of the range permitted for the present jurisdiction in which the accident occurred.

The message of screenshot 202Z-4 may also display what are the upper and lower limits available for the contributory negligence values for that jurisdiction. As noted previously, if a contributory negligence value exceeds the upper limit for a particular jurisdiction, then such value exceeding the upper limit may completely bar any recovery for the user assessed with that negligence value exceeding the upper limit for that jurisdiction. After step 444, the VAM-App 103 returns to step 440 such that the user of the VAM-App 103 may then input a new/updated contributory negligence value.

If the inquiry to decision step 442 of FIG. 3H is negative, meaning that the selected contributory negligence value is within the jurisdictional limits as set forth in Table 2 which is accessed by the damage/injury calculator module 108, then the "No" branch is followed to step 446. In step 446, the damage/injury calculator module 108 may calculate a subtotal for each bodily injury related expense which was entered thru the screenshots 202 of FIGS. 2X-4 through 2X-8. The sub-method/routine 398 then continues to step 448 of FIG. 3I.

Figure 3I:
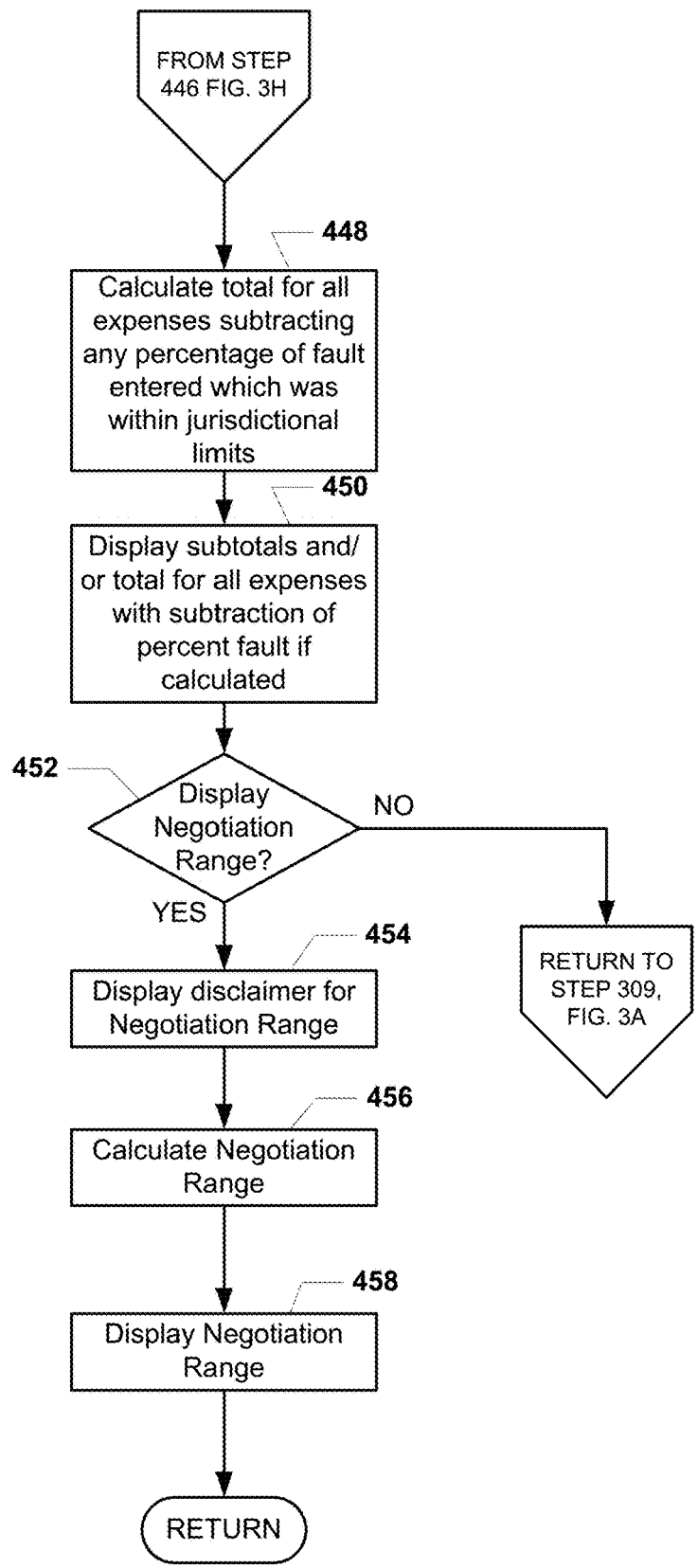
FIG. 3I is a continuation flow chart of FIG. 3F.
Figure 4:
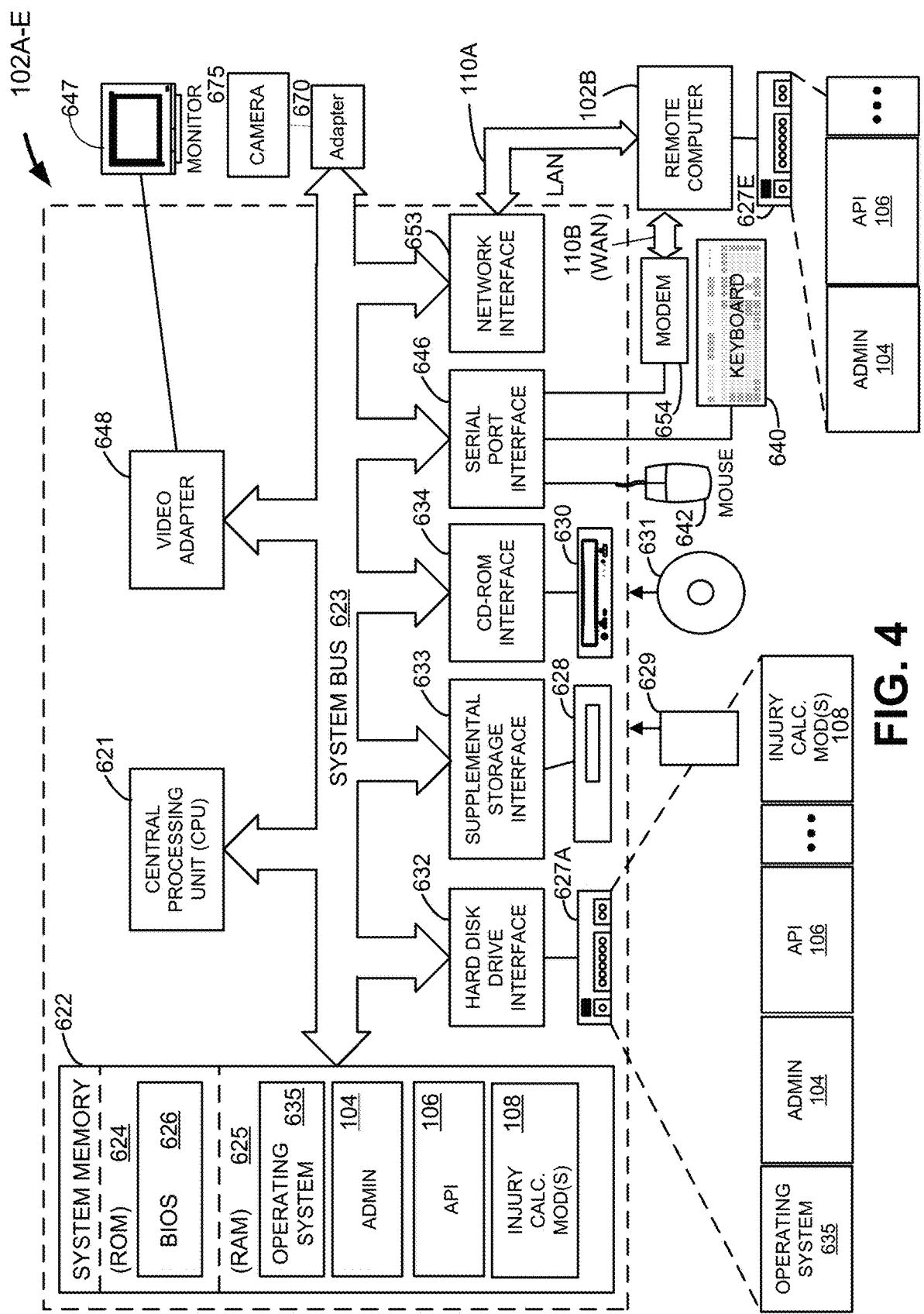
Figure 5:
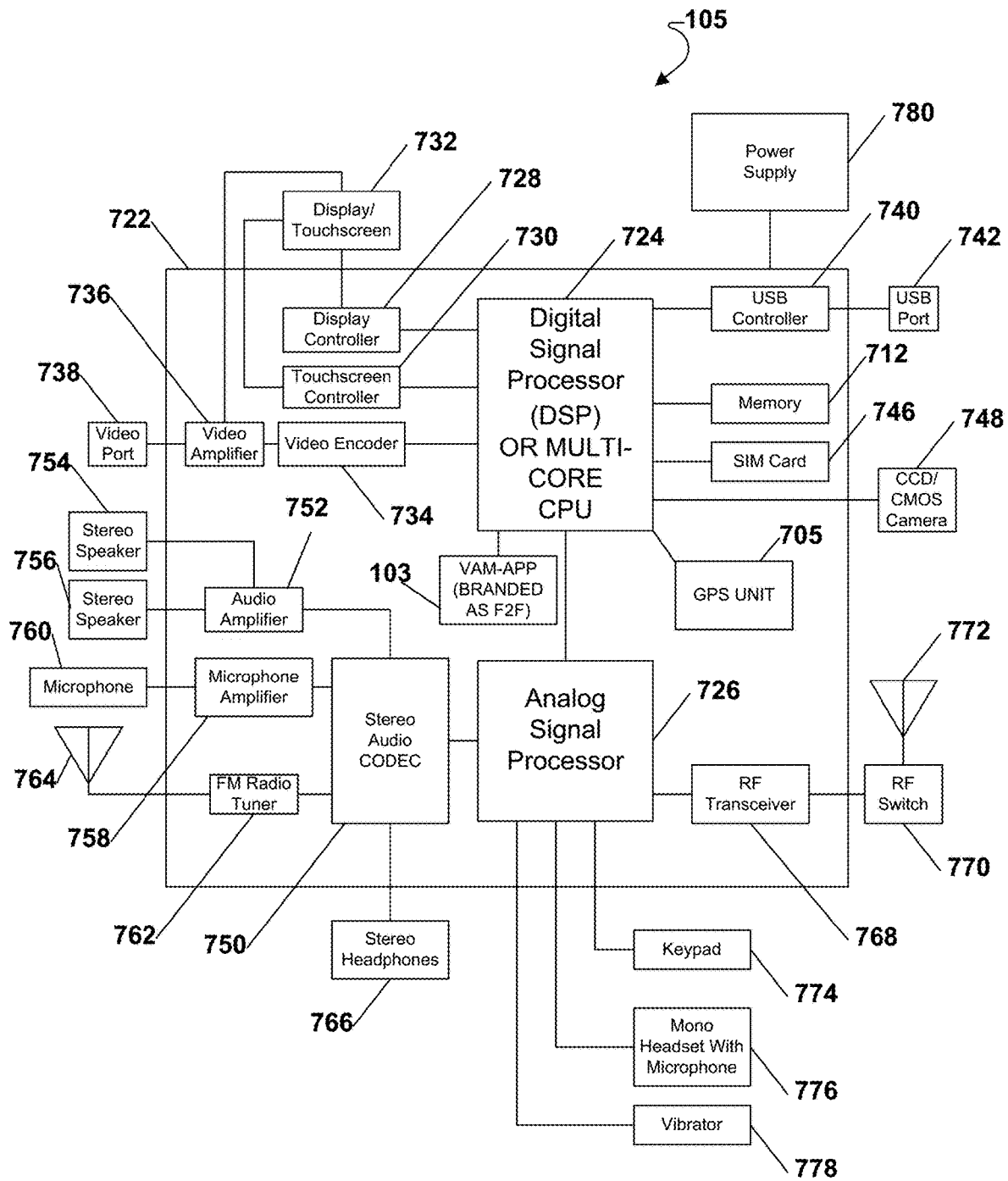
Figure 8:
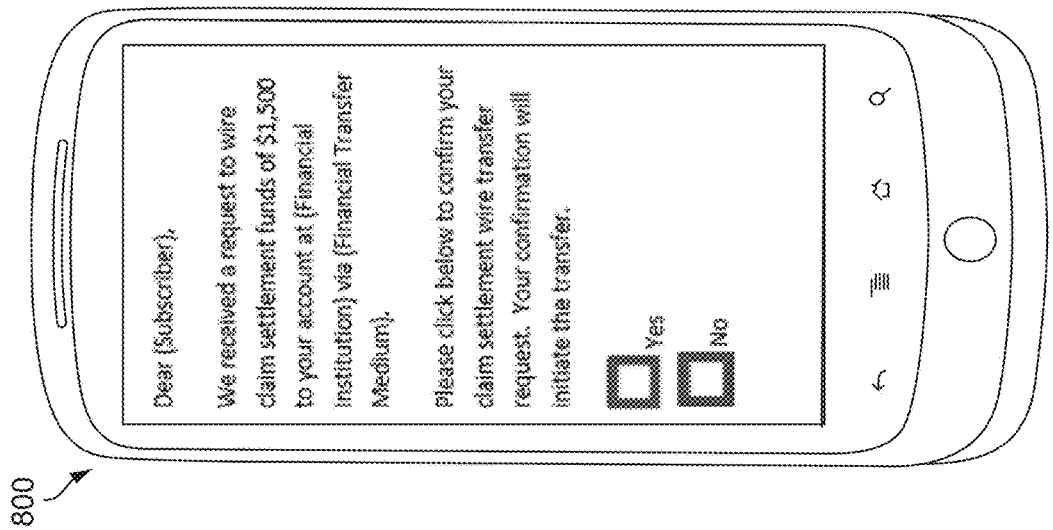
Figure 7:
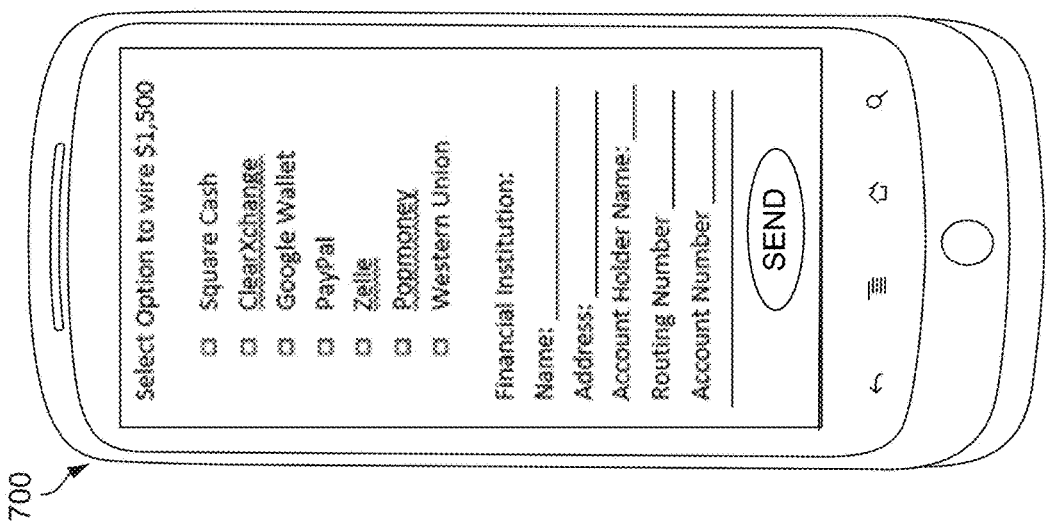
Figure 6:
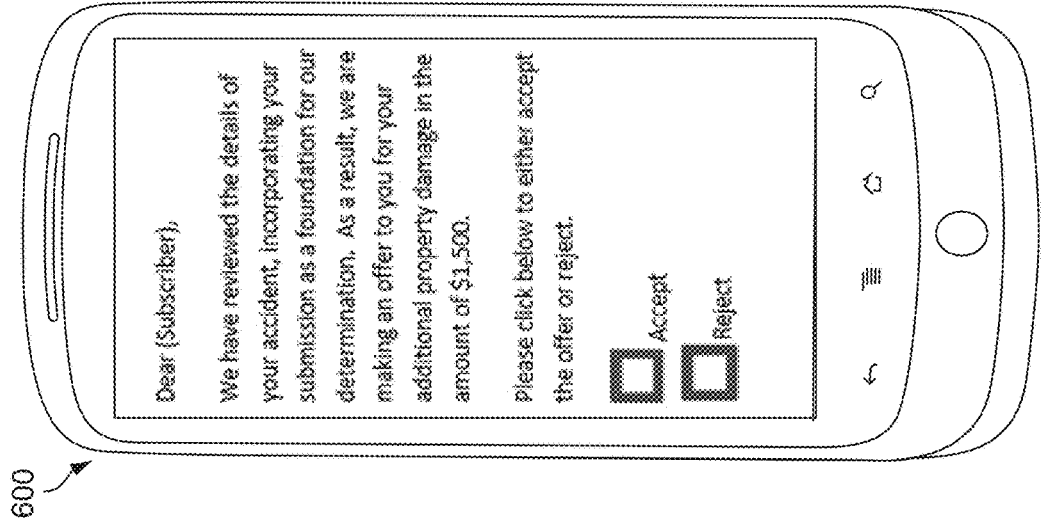
Figure 9:
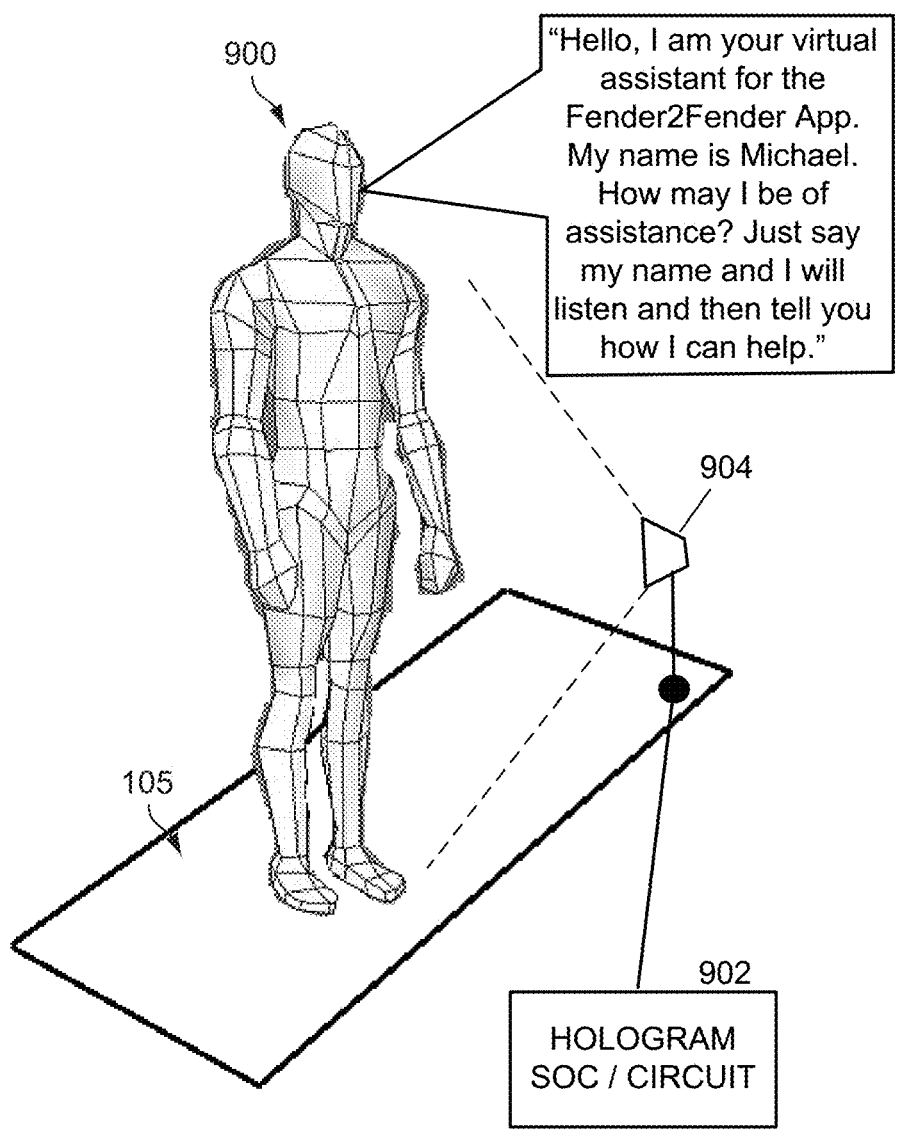

Referring now to FIG. 3I, and particularly, step 448, in this step, the damage/injury calculator module 108 may then calculate a grand total of all the expenses incurred and then subtract any percentage of fault based on the selected contributory negligence percentage which was within the jurisdiction's limits. Next, in step 450, the damage/injury calculator module 108 may relay these calculations across the computer network 110 to the VAM-App 103 such that the VAM-App 103 may display the subtotals, a grand total, and a total showing the loss due to the selected contributory negligence percentage value. Step 450 may generally correspond with FIG. 2X-10 having screenshot 202X-10. The calculations for step 450 and the results that are shown in FIG. 2X-10 are described and illustrated in more detail below in connection with Table 1. It is noted that a Pain & Suffering value may be calculated in step 450. However, in the exemplary embodiment illustrated in FIG. 2X-10, the Pain & Suffering value was not calculated. Further details about the Pain & Suffering value will be described below in connection with FIG. 2Z-1.

Next, after screenshot 202X-10 of FIG. 2X-10 is displayed, the user of the VAM-App 103 may select the "continue" on-screen button in FIG. 2X-10 and then in decision step 452, the VAM-App 103 may determine if the user would like a negotiation range be calculated by the damage/injury calculator module 108 based on the bodily injury values which were calculated in step 448 and displayed in step 450. In this decision step 450, the VAM-App 103 may display the screenshot 202Y-1 as illustrated in FIG. 2Y-1.

If the inquiry to decision step 452 is negative, meaning the that the user does not want a negotiation range calculated, then the sub-method/routine 398 then returns to Step 309 of FIG. 3A. If the inquiry to decision step 452 is positive, meaning that a negotiation range calculation is desired, then the "Yes" branch is followed to step 454. In step 454, a disclaimer, such as illustrated in FIG. 2Y-2 having screenshot 202Y-2 may be displayed on the PCD 105. This disclaimer advises the user of the limitations of the software service and how this negotiation range calculation should not be used as a replacement for legal advice. The disclaimer of screenshot 202Y-2 may require the user to click an on-screen "I Agree" button before the negotiation ranges is calculated by the damage/injury calculator module 108 of the server 102A.

Next, in step 456, the damage/injury calculator module 108 of the server 102A may calculate the negotiation range as follows. First, the module 108 may return to the subtotals as illustrated in FIG. 2X-10. For only professional medical service type expenses, which may include hospital visits, urgent care visits, and visits to either a physician's medical office or a physician assistant's medical office, such visits and what are actually professional service charges for medical practitioners are subject to pain & suffering calculations in most jurisdictions, such as most or many states in the United States.

Pain & Suffering legal damages, in the United States as of this writing, are typically calculated by multiplying the amount of professional medical service bills by a number (factor) between 1.00 and 5.00. Thus, the multiplication factor may be selected between the values of 1.00 and 5.00, and for one exemplary embodiment of the inventive system, the multiplication factor is preferably selected as 3.21 which generally is a middle value relative to 1.00 and 5.00.

Thus, for the exemplary embodiment illustrated in FIG. 2X-10, the medical charges of $2700 may be multiplied by 3.21 to arrive at pain and suffering damages. For this example, $2700×3.21=$8667.00=the pain & suffering damage [P&S]. Thus pain & suffering [P&S] equation is as follows:

$$[P\&S] = \text{factor} \times \text{Medical professional fees total for accident} \quad \text{EQ 1:}$$

The bodily injury [BI] total amount is then subject to the following equation which includes the P&S damage:

$$BI = [P\&S] + \text{Diagnostic} + \text{Wages} + \text{Expenses} + \text{Chiropractor} \quad \text{EQ 2:}$$

So BI for the example of FIG. 2X-10 is equal to the following:

$$\$8667[=P\&S] + \$625[=\text{Diagnostic}] + \$250.25[=\text{Wages}] + \$9.69[=\text{Expenses}] + \$2100[=\text{Chiropractor}] = BI[\text{total}] = \$11,651.94$$

See also Table 1 listed below which has these calculations in its last row.

This BI value that includes the pain & suffering [P&S] damage is also subject to the contributory negligence factor. Therefore, this BI[total=$11,651.94] is multiplied by the amount of contributory negligence which was assessed, in this example, as 30% and which equals a total of $3495.58. This amount [$3517.49] is subtracted from the BI[total] and thus, the final BI value after subtracting the contributory negligence value of [$3495.49=30%] is equal to $8156.36 as the final value.

The negotiation range [NR] is usually based on the following equation:

$$NR = \text{Low End} = 0.85[\text{Final BI-post contributory negligence subtraction}]$$

to $$\text{High End} = 1.15[\text{Final BI-post contributory negligence subtraction}] \quad \text{EQ 3:}$$

where the low end is about 15.0 percent less [=0.85 multiplier] than the Final BI value post contributory negligence subtraction and the high end is about 15.0 percent above [=1.15 multiplier] the Final BI value post contributory negligence subtraction. However, other low end points and high end points are possible and are included within the scope of this disclosure. Thus, greater or less than 15.0 percent [greater or less than 0.85] for the low end and greater than or less than 15.0 percent [greater or less than 1.15] for the high end are possible.

So for the example presented in FIG. 2X-10, the low end of the range is 0.85×$8156.36=$6,932.91 and the high end for the range is 1.15×$8,156.36=$9379.81. The damage/injury calculator module 108 of server 102A may then send these low end and high end values (i.e. the negotiation range) to the PCD 105 running the VAM-App 103.

Next, in step 458, the negotiation range [$6933 to $9380] may be displayed on the display device of the PCD 105 such as shown in FIG. 2Z-1 having screenshot 202Z-1. This negotiation range [$6933 to $9380] may be used by the operator of the VAM-App 103 when contacting his or her insurance provider. After step 458, the sub-method/routine 398 may then return to step 309 of FIG. 3A.

Referring now to FIG. 2X-1, this figure illustrates an exemplary screenshot 202X-1 for allowing a user of VAM- App 103 to enter the insurance limits for his or her vehicle coverage. This screenshot 202X-1 may allow the user to enter the limits for liability coverage, property damage coverage, collision coverage, and comprehensive coverages. It is noted that FIGS. 2X-1 thru 2X-10 are presented to the user of VAM-App 103 and correspond with steps 396 and 397 described above.

Referring now to FIG. 2X-2, this figure illustrates an exemplary screenshot 202X-2 for allowing a user of the VAM-App 103 to select a portion of his or her body which may have been injured during the vehicle accident. This screenshot 202X-2 may also allow the user to confirm the date of the accident. The screenshot 202X-2 may also allow for multiple body parts to be selected. In the exemplary embodiment of FIG. 2X-2, a left arm of the human body may be selected with a screen pointer that may be manipulated by a user with a touch-screen interface as understood by one of ordinary skill in the art.

Referring now to FIG. 2X-3, this figure illustrates an exemplary screenshot 202X-3 which may allow the user of VAM-App 103 to confirm the body part(s) selected in screenshot 202X-2. This screenshot 202X-3 may also allow the user to confirm the user's date of birth. This screenshot 202X-3 may also allow the user to indicate how he or she is paid by his or her employer: whether he/she is paid annually, monthly, or weekly. At the bottom of the screen, the user may enter what his or her rate of compensation is based on the salary timing selected previously. In the exemplary embodiment illustrated in FIG. 2X-3, an annual salary was selected for the salary type and the rate of $75,000 per year was entered as the salary for the user.

Referring now to FIG. 2X-4, this figure illustrates an exemplary screenshot 202X-4 which allows a user of the VAM-App 103 to select the type of medical attention that he or she has received after the vehicle accident. The various types include, but are not limited to, hospital emergency room, urgent care centers, physician medical offices, physician assistant medical offices, chiropractors, etc. The screenshot 202X-4 may allow a user to enter other types not enumerated by providing an input field where the user may describe a different type of medical treatment not enumerated in the options list.

In the exemplary embodiment illustrated in FIG. 2X-4, a physicians medical office was selected (option #3). This screenshot 202X-4 may be visited by the user of the VAM-App 103 over the course of numerous medical treatments rendered after the initial accident. That is, screenshot 202X-4 may be selected by the user of VAM-App 103 after each visit to a medical professional.

Referring now to FIG. 2X-5, this figure illustrates an exemplary screenshot 202X-5 which allows a user to enter the cost in currency, such as, but not limited to, U.S. dollars for each visit to the medical professional selected in FIG. 2X-4. This screenshot 202X-5 may allow the user to enter a date and currency amount of money spent on the particular date for the services rendered by the medical professional. The present disclosure is not limited to the fields shown in this screenshot. That is, it is recognized that other formatting of the fields shown in FIG. 2X-5, as well as the other figures described herein, may be possible and such other formatting is intended to be included within the scope of this disclosure. For example (not illustrated), the input fields could be formatted like cells of a spreadsheet as understood by one of ordinary skill in the art.

Referring now to FIG. 2X-6, this figure illustrates an exemplary screenshot 202X-6 for allowing a user of the VAM-App 103 to enter distances traveled for any of the medical services documented in this segment of the software service. A user of the VAM-App 103 can enter a date and the distance traveled for medical services for that date. While whole number U.S. miles are requested in the exemplary embodiment of FIG. 2X-6, fractional or decimal inputs could be used and are covered by the scope of this disclosure. Further, other units besides U.S. miles are possible, such as metric kilometers.

Referring now to FIG. 2X-7, this figure illustrates an exemplary screenshot 202X-7 which allows a user of the VAM-App 103 to enter the amount of time spent away from work for each medical visit documented in this segment of the software service. A user may enter the date of the medical visit and the amount of time spent away from work in units of hours and minutes. However, other units are possible and are included within the scope of this disclosure such as days, weeks, months, etc.

Further, it is possible that the VAM-App 103 and/or the server 102A may pre-populate the date fields for each of the screenshots based on the first set of date fields illustrated in FIG. 2X-5. For example, if a user enters a date of Jul. 4, 2019 in a date field of FIG. 2X-5, then this same date field of Jul. 4, 2019 may be pre-populated for all subsequent screen shots, such as, screenshots of FIGS. 2X-6 thru 2X-8. Additionally, if a user of VAM-App 103 enters in a new date field in a screenshot not previously entered in a prior screenshot, then the VAM-App 103 may provide a notice to a user that this has occurred and the VAM-App 103 will present all relevant screenshots where additional information may be required for the new date entered.

For example, if a user entered a new date field in FIG. 2X-6, such as Jul. 4, 2019 for distance traveled for a medical service but had failed to enter this same date field in the screenshot of FIG. 2X-5 for medical expenses incurred, then the VAM-App 103 may send a notice to the user and then re-display FIG. 2X-5 for the medical expenses incurred with the new date field. That is, the VAM-App 103 may re-display the screenshot 202X-5 of FIG. 2X-5 after the "new" date of Jul. 4, 2019 is received in screenshot 202X-6 of FIG. 2X-6. Screenshot 202X-5 of FIG. 2X-5 may now be populated with the "new" date of Jul. 4, 2019 and await the user's input for the amount of medical expenses incurred for that date.

Referring now FIG. 2X-8, this figure illustrates a screenshot 202X-8 that allows a user to enter diagnostic charges incurred for each medical service documented with the software service. Similar to the other screenshots described above, this display 202X-8 allows a user of the VAM-App 103 to enter a date and an amount of money that was incurred for a diagnostic charge associated with a medical service, such as, but not limited to, x-rays, CT-scans, MRI-scans, lab tests, etc.

Referring now to FIG. 2X-9, this figure illustrates a screenshot 202X-9 which may allow a user to assign a percentage of fault relative to the accident being documented with the software service as will be described in more detail below. In other words, this screenshot 202X-9 allows a user of the VAM-App 103 to enter a whole number percentage that he or she believes could be assessed with respect to the user's contributory negligence with respect to the accident. While only a whole number percentage is illustrated, fractional/decimal percentages could be entered and are included within the scope of this disclosure.

It is noted that screenshot 202X-9 may not be displayed or presented to a user based on the jurisdiction in which the accident occurred. In some jurisdictions, as will be explained in more detail below, recovery of bodily injury expenses may be limited or restricted in some jurisdictions (i.e. laws may vary from state to state in the United States for contributory negligence as it relates to vehicle accidents and how it impacts recovery of damages as governed by state statutes as understood by one of ordinary skill in the art) if it is determined that a driver was contributory negligent with respect to a vehicle accident. Further details of this self-assessed contributory negligence percentage will be described below.

Referring now to FIG. 2X-10, this figure illustrates a screenshot 202X-10 that presents the results of the bodily injury calculations made by the bodily injury calculator module 108 residing on the server 102A. While it is possible to provide a bodily injury calculator module 108 to reside on each PCD 105 such that these calculations could be made "locally" on a respective PCD 105, because of the potential changes and/or differences in the laws of each jurisdiction (i.e. each state of the United States or each country of different countries), one preferred exemplary embodiment of the system 101 is that the bodily injury calculator only resides/is part of the server 102A.

The bodily injury calculations performed by the bodily injury calculator module 108 will be described in more detail below in connection with the flowchart/subroutine 398 of FIG. 3H. In screenshot 202X-10, based on the calculations performed in flowchart/subroutine 398 of FIG. 3H (described in more detail below), the bodily injury calculator module 108 may provide subtotals for any of the following: medical expenses; diagnostic charges; wages; expenses, such as, but not limited to, travel related fees such as mileage expenses.

The bodily injury calculator module 108 may provide a grand total as well as a rounded total. In the exemplary embodiment illustrated in FIG. 2X-10, the grand total was rounded to the nearest whole dollar when dollars was used as the currency. However, other rounding is possible and included within the scope of this disclosure. For example, the grand total could be rounding to the nearest ten dollars or hundred dollars based on preferences that could be selected by a user of the VAM-App 103. Further details about the grand total and how it is calculated will be described below in connection with routine 398 of FIG. 3H.

Referring now to FIG. 2Y-1, this figure illustrates a screenshot 202Y-1 that prompts/asks the user of VAM-App 103 if he/she wishes to see a value range in which the user can use in his/her negotiations with insurance providers who may be covering damages incurred after the vehicle accident. This value range is usually calculated by the bodily damage calculator module 108. Further details of this value range are described below in connection with routine 398 of FIG. 3H.

Referring now to FIG. 2Y-2, this figure illustrates a screenshot 202Y-2 which displays a disclaimer about the value range that the user desires to view and which can be used in his/her negotiations with insurance providers who may be covering damages incurred after the vehicle accident. The screenshot 202Y-2 may require an on-screen button entitled, "I AGREE," to be pressed which means that the user agrees and understands the disclaimer about the value range. The disclaimer addresses how laws may vary from jurisdiction to jurisdiction (i.e. from state to state in the United states, and from country-to-country, for outside of the United States). Such laws may impact how calculations for damages are rendered by the bodily injury calculation module 108 as understood by one of ordinary skill in the art.

Referring now to FIG. 2Z-1, this figure illustrates a screenshot 202Z-1 which presents a low value and a high value that defines a value range from which a user of the VAM-App 103 may use with her/his negotiations with one or more insurance providers who may be covering damages incurred after the vehicle accident. The low value and high value of this range may be rounded to the nearest whole number of the currency being used (i.e. to the nearest whole dollar if U.S. dollars are used). However, other rounding is possible and is included within the scope of this disclosure. Other rounding, includes, but is not limited to, rounding to the nearest tenth value of a currency, or rounding to the nearest one-hundredth value of a currency (i.e. to the nearest ten dollars, to the nearest one-hundred dollars, etc.). How this value range of screenshot 202Z-1 is calculated will be explained below in connection with routine 398 described below in connection with FIG. 3H.

Referring now to FIG. 2Z-2, this figure illustrates a screenshot 202Z-2 that presents a disclaimer which is usually provided to the user of the VAM-App 103 prior to starting the property damage calculations segment and the bodily injury calculations segment of the software service. This was described previously in connection with step 378 and in connection with step 391. According to this exemplary embodiment, the user usually must click-on the on-screen button entitled, "I AGREE," before the property damage segment or bodily injury segment may be started by the VAM-App 103. The VAM-App 103 may record with a date stamp of when the user clicked the "I AGREE" on-screen button.

Referring now to FIG. 2Z-3, this figure illustrates a screenshot 202Z-2 that presents a warning which is usually provided to the user of the VAM-App 103 prior to starting the property damage calculations segment and the bodily injury calculations segment of the software service. This was described previously in connection with step 378 and in connection with step 391. According to this exemplary embodiment, the user must click-on the on-screen button entitled, "I AGREE," before the property damage segment or bodily injury segment may be started by the VAM-App 103. The VAM-App 103 may record with a date stamp of when the user clicked the "I AGREE" on-screen button.

As noted above in connection with steps 378 and 391, both screenshots 202Z-2 and 202Z-3 may be presented or just one of them may be presented before respective segments for the property damages calculation segment of the software service and the bodily injury calculation segment of the software service. As noted previously, the VAM-App 103 may track in a database when the user agrees to the disclaimer and/or warning with time and date stamps.

Referring now to FIG. 4, this figure is a functional block diagram of an internet connected, for example, a computer 102A-E as illustrated in FIG. 1A and that can be used in the system 101 for distributing electronic vehicle accident status information over a network 110 to a remote subscriber portable computing device 105 during and after a vehicle accident according to an exemplary embodiment of the invention. The exemplary operating environment for the system 101 includes a general-purpose computing device in the form of a conventional computer 102.

Generally, anyone of the computing devices 102A-E includes a processing unit 621, a system memory 622, and a system bus 623 that couples various system components including the system memory 622 to the processing unit 621. The system bus 623 may be any of several types of bus structures including a memory bus or memory controller, a peripheral bus, and a local bus using any of a variety of bus architectures. The system memory includes a read-only memory (ROM) 624 and a random access memory (RAM) 625. A basic input/output system (BIOS) 626, containing the basic routines that help to transfer information between elements within computer 102, such as during start-up, is stored in ROM 624.

The computer 102A-E can include a hard disk drive 627A for reading from and writing to a hard disk, not shown, a supplemental storage drive for reading from or writing to a removable supplemental storage 629 (like flash memory and/or a USB drive) and an optical disk drive 630 for reading from or writing to a removable optical disk 631 such as a CD-ROM or other optical media. Hard disk drive 627A, supplemental storage drive 628, and optical disk drive 630 are connected to system bus 623 by a hard disk drive interface 632, a supplemental storage drive interface 633, and an optical disk drive interface 634, respectively.

Although the exemplary environment described herein employs hard disk 627A, removable supplemental storage 629, and removable optical disk 631, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment without departing from the scope of the invention. Such uses of other forms of computer readable media besides the hardware illustrated will be used in internet connected devices such as in cellular phones 105 and/or personal digital assistants (PDAs) 105.

The drives and their associated computer readable media illustrated in FIG. 4 provide nonvolatile storage of computer-executable instructions, data structures, program modules, and other data for computer or client device 102A-E. A number of program modules may be stored on hard disk 627, supplemental storage 629, optical disk 631, ROM 624, or RAM 625, including, but not limited to, the Admin module 104; the API module 106; and the injury calculations module 108.

Program modules may include, but are not limited to, routines, sub-routines, programs, objects, components, data structures, etc., which perform particular tasks or implement particular abstract data types. Aspects of the present invention may be implemented in the form of a downloadable, client-side, application (VAM-App) 103 [SEE FIG. 1A] which may have parts/functions executed by the 102A/102B in order to distribute vehicle accident information among devices 102, 105.

A system operator may enter commands and information into computer 102A-E through input devices, such as a keyboard 640 and a pointing device 642. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 621 through a serial port interface 646 that is coupled to the system bus 623, but may be connected by other interfaces, such as a parallel port, game port, a universal serial bus (USB), or the like.

The display 647 may also be connected to system bus 623 via an interface, such as a video adapter 648. As noted above, the display 647 can comprise any type of display devices such as a liquid crystal display (LCD), a plasma display, an organic light-emitting diode (OLED) display, and a cathode ray tube (CRT) display.

The camera 675 may also be connected to system bus 623 via an interface, such as an adapter 670. As noted previously, the camera 675 can comprise a video camera such as a webcam. The camera 675 can be a CCD (charge-coupled device) camera or a CMOS (complementary metal-oxide-semiconductor) camera. In addition to the monitor 647 and camera 675, the client device 102B, comprising a computer, may include other peripheral output devices (not shown), such as speakers and printers.

The computers 102A-E may operate in a networked environment using logical connections to one or more remote computers, such as the live event provider computing device 102B. A remote computer 102B may be another personal computer, a server, a mobile phone 105C, a router, a network PC, a peer device, or other common network node. While the remote computer 102B typically includes many or all of the elements described above relative to the server 102A, only a memory storage device 627E has been illustrated in FIG. 6. The logical connections depicted in FIG. 6 include a local area network (LAN) 110A and a wide area network (WAN) 110B. Such networking environments are commonplace in offices, enterprise-wide computer networks, intranets, and the Internet.

When used in a LAN networking environment, the computers 102A-E are often connected to the local area network 110A through a network interface or adapter 653. When used in a WAN networking environment, the computers 102A/102B/102C typically includes a modem 654 or other means for establishing communications over WAN 110B, such as the Internet. Modem 654, which may be internal or external, is connected to system bus 623 via serial port interface 646. In a networked environment, program modules depicted relative to the server 102A, or portions thereof, may be stored in the remote memory storage device 627E of remote computer 102B. It will be appreciated that the network connections shown are exemplary and other means of establishing a communications link between the computers 102 and mobile phones 105 of FIG. 1A may be used.

Referring to FIG. 5, this figure is a diagram of an exemplary, non-limiting aspect of an internet connected device comprising a wireless mobile telephone 105 which corresponds with the PCDs 105 of FIG. 1A. As shown, the mobile telephone 105 includes an on-chip system 722 that includes a digital signal processor or a central processing unit 724 and an analog signal processor 726 that are coupled together. As illustrated in FIG. 5, a display controller 728 and a touchscreen controller 730 are coupled to the digital signal processor 724. A touchscreen display 732 external to the on-chip system 722 is coupled to the display controller 728 and the touchscreen controller 730.

FIG. 5 further illustrates a video encoder 734, e.g., a phase-alternating line ("PAL") encoder, a sequential couleur avec memoire ("SECAM") encoder, a national television system(s) committee ("NTSC") encoder or any other video encoder, is coupled to the digital signal processor 724. Further, a video amplifier 736 is coupled to the video encoder 734 and the touchscreen display 732. A video port 738 is coupled to the video amplifier 736. As depicted in FIG. 5, a universal serial bus ("USB") controller 740 is coupled to the digital signal processor 724. Also, a USB port 742 is coupled to the USB controller 740. A memory 712 and a subscriber identity module ("SIM") card 746 may also be coupled to the digital signal processor 724.

Further, as shown in FIG. 5, a digital camera 748 may be coupled to the digital signal processor 724. In an exemplary aspect, the digital camera 748 is a charge-coupled device ("CCD") camera or a complementary metal-oxide semiconductor ("CMOS") camera.

As further illustrated in FIG. 5, a stereo audio CODEC 750 may be coupled to the analog signal processor 726. Moreover, an audio amplifier 752 may be coupled to the stereo audio CODEC 750. In an exemplary aspect, a first stereo speaker 754 and a second stereo speaker 756 are coupled to the audio amplifier 752. FIG. 7 shows that a microphone amplifier 758 may be also coupled to the stereo audio CODEC 750. Additionally, a microphone 760 may be coupled to the microphone amplifier 758. In a particular aspect, a frequency modulation ("FM") radio tuner 762 may be coupled to the stereo audio CODEC 750. Also, an FM antenna 764 is coupled to the FM radio tuner 762. Further, stereo headphones 766 may be coupled to the stereo audio CODEC 750.

FIG. 5 further illustrates a radio frequency ("RF") transceiver 768 that may be coupled to the analog signal processor 726. An RF switch 770 may be coupled to the RF transceiver 768 and an RF antenna 772. The RF transceiver 768 may communicate with conventional communications networks as well as with global positioning system ("GPS") satellites in order to obtain GPS signals for geographical coordinates.

As shown in FIG. 5, a keypad 774 may be coupled to the analog signal processor 726. Also, a mono headset with a microphone 776 may be coupled to the analog signal processor 726. Further, a vibrator device 778 may be coupled to the analog signal processor 726. FIG. 5 also shows that a power supply 780 may be coupled to the on-chip system 722. In a particular aspect, the power supply 780 is a direct current ("DC") power supply that provides power to the various components of the mobile telephone 105 that require power. Further, in a particular aspect, the power supply is a rechargeable DC battery or a DC power supply that is derived from an alternating current ("AC") to DC transformer that is connected to an AC power source.

FIG. 5 also shows that the mobile telephone 105 may include a client application program, referenced as the VAM-app 103 noted above The client application program 103 may comprise hardware and/or software. The client application program 103 may communicate with the server 102A (FIG. 1) for tracking vehicle accident information.

While only a few mobile telephones 105 and computers 102 (FIG. 1A) have been illustrated with having the client side application 103 in FIG. 1, it is understood by one of ordinary skill in the art that each of these devices 102/105 may have a copy of the client-side application program for distributing electronic vehicle accident status information over a network 110 to a remote subscriber portable computing device 105 during and after a vehicle accident. The CPU 724 may be coupled to a Global Positioning System (GPS) unit 705. The GPS unit 705 may comprise software and/or hardware and/or firmware as understood by one of ordinary skill in the art. The GPS unit 705 may provide geo-coordinates of the location of the PCD 105 to the VAM-app 103 which uses the geo-coordinates for determining the location of a vehicle involved in a accident.

As depicted in FIG. 5, the touchscreen display 732, the video port 738, the USB port 742, the camera 748, the first stereo speaker 754, the second stereo speaker 756, the microphone 760, the FM antenna 764, the stereo headphones 766, the RF switch 770, the RF antenna 772, the keypad 774, the mono headset 776, the vibrator 778, and the power supply 780 are external to the on-chip system 722.

In a particular aspect, one or more of the method steps described herein (such as illustrated in FIG. 3) may be stored in the memory 712 of the mobile phone 105 of FIG. 4 and memory 622 of the computing device 102 of FIG. 4 as computer program instructions. These computer program instructions may be executed by the digital signal processor or central processing unit 724, the analog signal processor 726, or another processor, to perform the methods described herein. Further, the processors, 724, 726, the memory 622, the instructions stored therein, or a combination thereof may serve as a means for performing one or more of the method steps described herein.

Although selected aspects have been illustrated and described in detail, it will be understood that various substitutions and alterations may be made therein without departing from the spirit and scope of the present invention. For example, an automated interactive embodiment may be supported by the system as will be described below.

Automated Interactive Exemplary Embodiments

The VAM-App 103 may be voice interactive in that it can generate audible alerts for the driver and be responsive to audible commands issued by a driver/user. In other words, the VAM-App 103 may be programmed to function as a voice-controlled intelligent personal assistant. The VAM-APP 103 may toggle between the voice-controlled intelligent personal assistant and just receiving on-screen commands.

That is, all verbal commands generated by VAM-App 103 may be mirrored on the screen of the portable computing device, which may comprise a mobile phone. In this way, if there is too much background noise, instead of using audible commands with the VAM-App 103, the user may interact with VAM-App 103 using on-screen prompts which mirror the audible questions asked by VAM-App 103. This may occur for all exemplary embodiments described above and below.

One of ordinary skill in the art recognizes that different ways of securing input/data for the accident calculations described above and below are possible and are within the scope of this disclosure. That is, variations from what is described above and below about the interactive embodiment in which information is spoken/read to the user in addition to what is displayed on-screen are possible and are included within the scope of this disclosure as understood by one of ordinary skill in the art.

The VAM-App 103, which senses movement, may sense an abrupt stop (not to be confused with breaking) of a moving vehicle as a potential accident has occurred (i.e. accelerometer parameters may be monitored in the portable computing device which may comprise a mobile phone).

There are two ways an automobile accident may be verified. One is external. And one is from the driver or owner of the VAM-App 103. It's possible that both may occur simultaneously. Again, when the accident occurs, the VAM-App 103 may recognize/determine that an abrupt stop as a possible accident to a motor vehicle.

Drivers/users who subscribe to Advance Automatic Collision Notification systems (i.e. computing devices 102E of FIG. 1A) like OnStar, Lexus Link, Mercedes Embrace and others may have an external verification sent to the VAM-App 103, as described previously. Upon a sudden stop sensed by VAM-App 103 and communicated to server 102A, the vehicle on-board crash detection system 115 may also ping the Advanced Automatic Collision Notification system 102E.

In response, the registered Advanced Automatic Collision Notification system 102E may ping the Fender2Fender server 102A. The ping is acknowledged by the Fender2Fender server 102A. Now, the Advanced Automatic Collision Notification system 102E sends simultaneous accident information to Emergency Medical Services as appropriate over the communications network 110 and to the VAM-App 103 and server 102A.

This allows the server 102A to receive the signal and accident detail information from server 102E, which includes GPS location, speed at impact, and physical location of impact on the vehicle. These details are then populated within the context of the app VAM-App 103, and cross referenced with the existing app's GPS Coordinates (See FIG. 2B; FIG. 2C).

The VAM-App 103 may ask a driver verbally and audibly if he/she has been in an accident based on the sudden stop detection and/or info from the Advanced Automatic Collision Notification system 102E, and the VAM-App 103 may have an audible alert much like the following: "Your vehicle has stopped suddenly. Is this an accident? Just say yes or no."

The user can respond verbally to the VAM-App 103 by saying yes or no. If no is the answer, the VAM-App 103 may acknowledge by saying, "Your safety is my concern. I'm just checking to be sure you're okay." If the driver is incapacitated or unable to respond (whether an Advanced Automatic Collision Notification system 102E is active or not), the VAM-App 103 may record the GPS location, and automatically dial 911 after 60 seconds of non-response/no-response from the audible alert.

Meanwhile, if the driver is conscious and "yes" is the answer received from the audible alert, the VAM-App 103 may acknowledge by saying verbally and audibly, "Stay calm. I'm here to help. I see your location is (GPS location). Is this your GPS location?. Please confirm by saying yes or update me with the name of the street or highway." The VAM-App 103 may display FIG. 2B described above while it provides this audible alert.

The GPS location of the accident may be confirmed by acknowledgement, or by driver voice update, which will be recorded and saved in VAM-App 103. A driver/user might respond to VAM-App 103 by saying something like, "No. I'm on 16th Street!" The VAM-App 103 may respond, "Thank you. I'm naming this event as (User Name) with the current date and time. You have the option to change it later." This gives the user an opportunity to rename this report at a later time, because of existing duress.

After audible confirmation of the accident location, the VAM-App 103 may display the listed vehicles on the policy, which were manually input during registration, or transferred from the insurer (See FIG. 2D). The VAM-App 103 may ask verbally and audibly the following: "Are you driving one of the listed vehicles? Select your vehicle. If, you're driving another, just say 'other' vehicle from the list is selected." If the user is driving a different vehicle (new, borrowed, leased or rented), the VAM-App 103 will describe the vehicle as "other."

After this exchange, the VAM-App 103 may guide the user in the sequential steps of FIG. 2E. These are shown in FIG. 2E on one page with radio button confirmations, which are required to continue.

A pop up message produced by VAM-App 103 may audibly state to the app-operator/driver: "Remember to remain calm. I'm here to help. Please do not admit any fault to anyone. Would you like to dial 911? Just say yes or no?" The user of VAM-App 103 may respond using a voice command.

If the user responds "No" for calling 911/Emergency personnel, VAM-App 103 skip the 911 prompt. If the answer is yes, a 911 button will pop up on the screen, and the app will access the 911 feature from the mobile phone to dial the number automatically. The app user may discuss the situation with the 911 operator, with the app recording the 911 call. A public safety officer may then be dispatched to the scene.

The VAM-App 103 may audibly state to the app user to, "Get your drivers' license, insurance card and vehicle registration ready for the authorities. Let's gather some useful information. I'd like to access your phone's audio and camera features. Okay?" The app user can say okay, or press the okay button on the display screen. The VAM-App 103 may audibly state, "Tell me exactly what happened in the accident." A record button may then be presented to the app user on the display screen, with a stop button showing once the app user begins to talk. The VAM-App 103 may record and save the audio automatically, with a time and date stamp.

Next, the VAM-App 103 may audibly ask: "Are there any witnesses? Just say yes or no." If the user says no, the VAM-App 103 may proceed to the next step to take photos of the accident.

If yes is the answer to the VAM-App 103, the VAM-App 103 may ask: "How many witnesses?" The app user may state the number, and receive the following response from the VAM-App 103: "Ask if they are willing to give their name(s), contact number and briefly tell what they saw." The phrase, "WITNESS" may be displayed on the display screen, with a start button just below it. When the app user presses the start button, the VAM-App 103 may state: "Thank you for your help. Please state your name, telephone number, and tell me what you saw." The VAM-App 103 will record the audio-based information. If there is a pause of more than 5 seconds, the VAM-App 103 may assume the reporting by the user has concluded, and it may ask the following: "Do you need more time? If you're done, press the stop button."

The witness may press the stop button on the display screen, and the VAM-App 103 may state: "Thank you again for your help". If there is more than one witness, the VAM-App 103 may begin the process again with the word "WITNESS" showing through the end of the reporting, until the number of witnesses given by the app user has been satisfied.

The VAM-App 103 may display a message and also state: "Now, let's take pictures of the parts of the accident scene. You may pause and resume at any time." The VAM-App 103 may state the following: "Take photos or video of . . . ", with an option for the app user to click PAUSE, RESUME, or DONE on the display screen, when each action has been satisfied by the app user, and then the VAM-App 103 may populate/check-off the radio button of "Take photos of Impact areas" as illustrated in FIGS. 2B & 2E.

The radio buttons of FIGS. 2B & 2E may be more detailed than illustrated in FIGS. 2B & 2E. Other radio buttons that may be displayed include, but are not limited to the following:

Take Photos of the accident scene
Take Photos of other driver(s) insurance information
Take Video of the accident scene
Share your insurance information with the other drivers involved in the accident.

The VAM-App 103 may automatically save all photos and videos, with a time and date stamp for easy access. These files may be saved locally and/or later transferred to the server 102A that manages user and accident profiles. This operation of taking photos and videos could take approximately, between about 3 to about 5 minutes, and may be paused to account for the arrival of the governmental authorities to the accident scene.

The VAM-App 103 may ask in an audible manner as well as displaying an on-screen display message for securing the following information often associated with emergency/first-responders:

Law Enforcement Car Number (Or Photo)
Law Enforcement Officer Badge Number (Or Photo)
Any statements by the officer When a user of VAM-App 103 clicks a "DONE" on screen button, a radio button such as illustrated in FIG. 2H may be filled-in to show completion of the task. The VAM-App 103 may display a visual message and also ask audibly: "Is your car drivable? Just say yes or no." If the car is drivable, the VAM-App 103 may end the accident scene data collection/gathering by saying stating audibly: "I'm still here to help. All of your information has been saved to assist with your vehicle damage or injury claim. You can continue later by accessing the NEXT LEVEL on your phone, tablet, desktop or other device." All of the information may then be relayed over the Internet from the portable computing device and then saved on a server 102A for the user's NEXT LEVEL access for help with property damage (FIG. 2I) and injury claim values (FIG. 2X-1).

Most jurisdictions in the United States require the attending police officer to determine the drivability of a vehicle, and for them to contact a local approved towing service. So, if the car is not drivable, the VAM-App 103 may present a roadside assistance towing number from app user's insurance company, to be dialed with a click via an on-screen button. If individually downloaded, and not a part of an insurance company license agreement, the VAM-App 103 may suggest the user request tow services via their mobile phone (e.g. via existing interactive mobile phone assistants, presently known as "Siri"/brand or "Alexa"/brand of mobile phone assistants).

The VAM-App 103 may ask verbally and in an audible manner: "Would you like to call an Uber™ ride, Lyft™ ride or your Emergency Contact? Just say yes or no." All options will be listed on screen simultaneously for selection by the user with the screen if voice commands are not desired for responding to the VAM-App 103.

Based upon the option selected/commanded, the VAM-App 103 may access the Uber™ ride-sharing app, Lyft™ ride-sharing app, or initiate a call to the Emergency Contact. Next, the VAM-App 103 may state verbally and in an audible manner: "Remember, I'm still here to help. All of your information has been saved to assist with your vehicle property damage and/or injury claim. You can continue later by accessing the NEXT LEVEL on your phone, tablet, desktop or other device. The accident report is ready to submit" (See FIG. 2H which illustrates a report on the portable computing device 105A ready for uploading to the server 102A).

All of the information is saved on the server 102A of FIG. 1A for the user's NEXT LEVEL access to help with property damage and injury claim values (See NEXT LEVEL SECTION described above and also below—See also FIG. 2J for the property damage calculator and FIG. 2S for the bodily injury calculator). An insurer may choose to limit their customers' access to the app functionality to at-the-scene assistance, with an opportunity to upload their information to the company adjuster. For example, an insurer who runs server 102A may limit or restrict access to the property damage calculator of FIG. 2J and the bodily injury calculator of FIG. 2S.

If permitted to access the next level of service provided by the server 102A, the user may select the property damage NEXT LEVEL on the portable computing device 105A, read and click the ACKNOWLEDGED button. The vehicle which was selected earlier is automatically stored by the server for populating the information needed for property damage calculations.

The VAM-App 103 may state verbally and in an audible manner: "You may continue to the NEXT LEVEL on your smartphone, or transfer it to another device such as a tablet, desktop or other device. If you wish to transfer the information to another device, please download the app to the device, and open it with your password. Otherwise, press CONTINUE here." The user may be presented with the following information and be provided with an option to click to continue. For other choices, a download link will be sent to the email address on file.

The following progressions may take place, regardless of type o portable computing device 105A used. The VAM-App 103 may state: "Welcome back [User's Name]. Let's get started. Your answers will determine any entitlement you may receive for your damaged vehicle. I see that your vehicle is only XX years old. Let's pursue depreciation." Then FIG. 2J may be presented.

The reason for this statement is the vehicle must be 5 years or less in age to take advantage of depreciation (Current Year−Vehicle Year=Vehicle Age). This payment is an amount negotiated to be paid to the user (who is also the vehicle owner) in addition to having the vehicle repaired. That is, if the vehicle is greater than five years in age, then the depreciation calculation is unavailable and the VAM-App 103 may skip FIG. 2J that requests the dollar values for the vehicle pre-accident and post-accident.

The VAM-App 103 may ask verbally as well as present the following question on the screen of the PCD 105A: "What Is Your Current Vehicle Mileage? Numeric Value Only." The VAM-App 103 may also all the questions about the vehicle as shown in FIG. 2K.

A button for FIND PRE-ACCIDENT VALUE may be presented at the end of FIG. 2K (though not visible in FIG. 2K). A 3rd party source (e.g. Kelly Blue Book website) is accessed to find the vehicle. Then the vehicle pre-accident value is shown (FIG. 2L). This value will not be deemed as "Pre-Accident" on the 3rd party site, but will show the retail value. Once the value is shown, the associated vehicle will be selected (see FIG. 2L). That value will be populated into the equation for pending calculation (see FIG. 2J).

Next, a button for FIND POST-ACCIDENT VALUE may be presented by VAM-App 103 on screen (not illustrated) with a message and/or may state the following: "Please call a 'Pre-Owned' car manager at a dealership which sells your car brand, and ask for an estimate of the value of your car after it's been repaired based upon the estimated dollar damage and type of damage your car sustained. If you are given a range, use the middle of the range as your post-accident dollar value."

The VAM-App 103 may verbally and in an audible manner state: "May I access your Internet search engine to assist in finding an authorized dealer for your car? Just say yes or no. Either way, I'll wait until you receive the post-accident value, so we can continue." If they user says no, the user may manually find the source on their own. If the answer is yes, the VAM-App 103 may allow the smartphone's Internet search engine, like GOOGLE to be displayed on screen.

Once a dealer has been found, and the user receives the estimated post-accident value, then he/she may key that amount into the VAM-App 103 (FIG. 2M). The associated value is then populated for an automatic depreciation calculation (in which FIG. 2J may then be re-displayed with the pre-accident and post-accident values displayed to the user).

The automatic depreciation calculation performed by VAM-App 103 and/or the server 102A may be as follows:

Pre-Accident Value−Post Accident Value=Depreciated Value     EQ4:

This is the depreciation value may be used by the user for negotiation, such as with an at-fault driver's insurance company. See FIG. 2N which may display the depreciation value. The VAM-App 103 may state in an audible manner what is displayed in FIG. 2N: "You may want to ask for $4050.00 plus or minus $500 as your depreciation value. If your vehicle condition is not either fair/good/excellent, a lesser actual condition may reduce your entitlement."

The VAM-App 103 in an audible fashion may state: "Ask the insurance company for this depreciated value in addition to receiving your car." A value range of plus and minus 10% is presented on either side of the depreciation value, as a basis for negotiation.

The VAM-App 103 may also state: "Ask the insurance adjuster for this amount in addition to receiving your repaired vehicle. Do so before accepting delivery of your vehicle. Once you accept it, and sign a release, it will be too late!"

At this stage of the interactive process, this ends the physical damage option to pursue vehicle DEPRECIATION. Now, for option 2, termed as APPEARANCE ALLOWANCE, as illustrated in FIG. 2O may be displayed. The following progressions may take place, regardless of the type of portable computing device. We'll call this physical damage option 2. The VAM-App 103 may state: "Welcome back [Person's Name]. Let's get started."

The VAM-App 103 may display a message (If the vehicle age exceeds 10 years). For example, if a user has a single owner 12-year old Infiniti™ brand car in excellent condition, the VAM-App 103 may state verbally "Your vehicle's age makes it unlikely to get an appearance allowance. However, you may ask for any minor amount despite this fact."

The VAM-App 103 may display the following message and verbally state: "The minor amount you may be able to negotiate should be based upon the following reasons:
1. Newly applied paint may not be an exact match (examine closely in bright sun)
2. Small imperfections/scratches visible on the clear coat
3. Doors, hood, or trunk may not align (slide finger down the open space)"

The VAM-App 103 may display the following message and verbally state: "Important: Examine your car in bright sunlight approximately 12-18 inches from the surface. Run your hand along the repaired areas, along and around seams to find imperfections (e.g. molding, trunk, hood, headlights, taillights, park lights, bumpers and mirrors). You are more likely to receive the appearance allowance you ask for if your vehicle meets the criteria:
Age 6-10 Years
Fair/Good/Excellent Condition
Not Estimated as Total Loss"

The reason for this guarded feedback by the VAM-App 103 is because the vehicle must ideally be between about 6 to about 10 years old to take full advantage of the appearance allowance payment option. An appearance allowance payment is a negotiable amount to be paid to the user (who is also the vehicle owner) in addition to having the vehicle repaired.

If the vehicle meets the sixth to ten year age requirement, the VAM-App 103 may display the following message and verbally state: "Your answers will determine any entitlement you may receive for your damaged vehicle. I see that your vehicle is only _____ years old. Let's pursue an appearance allowance."

Then, the VAM-App 103 may display the following message and verbally state: "The amount you may be able to negotiate should be based upon the following reasons:
1. Newly applied paint may not be an exact match (examine closely in bright sun)
2. Small imperfections/scratches visible on the clear coat
3. Doors, hood, or trunk may not align (slide finger down the open space)"

The VAM-App 103 may display the following message and verbally state: "Important: Examine your car in bright sunlight approximately 12-18 inches from the surface. Run your hand along the repaired areas, along and around seams to find imperfections (e.g. molding, trunk, hood, headlights, taillights, park lights, bumpers and mirrors). You are more likely to receive the appearance allowance you ask for if your vehicle meets the criteria:
Age 6-10 Years
Fair/Good/Excellent Condition
Not Estimated as Total Loss"
Subjective Negotiation Range $100-$499 $500-$999 $1,000-$1,500

The VAM-App 103 may display the following message and verbally state: "These are the suggested ranges for negotiation. You may want to start at the top of the range, and work your way down during negotiation if necessary. Please verify your vehicle information by clicking age and condition." A user will verify the saved age, and click on the condition button they believe most accurately fits their vehicle in order to continue.
Vehicle Age SAVED AGE
Vehicle Condition Fair Good Excellent The VAM-App 103 may display the following message and verbally state: "Your negotiating range is $X to $Y. If your vehicle condition is not fair/good/excellent, the actual condition may reduce your entitlement. This amount is what you should ask the insurance adjuster for in addition to receiving your repaired vehicle. Do so before accepting delivery of your vehicle. Once you accept it, and sign the release, it will be too late!" The values of the variables X and Y may be calculated at the server 102A or by the VAM-App 103, or by both devices.

If the user of the VAM-App 103 has access to the bodily injury section/level of the software, then the VAM-App 103 may start presenting questions and screen displays, such as those illustrated in FIGS. 2X-1 thru 2Z-1 described above. The bodily injury calculation section may be designed for accident victims to determine general entitlements for their injuries, if they decide to negotiate their claims cases with or without legal counsel. They will have already acknowledged a disclaimer presented on a screen display, such as illustrated in FIG. 2Z-2 in order to access either or both the property damage and bodily injury sections of the software service.

That is, for a user of VAM-App 103 to access either the bodily injury section of the software service or the property damage section of the software service, or both services, the user of the VAM-App 103 may be presented with a written disclaimer on screen that the user must agree to in order to initiate either software service. The VAM-App 103 may also read the disclaimer with a synthetic voice, but the VAM-App 103 will always require a "click-acknowledgement" via the on-screen display of the disclaimer, such as illustrated in FIGS. 2Y-2, 2Z-2, and 2Z-3.

The disclaimer, as illustrated in FIG. 2Z-2, may include, but is not limited to, the following exemplary language and an on-screen button that lists "I agree to this disclaimer":

"DISCLAIMER: This App offers post-vehicle accident steps, property damage and bodily injury feedback for educational purposes only. You should not rely on this information as a substitute for, nor does it replace, professional public adjuster or legal Counsel analysis or legal advice. All output is based upon input from the user on a do-it-yourself basis. If you require more detailed analysis or advice, seek professionals which provide such services."

After clicking and agreeing to the disclaimer, a user of VAM-App 103 may start with the bodily injury section of the software service as will now be described in detail below with respect to a voice-interactive version of the software service. As noted above, the software service may also be presented as entirely an on-screen version/embodiment noted above in connection with the prior description of FIGS. 2X-1 thru 2Z-1.

According to the voice-interactive exemplary embodiment described below, the VAM-App 103 may state: "Welcome back [Person's Name]. Let's get started. Your answers will determine entitlement, if any, you may receive for any bodily injury you may have suffered as a result of the accident. Let's pursue based upon your specific details."

The VAM-App 103 may ask verbally, "Were you the driver or passenger?" The user, according to this exemplary embodiment/scenario, may state "Passenger" or select "Passenger" from a corresponding on-screen display of the question and answer.

Next, the VAM-App 103 may then take the user to FIG. 2X-1 where the user may enter his or her insurance coverages for the vehicle involved in the accident. Subsequently, the VAM-App 103 may state and display the following as set forth in FIG. 2X-2: Confirm that your accident occurred on 4 Jul. 2019 (Y/N). Please select one or more body parts injured in the accident."

The VAM-App 103 may then state and display the following: "Let's continue with your injury information input. Gather your receipts and any medical documents to maximize receiving what you deserve." Next, the VAM-App 103 may display a screen such as the one illustrated in FIG. 2T.

The user of VAM-App 103 may manually input values for each of the items below. Those listed as "Optional" may not result in any calculation. In other exemplary embodiments of the software service, liability limits. deductibles and endorsements may result in feedback being provided by the VAM-App 103 on how to maximize these coverages.

The VAM-App 103 may state and display the following:
Annual Salary or Hourly Wage
Hours missed from work
Medical Expenses
Medical Provider Expenses (i.e. Medical Doctor)
Long Term Medical Expenses/Ongoing Treatment
Chiropractic Expenses
Miles Driven For Treatment
Diagnostic Expenses
Liability Limits (Optional)
Physical Damage (Optional)
Optional Coverage/Endorsements (Optional)
Salary Information
Annual Salary?: Numeric Only Input
Hourly Wage?: Numeric Only Input
Hours missed from work? Numeric Only Input The user will usually provide their annual salary in numeric fashion only. If the user is an hourly worker, there will be an option to input an hourly wage amount. The annualized hourly pay formula may be based upon the following:

365 days−104 weekend days−17.5 Vacation days=243.5 Annual Workdays

\*\*Note that vacation days may vary from employee to employee and the user may be provide with an option to enter amount of vacation days awarded each year.\*\*

243.5 Workdays×(8 Hours)=1948 Annual Work Hours

Annual Salary/1948 Annual Work Hours=Estimated Hourly Pay

If the user inputs a monthly salary, then the following formula may be used:

243.5Annual workdays/12=20 days per month monthly salary/20 days per month=Estimated Hourly Pay If the user inputs a weekly salary, then the following formula may be used:

Weekly salary/40 hour per week for work=Estimated Hourly Pay.

Therefore, the number of hours missed from work would usually be multiplied by the Estimated Hourly Pay to determine the amount due to the user of the VAM-App 103.

Calculation:

[Annual Salary]/1948×[Number Work Hours Missed]=($) VALUE

For example, if 22 Hours were missed by a user, the calculation may be as follows:

$80,000 Salary/1948×22=$903.49

When the user elects to input an hourly wage, the calculation is simply the number of hours missed from work X(times) the hourly wage. For example a lower wage of $12 per hour would show.

$12 Hourly Wage×(32 Work Hours Missed)=$384.00

Either the server 102A or the VAM-App 103 on the portable computing device 105 (or both devices) may perform these calculations listed above and those also described below. If there is no signal connection between the server 102A and the VAM-App 103 running on the portable computing device 105, then the portable computing device running the VAM-App 103 may perform these calculations while it is off-line as understood by one of ordinary skill in the art.

Medical Input for Injury

The VAM-App 103 may state and display the following: "Do You Have Medical Expenses? Numeric Only. Please enter expenses thus far or state the total now. If none, enter or say zero." The user may respond by manually typing or providing a spoken response which is converted to text by the VAM-App 103. This will be automatically saved by the VAM-App 103, with the user's ability to change input at any time. If there are no medical provider expenses, the user of the VAM-App 103 may skip this section.

The VAM-App 103 may state and display the following: "State or type Numeric Only—Actual Expenses ($) VALUE."

The VAM-App 103 may state and display the following: "Do You Have Medical Provider Expenses (i.e. Medical Doctor)? Please enter expenses thus far. If none, enter zero." The user may respond by manually typing the appropriate numbers and/or provide a verbal response which can be converted to text by VAM-App 103. This will be automatically saved to the VAM-App 103 and may be saved to the server 102A when the VAM-App 103 has a good connection with the server 102A. The user of VAM-App 103 may change any of the inputted information at a later time as desired.

The VAM-App 103 may state and display the following: "Do You Have Diagnostic Expenses/Charges?" The user will respond by manually typing the appropriate numbers. This information may be automatically saved at the PCD 105 and/or at the server 102A, with the user's ability to change input at any time. If there are no diagnostic expenses or charges, the VAM-App 103 may skip to the next section.

The VAM-App 103 may state and display the following:
"Diagnostic Expenses/Charges Entered By User: Numeric Only
  X-Rays
  MRI
  Radiology
  Lab Results/Tests."

A screen similar to FIG. 2X-8 may also be displayed at this juncture. In FIG. 2X-8, the user of VAM-App 103 may just provide a total cost of diagnostic cost for each visit to a medical professional that is assigned to a particular date. One of ordinary skill in the art recognizes that different ways of securing input/data for the accident calculations are possible and are within the scope of this disclosure. That is, variations from what is described above and below about the interactive embodiment in which information is spoken/read to the user in addition to what is displayed on-screen are possible and are included within the scope of this disclosure as understood by one of ordinary skill in the art.

Subsequently, the VAM-App 103 may state and display the following: "Do You Have Long Term Medical Expenses; Ongoing Treatment: Numeric Only. Please enter expenses thus far. If none, enter or say zero." The user of the VAM-App 103 may respond by manually typing-in the appropriate numbers and/or the user may provide spoken responses. This information may be automatically saved on the PCD 105 and/or at the server 102A, with the user's ability to change input at any time. If there is no long term medical expense or ongoing treatment, the VAM-App 103 may skip to the next section.

Subsequently, the VAM-App 103 may state and display the following: "Do You Have Chiropractic Expenses? Numeric Only. Please enter expenses thus far. If none, enter or say zero." The user of the VAM-App 103 may respond by manually typing-in the appropriate numbers and/or the user may provide spoken responses. Screens similar to FIGS. 2X-5 thru 2X-8 may be displayed on the PCD 105. As described previously, each of these screens 2X-5 thru 2X-8 are provided for a physician's medical office. Similar screens for chiropractic visits may be generated by VAM-App 103 which look like FIGS. 2X-5 thru 2X-8. This information may be automatically saved on the PCD 105 and/or at the server 102A, with the user's ability to change input at any time. If there are no chiropractic expenses, the VAM-App 103 may skip to the next section.

The VAM-App 103 may state and display the following: "Please provide your Chiropractic weeks of treatment? Numeric Only. Please enter the number of treatment weeks thus far. If none, enter or say zero." The user of the VAM-App 103 may respond by manually typing-in the appropriate numbers and/or the user may provide spoken responses. This information may be automatically saved on the PCD 105 and/or at the server 102A, with the user's ability to change input at any time. If there is no Chiropractic treatment, the VAM-App 103 may skip to the next section.

The following is an exemplary chiropractic expense calculation that may be performed by the VAM-App 103 and/or the server 102A.

Chiropractic Expenses Calculation (Based upon $250 per week):

| Treatment Time | Fee Total | Extra to Negotiate |
| --- | --- | --- |
| <4 Weeks | <$1,200 | .85-1.15 of Fee |
| 4-6 Weeks | $1,201-$1,500 | .85-1.15 of Fee |
| >6 Weeks | >$1,500 | .85-1.15 of Fee |

The following is an exemplary chiropractic expense calculation that may be performed by the VAM-App 103 and/or the server 102A.

Chiropractic Expenses Calculation Example with five weeks of treatment:
  Fee=$1,400
  Extra @ 0.85 of Fee=$1,190
  Extra @ 1.15 of Fee=$1,610
  Negotiation Range for User of VAM-App 103=$1,190-$1,610
  Suggestion=Midpoint The VAM-App 103 may state and display the following: "Based upon your Chiropractic expenses and weeks of treatment, you may want to ask for an amount ranging from $XX-$YY. The mid-point in this range may yield you the most favorable results." This range may be automatically saved on the PCD 105 and/or at the server 102A, with the user's ability to change input at any time. If there was no chiropractic treatment, this section may be skipped by the VAM-App 103.

Subsequently, the VAM-App 103 may state and display the following: "Please provide your Miles Driven for Treatment—Numeric values Only, please." The user may respond by manually typing and/or speaking the appropriate numbers. This information may be automatically saved on the PCD 105 and/or at the server 102A, with the user's ability to change input at any time. Alternatively, the VAM-App 103 103 may state and display the contents of FIG. 2X-6 in which the user may state the number of miles driven for each date of medical service. However, if there were no miles driven for medical services, the VAM-App 103 may skip to the next section.

The VAM-App 103 may use the United States Internal Revenue Service rate set each year for medical and/or moving expenses. In the examples described herein, an exemplary value of 19 cents (U.S.) per mile driven was used for medical or moving purposes.

The following may be calculated by a PCD 105 and/or the server 102A:

Miles Driven For Treatment: Numeric Only Input Calculation Formula $$\text{Number of Miles} \times 0.19 = (\$) \text{ VALUE}$$

The miles driven, according to this voice-interactive exemplary embodiment of the software service, may comprise an end point of the Bodily Injury calculations where the results of the values and calculation of the following are itemized and tallied.

The VAM-App 103 may present screens/screenshots of information relevant to how contributory negligence may be determined in a selected jurisdiction. These screenshots may be generated based on the following information:

State Specifics

The State where the accident took place may be displayed on-screen, along with text that describes insurance rules for that specific State. While state in this description means a state of the United States of America, the VAM-App 103 may be programmed for other jurisdictions outside of the United States such as Canada, Europe, China, Japan, etc.

If the accident took place in North Carolina (NC), then only "North Carolina" may be displayed on-screen to the user, as it shares the same rules with the other states on the list. The user of the VAM-App 103 may see only 1 of the 6 options below that are specific to the fifty states of the United States. As noted previously, the VAM-App 103 may be programmed for other jurisdictions besides the United States, and such other jurisdictions may be displayed to the user of the VAM-App 103 in this section.

Table 2 listed below lists the various laws and rules for the fifty states of the United States as of this writing. As noted previously, the laws and rules of these jurisdictions may change periodically, such as on the order of annually and/or semiannually.

The following six options based on the fifty different jurisdictions of the United States may be displayed and read as follows in a synthetic voice produced by the VAM-App 103:

[OPTION 1] AL, DC, MD, NC, VA

The VAM-App 103 may state and display the following for these five jurisdictions listed under OPTION 1: "All output will be based upon your input. [STATE] is governed by a PURE CONTRIBUTORY NEGLIGENCE RULE, wherein even 1% negligence bars you from financial recovery. If you wish to continue, you would need to select zero as your negligence percentage with respect to the vehicle accident."

[OPTION 2] FL, HI, KS, KY, MA, MI, MN, NJ, NY, ND, PA, UT

The VAM-App 103 may state and display the following for these twelve jurisdictions listed under OPTION 2: "The state of [STATE] is governed by No-Fault laws. All output will be based upon your input. The actual settlement outcome may differ from what you derive from your input."

[OPTION 3] AK, AZ, CA, FL, KY, LA, MS, MO, NM, NY, RI, WA

The VAM-App 103 may state and display the following for these twelve jurisdictions listed under OPTION 3: "All output will be based upon your input. [STATE] is governed by a PURE COMPARATIVE NEGLIGENCE, RULE, wherein your percentage of negligence reduces the amount you are entitled to recover by the percent of your negligence. Zero is pre-selected. You may change your negligence input on the next screen."

[OPTION 4] AR, CO, GA, ID, KS, MA, NE, ND, TN, UT

The VAM-App 103 may state and display the following for these ten jurisdictions listed under OPTION 4: "If less than 50%, your percentage of negligence reduces the amount you are entitled to recover by the percent of your negligence. All output will be based upon your input. [STATE] is governed by a MODIFIED COMPARATIVE NEGLIGENCE 50% RULE, wherein if your percentage of negligence is 50% or more, you cannot recover any damages. Zero is pre-selected. You may change your negligence input on the next screen."

[OPTION 5] CT, DE, HI, IL, IN, IA, MA, MI, MN, MT, NV, NH, NJ, OH, OK, OR, PA, SC, TX, VT, WV, WI, WY

The VAM-App 103 may state and display the following for these twenty-three jurisdictions listed under OPTION 5: "If less than 51% your percentage of negligence reduces the amount you are entitled to recover by the percent of your negligence. All output will be based upon your input. [STATE] is governed by a MODIFIED COMPARATIVE NEGLIGENCE 51% RULE, wherein if your percentage of negligence is 51% or more, you cannot recover any damages. Zero is pre-selected. You may change your negligence input on the next screen.

[OPTION 6] SD

The VAM-App 103 may state and display the following for this single jurisdiction listed under OPTION 6: "All output will be based upon your input. [STATE] is governed by a MODIFIED COMPARATIVE NEGLIGENCE SLIGHT/GROSS RULE, wherein if your percentage of negligence is considered as slight, you may recover damages. Zero is pre-selected. You may change your negligence input on the next screen."

On the next on-screen display after one of these six options, the VAM-App 103 may state and display the following: "What was your percentage of fault in the accident? Fault is pre-selected at zero."

A range between zero and 100% may be displayed, where the user of the VAM-App 103 may select a graphical indicator, such as a slider of a slider bar—listed below —, to correspond with a level of negligence, a driver may believe he or she may have with respect to an accident:

0-|-----------------100%

The fault percentage is preselected (default-set) to zero, allowing the user to leave it at zero or change it manually at any time (such as adjusting a slider bar or to type-in percentage). Based on the selected percentage, the server may modify the dollar entitlements. It will subtract the at-fault percentage from the entitlement in dollars. For example, the at-fault percentage calculation may look like the following:

Final Dollar Entitlement $25,000

Percentage Fault=30% (Represented by 30% of Final Dollar Entitlement of $25,000)=$7,500

Adjusted Entitlement: =$25,000−$7500=$17,500

With respect to the Medical Provider Expenses, the VAM-App 103 and/or server may utilize the following BI and P&S formulas described above in connection with FIG. 3H through FIG. 3I. Next, a screen similar to the exemplary embodiment illustrated in FIG. 2X-10 may be displayed which shows the subtotals entered to date into the VAM-App 103.

The VAM-App 103 may display and state with a synthetic voice the final dollar entitlement value, the percent fault value, the percent fault, and an adjusted entitlement based on the percent fault value, similar, though not identical to the exemplary embodiment illustrated in FIG. 2X-10.

Subsequently, the VAM-App 103 may state and display the following: "Congratulations (User Name)! You've entered personal information which will provide a basis for you to negotiate for the financial entitlements you deserve. Do you wish to see the value range that you can use to negotiate with the insurance provider?" A screen similar to FIG. 2Z-1 may also be displayed.

If the user of the VAM-App 103 desires to hear and view the value range for negotiating bodily injury expenses, the following DISCLAIMER may be read and displayed, as illustrated in FIG. 2Y-2:

"Percentages, insurance laws and rules transmitted by Fender2Fender, LLC may change within any given state, become outdated or superseded over time. This information, including calculations, should not be construed as representation of a Public Adjuster, legal advice concerning claim entitlement, legal advice concerning any factual situation and representation of any insurance company or individual by Fender2Fender, LLC. The feedback you receive, is based solely upon your input, and should not be used as a replacement for legal advice."

Total Property Damage and/or Bodily Injury values may be presented and read to the user, if the user selects a button stating they have read and will abide by the disclaimer. So if the "I agree" button for the disclaimer of FIG. 2Y-2 is selected, the VAM-App 103 may display and read the contents of FIG. 2Z-1 for the bodily injury calculations and/or FIG. 2N for the property damage calculations.

Additional Exemplary Embodiments

According to another exemplary embodiment, insurers, under license agreement, may send claim payment to their insured via 3rd party software. Once the user and insurer agree on the claim settlement amount, the process begins. A signature-based PDF release form will be sent to the user. The user will sign the release form electronically, and the insurer will release funds to the user/customer via 3rd party software.

Specifically, referring now to FIG. 6, details of the automobile accident are subsequently forwarded electronically to a licensed provider via a process that may be entitled, "Transmit completed report and data to central server." The licensed provider can be, but is not limited to, an insurer or third party administrator (TPA), and the licensed software provider representative incorporates the information into a claim value analysis, and thus makes a determining value calculation from the accident event, which results in a financial offer to the subscriber as illustrated.

A financial offer 600 to settle the claim may be electronically submitted the subscriber by the representative, such as illustrated in FIG. 6. This offer 600 be viewed via a portable computing device 105 as illustrated in FIG. 6. The portable computing device (PCD) 105 as shown in FIG. 6 may comprise a mobile phone. As illustrated in FIG. 6, the user of the PCD 105 may accept or reject the offer 600.

If the offer 600 is rejected, the notification will be sent directly to the licensed provider for review and reconsideration of a new offer. If the offer 600 is accepted, whether an original or renewed offer, a claim payment options screen display 700 may be presented to the user, such as illustrated in FIG. 7.

The display 700 may comprise radio button options for a financial deposit to the subscriber's account, such as, but not limited to, various third party financial institutions known as of this writing: Square Cash, ClearXchange, Google Wallet, PayPal, Zelle or Popmoney, and a place to fill in financial institution information, which will include the name of the institution, address, account holder name, routing number and account number, with a SEND button. This notification will be sent directly to the licensed provider for review and processing. As illustrated in FIG. 8, verification email and/or text message 800 may be sent to the subscriber requesting acknowledgement of their action of having requested a deposit via a specified medium.

Referring to FIG. 9, as part of the interactive experience, the VAM-App 103 running on the portable computing device 105 may support a hologram 900 that is projected in the form of a human body to function as the virtual assistant to the user of the VAM-App 103. This hologram 900 may have support facial expressions such that it appears that the hologram 900 is speaking the information which originates from the VAM-App 103 described above. The hologram 900 may provide a certain level of comfort/feel such that the user of the VAM-App 103 may feel more comfortable relaying information that is requested from the screens illustrated in FIGS. 2A-2Z-2 described previously. The hologram 900 maybe embodied as a male or female form and could be selected by the user who may have preference for interacting with female or male assistants.

The hologram 900 may be supported/generated by a system-on-chip or circuitry 902 and additional screen hardware 904 which is part of a portable computing device 105. The SOC 902 may be coupled to the on-chip system 722 illustrated in FIG. 5 illustrating an exemplary embodiment of a portable computing device 105 comprising a mobile phone. The SOC 902 may embody one or more of a number of conventional hologram technologies, such as, but not limited to, those described in U.S. Pat. No. 5,341,229 issued in the name of Rowan, the contents of which are hereby incorporated by reference. Other conventional hologram technologies that may be incorporated into screen hardware 904 and/or SOC 902 may include other subsequent (later-filed) U.S. patents which may reference this '229 patent as understood by one of ordinary skill in the art.

TABLE 1

CALCULATIONS PEFORMED BY DAMAGE/INJURY CALCULATOR MODULE 108 OF SERVER 102A FOR VALUES SHOWN IN SCREENSHOTS OF EXEMPLARY FIGS.:

| STEP | USER INPUT: | CALCULATIONS BY DAMAGE/INJURY CALCULATOR MODULE 108: |
|---|---|---|
| 414 | FIG. 2X-3 WAGE WITH EMPLOYER ANNUAL SALARY = $75,000 | $75,000 [SALARY]/1948 HOURS = $38.50 PER HOUR PER HOUR WAGE ESTIMATION |
| 420 | FIG. 2X-5 COST FOR EACH MEDICAL OFFICE VISIT: Jul. 4, 2019 $1800 Jul. 18, 2019 $250 Aug. 1, 2019 $250 Sep. 5, 2019 $400 | MODULE CALCUALTES TOTAL COST FOR ALL MEDICAL VISITS: $1800 + $250 + $250 + $400 = $2700 TOTAL AT PRESENT |
| 426 | FIG. 2X-6 MILEAGE FOR VISIT Jul. 4, 2019 15 MILES | MODULE CALCULATES TOTAL MILEAGE: = 15 + 12 + 12 + 12 = 51.0 MILES |

TABLE 1-continued

CALCULATIONS PEFORMED BY DAMAGE/INJURY CALCULATOR
MODULE 108 OF SERVER 102A FOR VALUES SHOWN IN SCREENSHOTS
OF EXEMPLARY FIGS.:

| STEP | USER INPUT: | CALCULATIONS BY DAMAGE/INJURY CALCULATOR MODULE 108: |
|---|---|---|
| | Jul. 18, 2019 12 MILES<br>Aug. 1, 2019 12 MILES<br>Sep. 5, 2019 12 MILES | MODULE MAY ALSO CALCULATE<br>CURRENT TOTAL VALUE OF MILES =<br>51.0 MILES × $0.19/MILE =<br>$9.69 FOR MILEAGE |
| 430 | FIG. 2X-7<br>WORK TIME MISSED<br>Jul. 4, 2019 2H00MIN [*holiday*]<br>Jul. 18, 2019 2H00MIN<br>Aug. 1, 2019 2H00MIN<br>Sep. 5, 2019 2H30MIN<br>STEP USER INPUT: | MODULE CALCULATES TIME<br>TOTAL = 0 + 2.0 + 2.0 + 2.5 HOURS =<br>6.5 HOURS WORK<br>CALCULATE WAGES MISSED: =<br>38.50 PER HOUR * 6.5 HOURS =<br>$250.25 FOR 6.5 HOURS<br>CALCULATIONS BY DAMAGE/INJURY<br>CALCULATOR MODULE 108: |
| 434 | FIG. 2X -8<br>DIAGNOSTIC COST FOR EACH<br>VISIT<br>Jul. 4, 2019 $475<br>Jul. 18, 2019 $0<br>Aug. 1, 2019 $0<br>Sep. 5, 2019 $150 | MODULE CALCULATES TOTAL<br>DIAGNOSTIC COSTS FOR ALL VISITS:<br>$475 + $150 =<br>$625 TOTAL DIAGNOSTIC COSTS |
| 420 | NOT SHOWN IN FIGURES -<br>BUT A SCREENSHOT PRESENTED<br>LIKE FIG. 2X-5 FOR<br>TWO CHIROPRACTOR VISITS -<br>AFTER "CHIROPRACTOR" OPTION<br>SELECTED IN FIG. 2X-4:<br>September 14 $1100<br>September 21 $1000<br>ASSUME FOR THIS EXAMPLE THAT<br>THERE WAS NO WORK TIME<br>MISSED FOR CHIROPRACTIC<br>VISITS SINCE VISITS WERE ON<br>WEEKENDS; ALSO ASSUME NO<br>MILEAGE OR DIAGONOSTIC COSTS<br>FOR THESE TWO CHIROPRACTIC<br>VISITS | MODULE 108 KEEPS RUNNING TOTAL<br>OF ALL CHIROPRACTOR VISITS:<br>$1000 + $1100 =<br>$2100 IN CHIROPRACTOR VISITS |
| 450 | | FOR VALUES SHOWN IN FIG. 2X-10:<br>MODULE 108 MAY RETRIEVE<br>SUBTOTALS OR CALCULATE<br>SUBTOTALS HERE OR COMBINATION<br>THEROF:<br>MEDICAL: $2700<br>DIAGNOSTIC: $625<br>WAGES: $250.25<br>EXPENSES: $9.69<br>CHIROPRACTOR: $2100<br>TOTAL =<br>$2700 + $625 + $250.25 + $9.69 +<br>$2100 = $5684.94<br>30% CONTRIBUTORY NEGLIGENCE<br>30% OF $5684.94 = $1705.48<br>$56484.94 - $1705.48 = $3979.46 = 30%<br>REDUCTION<br>NEAREST DOLLAR ROUNDED =<br>$3980 |
| 456 | | FIG. 2Z-1<br>Pain & Suffering [P&S] = FACTOR ×<br>MEDICAL PROFESSIONAL FEES<br>P&S = 3.21 × $2700 = $8667<br>BI = [P&S] + DIAGNOSTIC + WAGES +<br>EXPENSES + CHIROPRACTOR =<br>$8667[=P&S] + $625[=Diagnostic] +<br>$250.25[=Wages] + $9.69[=Expenses] +<br>$2100[=Chiropractor]<br>BI[total] = $11,651.94<br>30% CONTRIBUTORY NEGLIGENCE<br>FACTOR -<br>30% OF $11,651.94 = $3495.58<br>$11,651.94 − $3495.58 = $8156.36 =<br>30% REDUCTION =<br>midpoint of range<br>Low end of range = 15% of $8156.36 =<br>$6932.91 |

TABLE 1-continued

CALCULATIONS PEFORMED BY DAMAGE/INJURY CALCULATOR
MODULE 108 OF SERVER 102A FOR VALUES SHOWN IN SCREENSHOTS
OF EXEMPLARY FIGS.:

| STEP | USER INPUT: | CALCULATIONS BY DAMAGE/INJURY CALCULATOR MODULE 108: |
|---|---|---|
| | | High end of range = 115% of $8156.36 = $9379.81<br>DISPLAY RANGE:<br>$6933-$9380 |

TABLE 2A

Contributory/Fault Negligence At-Fault States

| State | Fault Jurisdiction Type | Liability Limits | PIP Re-quired | Stated PIP Threshold To Sue | No-Fault State Laws | Statue Limit-ations BI | Statue Limit-ations PD | At Fault States Notable Details |
|---|---|---|---|---|---|---|---|---|
| AL | PCN | 25/50/25 | N | N/A | N | 2 | 2 | Operates as an At-Fault Insurance State. |
| AK | PC | 50/100/25 | N | N/A | N | 2 | 2 | Operates as an At-Fault Insurance State. |
| AZ | PC | 15/30/10 | N | N/A | N | 2 | 2 | Operates as an At-Fault Insurance State. |
| AR | MC 50% | 25/50/25 | N | N/A | N | 3 | 3 | Operates as an At-Fault Insurance State. |
| CA | PC | 15/30/5 | N | N/A | N | 3 | 2 | Operates as an At-Fault Insurance State. |
| CO | MC 50% | 25/50/15 | N | N/A | N | 3 | 3 | Operates as an At-Fault Insurance State. |
| CT | MC | 25/50/25 | N | N/A | N | 2 | 2 | Operates as an At-Fault Insurance State. |
| *DC | CON | 25/50/10 | Y | When PIP Policy Limits Are Exceeded; Or Serious Injury As Defined By District Laws. | Y | 3 | 3 | A 60-day option to use the no-fault option or to bring claim against the deemed at-fault driver. |
| DE | MC 51% | 25/50/10 | Y | When PIP Policy Limits Are Exceeded; Or Serious Injury As Defined By State Laws. | N | 2 | 2 | Hybrid Choice of No-Fault or Tortfeasor option for pain and suffering, and property damage. |

TABLE 2A-continued

| | | | | Contributory/Fault Negligence At-Fault States | | | | |
|---|---|---|---|---|---|---|---|---|
| State | Fault Jurisdiction Type | Liability Limits | PIP Required | Stated PIP Threshold To Sue | No-Fault State Laws | Statue Limit-ations BI | Statue Limit-ations PD | At Fault States Notable Details |
| GA | MC 50% | 25/50/25 | N | N/A | N | 2 | 4 | PIP mandatory amount is $15,000 Operates as an At-Fault Insurance State. |
| ID | MC 50% | 25/50/15 | N | N/A | N | 2 | 2 | Operates as an At-Fault Insurance State. |
| IL | MC 51% | 25/50/20 | N | N/A | N | 2 | 5 | Operates as an At-Fault Insurance State. |
| IN | MC 51% | 25/50/25 | N | N/A | N | 2 | 2 | Operates as an At-Fault Insurance State. |
| IA | MC 51% | 20/40/15 | N | N/A | N | 2 | 5 | Operates as an At-Fault Insurance State. |
| LA | PC | 15/30/25 | N | N/A | N | 1 | 1 | Operates as an At-Fault Insurance State. |
| MA | MC 51% | 20/40/5 | Y | $8,000 | N | 3 | 3 | Operates as an At-Fault Insurance State. |
| ME | MC 50% | 50/100/25 | N | N/A | N | 6 | 6 | Operates as an At-Fault Insurance State. |
| MS | PC | 25/50/25 | N | N/A | N | 3 | 3 | Operates as an At-Fault Insurance State. |
| MO | PC | 25/50/10 | N | N/A | N | 5 | 5 | Operates as an At-Fault Insurance State. |
| MT | PC | 25/50/20 | N | N/A | N | 3 | 2 | Operates as an At-Fault Insurance State. |
| NE | MC | 25/50/25 | N | N/A | N | 4 | 4 | Operates as an At-Fault Insurance State. |
| NM | MC | 25/50/10 | N | N/A | N | 2 | 6 | Operates as an At-Fault Insurance State. |

TABLE 2A-continued

Contributory/Fault Negligence At-Fault States

| State | Fault Jurisdiction Type | Liability Limits | PIP Required | Stated PIP Threshold To Sue | No-Fault State Laws | Statue Limitations BI | Statue Limitations PD | At Fault States Notable Details |
|---|---|---|---|---|---|---|---|---|
| NV | MC 51% | 15/30/10 | N | N/A | N | 2 | 3 | Operates as an At-Fault Insurance State. |
| NH | MC | 25/50/25 | N | N/A | N | 3 | 3 | Unlike most or all other states, New Hampshire law does not require automobile insurance for all drivers. It does require drivers to cover costs of bodily injury and property damage for any accident which they are deemed to be at fault. |
| NC | PCN | 30/60/25 | N | N/A | N | 3 | 3 | Operates as an At-Fault Insurance State. |
| OH | MC 51% | 12.5/25/7.5 | N | N/A | N | 2 | 2 | Operates as an At-Fault Insurance State. |
| OK | MC 50% | 25/50/25 | N | N/A | N | 2 | 2 | Operates as an At-Fault Insurance State. |
| OR | MC 51% | 25/50/20 | Y | When PIP Policy Limits Are Exceeded; Or Serious Injury As Defined By State Laws. | N | 10 | 10 | "Fault Plus PIP Car Insurance State" Hybrid of No-Fault plus Tortfeasor for pain and suffering, and property damage. |
| PA | MC 51% | 15/30/5 | Y | $5,000; or When PIP Policy Limits Are Exceeded; Or Serious Injury As Defined By State Laws. | N | 2 | 2 | Hybrid considered neither No-Fault nor At-Fault (Tortfeasor) insurance State. |

TABLE 2A-continued

Contributory/Fault Negligence At-Fault States

| State | Fault Jurisdiction Type | Liability Limits | PIP Required | Stated PIP Threshold To Sue | No-Fault State Laws | Statue Limit-ations BI | Statue Limit-ations PD | At Fault States Notable Details |
|---|---|---|---|---|---|---|---|---|
| RI | PC | 25/50/25 | N | N/A | N | 3 | 10 | Operates as an At-Fault Insurance State. |
| SC | MC 51% | 25/50/25 | N | N/A | N | 3 | 3 | Operates as an At-Fault Insurance State. |
| SD | PC | 25/50/25 | N | N/A | N | 3 | 6 | Operates as an At-Fault Insurance State. |
| TN | PC | 25/50/10 | N | N/A | N | 1 | 3 | Operates as an At-Fault Insurance State. |
| TX | MC | 25/50/25 | N | N/A | N | 2 | 2 | Operates as an At-Fault Insurance State. |
| VT | MC 51% | 25/50/10 | N | N/A | N | 3 | 3 | Operates as an At-Fault Insurance State. |
| VA | PCN | 25/50/20 | N | N/A | N | 2 | 5 | Operates as an At-Fault Insurance State. |
| WA | PCN | 25/50/10 | N | N/A | N | 3 | 3 | Operates as an At-Fault Insurance State. |
| WV | MC 50% | 25/50/25 | N | N/A | N | 2 | 2 | Operates as an At-Fault Insurance State. |
| WI | MC 51% | 25/50/10 | N | N/A | N | 3 | 6 | Operates as an At-Fault Insurance State. |
| WY | MC 51% | 25/50/10 | N | N/A | N | 4 | 4 | Operates as an At-Fault Insurance State. |

Details & Key

AF = At Fault
BI = Bodily Injury
CON = Contributory Negligence (all have a 0% threshold barring recovery)
MC = Modified Comparative Negligence
MC % = Comparative Negligence Percentage Threshold Eliminating Recovery
NF = No Fault
PC = Pure Comparative Negligence
PCN = Pure Contributory Negligence
PD = Property Damage
PIP = Personal Injury Protection
N/A = PIP Threshold To Sue Not Stated, Referenced or Published; or a not an AF/PIP State
0/0/0 = Liability Limits In Thousands (Per Person/Per Occurrence/Property Damage)
Note:
Within a No-Fault car insurance system, when a No-Fault/PIP claim is filed, one cannot receive non-monetary damages stemming from an accident (this includes pain & suffering)
Inventive system 100 is also applicable to non-U.S. jurisdictions, though only U.S. Jurisdiction is outlined in Tables 2A-2B.

TABLE 2B

Contributory/Fault Negligence No-Fault States - Details

| State | Fault Jurisdiction Type | Liability Limits | PIP Required | Stated PIP Threshold To Sue | No-Fault State Laws | Statue Limitations BI | Statue Limitations PD | At Fault States Notable Details |
|---|---|---|---|---|---|---|---|---|
| FL | NF | 10/20/10 | Y | When PIP Policy Limits Are Exceeded; Or Serious Injury As Defined By State Laws. | Y | 4 | 4 | 2-year statues for wrongful death; PIP minimum of $10,000 for B.I. and $10,000 for P.D. |
| HI | MC 51% | 20/40/10 | Y | When PIP Policy Limits Are Exceeded; Or Serious Injury As Defined By State Laws. | Y | 2 | 2 | Operates as does an At-Fault Insurance State for Property Damage. |
| KS | MC 50% | 25/50/25 | Y | $4,500 | Y | 2 | 2 | Minimum $4,500 PIP Required; P.D. paid by at-fault party. |
| KY | PC | 25/50/10 | Y | $1,000; Or Serious Injury As Defined By State Laws. | | 1 | 2 | "Choice No-Fault" provides PIP option at time of insurance policy purchase. |
| MD | PCN | 30/60/15 | Y | When PIP Policy Limits Are Exceeded; Or Serious Injury As Defined By State Laws. | Y | 3 | 3 | Operates as does an At-Fault Insurance State for Property Damage. |
| MI | MC 51% | 20/40/10 | Y | $1M | Y | 3 | 3 | Pays Lost wages up to $5,700 per month, and up to $1M for P.D. and other property, or damage to a legally parked vehicle. |
| MN | MC | 30/60/10 | Y | $40,000 | Y | 6 | 6 | Operates as does an At-Fault Insurance State for Property Damage. |
| ND | MC 50% | 25/50/25 | Y | $30,000 | Y | 6 | 6 | Operates as does an At-Fault Insurance State for Property Damage. |
| NJ | MC 51% | 15/30/5 | Y | When PIP Policy Limits Are Exceeded; | Y | 2 | 6 | Operates as does an At-Fault Insurance |

TABLE 2B-continued

Contributory/Fault Negligence No-Fault States - Details

| State | Fault Jurisdiction Type | Liability Limits | PIP Required | Stated PIP Threshold To Sue | No-Fault State Laws | Statue Limitations BI | Statue Limitations PD | At Fault States Notable Details |
|---|---|---|---|---|---|---|---|---|
| | | | | Or Serious Injury As Defined By State Laws. | | | | State for Property Damage. |
| NY | PC | 25/50/10 Or 50/100 (For Death) | Y | When PIP Policy Limits Are Exceeded; Or Serious Injury As Defined By State Laws. | Y | 3 | 3 | Operates as does an At-Fault Insurance State for Property Damage. |
| UT | MC 50% | 25/65/15 | Y | When PIP Policy Limits Are Exceeded; Or Serious Injury As Defined By State Laws. | Y | 4 | 3 | Operates as does an At-Fault Insurance State for Property Damage. |

In the claims listed below, means-plus-function clauses are intended to cover the structures described herein as performing the recited function and not only structural equivalents, but also equivalent structures. Thus, although RAM and ROM may not be structural equivalents in that Random Access Memory (RAM) is volatile when power is lost, whereas Read Only Memory (ROM) is non-volatile when power is lost, in the environment of computer memory, RAM and ROM may be equivalent structures.

Moreover, those skilled in the art will appreciate that the present invention may be implemented in other computer system configurations, including hand-held devices, multi-processor systems, microprocessor based or programmable consumer electronics, network personal computers, mini-computers, mainframe computers, and the like. The invention may also be practiced in distributed computing environments, where tasks are performed by remote processing devices that are linked through a communications network. In a distributed computing environment, program modules may be located in both local and remote memory storage devices.

Further, certain steps in the processes or process flows (such as in FIG. 3) described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

It is the express intention of the applicant not to invoke 35 U.S.C. § 112, sixth paragraph for any limitations of any of the claims herein, except for those in which the claim expressly uses the words 'means for' together with an associated function.

What is claimed is:

1. A method of distributing electronic vehicle accident status information over a network to a remote subscriber portable computing device during and after a vehicle accident, the method comprising:
 sending a downloadable client application over a computer communications network to a portable computing device (PCD) for running on the portable computing device and for communicating with a server over the computer communications network;
 the server receiving profile information about a person and at least one vehicle from the computer communications network via the client application;
 determining with at least one of the server and the client application if the vehicle has been involved in an accident;
 determining if a global positioning system (GPS) unit within the PCD is working;
 determining geo-coordinates of PCD with the GPS unit if the GPS unit is working;
 determining with the server and/or client application at least one of name of road, city, state, terrain, and weather conditions based on the geo-coordinates;
 displaying a road name, city, and jurisdiction name with the client application on a display of the PCD;
 displaying auto-dialer controls for emergency calling and dialing an emergency contact with the client application based on the profile information;
 receiving an accident report name with the client application; and
 displaying with the client application on the PCD a check-list of actions for completion in order to complete the accident report associated with the accident report name, at least one action controlling a camera function of the PCD.

2. The method of claim 1, wherein the check-list of actions comprises at least one of: a checkable item instructing the subscriber to remain calm; a checkable item instructing the subscriber to not admit fault; a checkable item for calling emergency personnel; and a checkable item for activating a camera function for taking photographs associated with the accident.

3. The method of claim 1 wherein the check-list of actions comprises at least one of: a checkable item instructing the subscriber to take photographs of the impact area; a checkable item instructing the subscriber to take photographs of license plates; and a checkable item instructing the subscriber to record number of vehicles in the accident.

4. The method of claim 1, wherein the check-list of actions comprises at least one of: a checkable item instructing the subscriber to secure insurance policy provider of other driver; a checkable item instructing the subscriber to secure policy holder of other driver insurance policy; and a checkable item instructing the subscriber to secure account number associated with other driver insurance policy.

5. The method of claim 1, wherein at least one of the server and the client application of the PCD calculate a depreciation value for the vehicle and display the depreciation value on the PCD.

6. The method of claim 1, wherein at least one of the server and the client application of the PCD calculate a bodily injury value for the subscriber and display this bodily injury value on the PCD.

7. The method of claim 1, further comprising displaying a field for receiving a contributory negligence value related to fault in the accident; and receiving the contributory negligence value with the PCD.

8. The method of claim 7, further comprising adjusting a bodily injury calculation based on the contributory negligence value.

9. The method of claim 1, further comprising calculating a depreciation value of a vehicle involved in the accident; and displaying the depreciation value on the PCD.

10. The method of claim 1, wherein the PCD comprises at least one a laptop computer having wireless data connectivity, a smartphone, a cellular telephone, a satellite telephone, a pager, a personal digital assistant (PDA), a navigation device, a tablet personal computer (PC), a smartbook or reader, a media player, and a wearable device.

11. A system for distributing electronic vehicle accident status information over a network to a remote subscriber portable computing device during and after a vehicle accident, the system comprising:
 means for sending a downloadable client application over a computer communications network to a portable computing device (PCD) for running on the portable computing device and for communicating with a server over the computer communications network;
 the server receiving profile information about a person and at least one vehicle from the computer communications network via the client application;
 means for determining within at least one of the server and the client application if the vehicle has been involved in an accident;
 means for determining if a global positioning system (GPS) unit within the PCD is working;
 means for determining geo-coordinates of PCD with the GPS unit if the GPS unit is working;
 means for determining within at least one of the server and client application at least one of name of road, city, state, terrain, and weather conditions based on the geo-coordinates;
 means for displaying a road name, city, and jurisdiction name with the client application on a display of the PCD;
 means for displaying auto-dialer controls for emergency calling and dialing an emergency contact with the client application based on the profile information;
 means for receiving an accident report name with the client application; and
 means for displaying with the client application on the PCD a check-list of actions for completion in order to complete the accident report associated with the accident report name, at least one action controlling a camera function of the PCD.

12. The system of claim 11, wherein the check-list of actions comprises at least one of: a checkable item instructing the subscriber to remain calm; a checkable item instructing the subscriber to not admit fault; a checkable item for calling emergency personnel; and a checkable item for activating a camera function for taking photographs associated with the accident.

13. The system of claim 11 wherein the check-list of actions comprises at least one of: a checkable item instructing the subscriber to take photographs of the impact area; a checkable item instructing the subscriber to take photographs of license plates; and a checkable item instructing the subscriber to record number of vehicles in the accident.

14. The system of claim 11, wherein the check-list of actions comprises at least one of: a checkable item instructing the subscriber to secure insurance policy provider of other driver; a checkable item instructing the subscriber to secure policy holder of other driver insurance policy; and a checkable item instructing the subscriber to secure account number associated with other driver insurance policy.

15. The system of claim 11, wherein at least one of the server and the client application of the PCD calculate a depreciation value for the vehicle and display the depreciation value with the PCD.

16. The system of claim 11, wherein at least one of the server and the client application of the PCD calculate a bodily injury value for the subscriber and display this bodily injury value with the PCD.

17. The system of claim 11, further comprising means for displaying a field for receiving a contributory negligence value related to fault in the accident; and the PCD receiving the contributory negligence value.

18. The system of claim 17, further comprising means for adjusting a bodily injury calculation based on the contributory negligence value.

19. The system of claim 11, further comprising means for calculating a depreciation value of a vehicle involved in the accident; and the PCD displaying the depreciation value.

20. The system of claim 11, wherein the PCD comprises at least one a laptop computer having wireless data connectivity, a smartphone, a cellular telephone, a satellite telephone, a pager, a personal digital assistant (PDA), a navigation device, a tablet personal computer (PC), a smartbook or reader, a media player, and a wearable device.

* * * * *